(12) United States Patent
Trivett et al.

(10) Patent No.: US 10,024,468 B2
(45) Date of Patent: Jul. 17, 2018

(54) CONDUIT FITTING WITH COMPONENTS ADAPTED FOR FACILITATING ASSEMBLY

(71) Applicant: Swagelok Company, Solon, OH (US)

(72) Inventors: Daniel G. Trivett, Mentor, OH (US); Peter C. Williams, Cleveland Heights, OH (US); Cal R. Brown, Lyndhurst, OH (US); Ronald P. Campbell, Shaker Heights, OH (US); William J. Knaggs, Medina, OH (US); Douglas J. McClure, Mentor, OH (US); Douglas S. Welch, Chesterland, OH (US); Stephen J. Zaborszki, Northfield Center, OH (US); James E. Gotch, Kirtland, OH (US); Connor M. Dorony, Lakewood, OH (US); Matthew K. Messer, Mentor, OH (US)

(73) Assignee: Swagelok Company, Solon, OH (US)

( * ) Notice: Subject to any disclaimer, the term of this patent is extended or adjusted under 35 U.S.C. 154(b) by 255 days.

(21) Appl. No.: 14/707,306

(22) Filed: May 8, 2015

(65) Prior Publication Data

US 2015/0323110 A1    Nov. 12, 2015

Related U.S. Application Data

(60) Provisional application No. 62/007,441, filed on Jun. 4, 2014, provisional application No. 61/990,823, filed
(Continued)

(51) Int. Cl.
*F16L 13/14*    (2006.01)
*F16L 21/00*    (2006.01)
(Continued)

(52) U.S. Cl.
CPC ............. *F16L 21/007* (2013.01); *F16L 15/08* (2013.01); *F16L 19/041* (2013.01); *F16L 19/103* (2013.01); *F16L 2201/10* (2013.01)

(58) Field of Classification Search
CPC ........ F16L 19/06; F16L 19/065; F16L 21/007
(Continued)

(56) References Cited

U.S. PATENT DOCUMENTS

| 791,905 A | 6/1905 | Higginbotham |
| 1,058,542 A | 4/1913 | Brown |

(Continued)

FOREIGN PATENT DOCUMENTS

| AT | 387081 | 11/1988 |
| BE | 556445 | 11/1988 |

(Continued)

OTHER PUBLICATIONS

4F1 product drawing, Aug. 19, 2002.
(Continued)

*Primary Examiner* — Aaron M Dunwoody
(74) *Attorney, Agent, or Firm* — Calfee, Halter & Griswold LLP

(57) ABSTRACT

A fitting includes first and second threaded fitting components, a conduit gripping device, and a stroke resisting member having a first axial length, the stroke resisting member being disposed between a threaded portion of the first fitting component and a radially extending portion of the second fitting component. The stroke resisting member is axially engaged by the radially extending portion of the second fitting component when the first and second fitting components are joined together to a first relative axial position, such that a tightening torque beyond the first relative axial position is increased by the axial engagement. The stroke resisting member is plastically compressed to a
(Continued)

second axial length smaller than the first axial length when the first and second fitting components are joined together to a second relative axial position advanced beyond the first relative axial position.

30 Claims, 71 Drawing Sheets

Related U.S. Application Data on May 9, 2014, provisional application No. 61/990,822, filed on May 9, 2014.

(51) Int. Cl.
*F16L 19/04* (2006.01)
*F16L 15/08* (2006.01)
*F16L 19/10* (2006.01)

(58) Field of Classification Search
USPC ............... 285/354, 382, 382.7, 386, 389
See application file for complete search history.

(56) References Cited

U.S. PATENT DOCUMENTS

| | | | |
|---|---|---|---|
| 1,894,700 A | 1/1933 | Parker | |
| 2,284,216 A | 5/1942 | Kunkel | |
| 2,354,538 A | 7/1944 | Parker | |
| 2,399,275 A | 4/1946 | Wenk | |
| 2,420,778 A | 5/1947 | Herold | |
| 2,511,134 A | 6/1950 | Stranberg | |
| 2,904,355 A | 9/1959 | Creamer | |
| 3,039,796 A | 6/1962 | Lawman | |
| 3,120,969 A | 2/1964 | Schmohl | |
| 3,139,293 A | 6/1964 | Franck | |
| 3,195,933 A | 7/1965 | Jacobs | |
| 3,248,136 A | 4/1966 | Brozek | |
| 3,275,350 A | 9/1966 | Kody et al. | |
| 3,287,813 A | 11/1966 | Lennon et al. | |
| 3,441,297 A | 4/1969 | Koski | |
| 3,448,128 A | 5/1969 | Teeters | |
| 3,521,912 A | 7/1970 | Mauerer | |
| 3,596,933 A | 8/1971 | Luckenbill | |
| 3,684,322 A | 8/1972 | Kotsakis | |
| 3,691,604 A | 9/1972 | Spontelli | |
| 3,695,647 A | 10/1972 | Pugliese | |
| 3,848,905 A | 11/1974 | Hammer et al. | |
| 3,893,716 A | 7/1975 | Moreiras et al. | |
| 3,895,832 A | 7/1975 | Ellis et al. | |
| 4,037,864 A | 7/1977 | Anderson et al. | |
| 4,286,807 A | 9/1981 | Bachli | |
| 4,293,149 A | 10/1981 | Bonel | |
| 4,437,691 A | 3/1984 | Laney | |
| 4,438,953 A | 3/1984 | Timme, Jr. | |
| 4,475,748 A | 10/1984 | Ekman | |
| 4,529,231 A | 7/1985 | Greenawalt | |
| 4,538,842 A | 9/1985 | Kowal et al. | |
| 4,568,114 A | 2/1986 | Konrad | |
| 4,586,731 A | 5/1986 | Castrup | |
| 4,690,437 A | 9/1987 | Anderson et al. | |
| 4,799,717 A | 1/1989 | Kingsford | |
| 4,877,271 A | 10/1989 | McCorkle et al. | |
| 4,881,316 A | 11/1989 | Wing | |
| 4,919,455 A | 4/1990 | Yoshiro | |
| 5,074,599 A | 12/1991 | Wirbel et al. | |
| 5,090,738 A | 2/1992 | Rakieski | |
| 5,149,148 A | 9/1992 | Teauber et al. | |
| 5,186,501 A | 2/1993 | Mano | |
| 5,280,967 A | 1/1994 | Varrin, Jr. | |
| 5,351,998 A | 10/1994 | Behrens et al. | |
| 5,388,866 A * | 2/1995 | Schlosser ............. | F16L 19/005 285/319 |
| 5,439,259 A | 8/1995 | Taga et al. | |
| 5,536,049 A | 7/1996 | Coules et al. | |
| 5,622,393 A | 4/1997 | Elbich et al. | |
| 5,658,025 A | 8/1997 | Ridenour | |
| 5,796,898 A | 8/1998 | Lee | |
| 5,921,588 A | 7/1999 | Vogel et al. | |
| 6,073,976 A | 6/2000 | Schmidt et al. | |
| 6,089,620 A | 7/2000 | Mota Lopez et al. | |
| 6,109,660 A | 8/2000 | Akiyama et al. | |
| 6,123,364 A | 9/2000 | Inoue et al. | |
| 6,641,180 B2 | 11/2003 | Udhoefer | |
| 6,851,729 B2 | 2/2005 | Gibson | |
| 6,860,514 B2 | 3/2005 | Wentworth et al. | |
| 6,905,142 B2 * | 6/2005 | Do ..................... | F16L 19/005 285/322 |
| 7,002,077 B2 | 2/2006 | Pyron | |
| 7,032,932 B2 | 4/2006 | Guest | |
| 7,240,925 B2 | 7/2007 | Fukano et al. | |
| 7,416,225 B2 | 8/2008 | Williams et al. | |
| 7,497,483 B2 | 3/2009 | Williams et al. | |
| 7,690,696 B2 | 4/2010 | Mallis et al. | |
| 7,695,027 B2 | 4/2010 | Williams et al. | |
| 8,038,180 B2 | 10/2011 | Williams et al. | |
| 8,608,210 B2 | 12/2013 | Kainec | |
| 8,641,099 B2 * | 2/2014 | Cuva ..................... | F16L 19/005 285/124.4 |
| 8,876,170 B2 | 11/2014 | Williams et al. | |
| 8,931,810 B2 | 1/2015 | Clason | |
| 8,960,728 B2 | 2/2015 | Williams et al. | |
| 9,297,481 B2 | 3/2016 | Williams et al. | |
| 2002/0148128 A1 * | 10/2002 | Williams ................. | F16L 19/00 33/501.45 |
| 2005/0097763 A1 * | 5/2005 | Williams ................. | F16L 19/00 33/501.45 |
| 2009/0299514 A1 | 12/2009 | Williams et al. | |
| 2010/0171309 A1 | 7/2010 | Kainec | |
| 2012/0005878 A1 | 1/2012 | Rubinski | |

FOREIGN PATENT DOCUMENTS

| | | |
|---|---|---|
| CN | 1213244 C | 3/2005 |
| CN | 101120197 A | 2/2008 |
| DE | 645775 C | 6/1937 |
| DE | 1775542 A1 | 7/1971 |
| DE | 2145760 A1 | 3/1973 |
| DE | 3511056 A1 | 10/1986 |
| DE | 4041679 A1 | 6/1992 |
| DE | 4216707 A1 | 12/1992 |
| DE | 19607784 A1 | 10/1996 |
| DE | 10206684 A1 | 8/2003 |
| DK | 112060 B | 11/1968 |
| EP | 34493 | 8/1981 |
| EP | 118656 A1 | 6/1986 |
| EP | 205170 A2 | 12/1986 |
| EP | 224188 A1 | 6/1987 |
| EP | 309179 A1 | 3/1989 |
| EP | 371063 | 2/1992 |
| EP | 484091 A1 | 5/1992 |
| EP | 285677 | 12/1992 |
| EP | 396367 | 1/1993 |
| EP | 528079 A1 | 2/1993 |
| EP | 531068 A2 | 3/1993 |
| EP | 581408 A1 | 2/1994 |
| EP | 489289 | 5/1994 |
| EP | 638752 A1 | 2/1995 |
| EP | 523020 B1 | 2/1996 |
| EP | 583707 | 3/1996 |
| EP | 441676 | 6/1996 |
| EP | 751334 A1 | 1/1997 |
| EP | 762003 A1 | 3/1997 |
| EP | 863354 A1 | 9/1998 |
| EP | 879980 A2 | 11/1998 |
| EP | 895014 A2 | 2/1999 |
| EP | 899498 A2 | 3/1999 |
| EP | 940617 A2 | 9/1999 |
| EP | 1020675 A1 | 7/2000 |
| EP | 1033518 A1 | 9/2000 |
| EP | 1055859 A2 | 11/2000 |
| EP | 1271038 A1 | 1/2003 |
| EP | 1358418 | 4/2005 |

(56) References Cited

FOREIGN PATENT DOCUMENTS

| | | |
|---|---|---|
| EP | 1612467 A2 | 1/2006 |
| EP | 1647752 A1 | 4/2006 |
| FR | 1263685 | 6/1961 |
| GB | 2032555 | 5/1980 |
| GB | 2165899 | 4/1986 |
| JP | 59-187184 | 10/1984 |
| JP | H01-058888 | 4/1989 |
| JP | 7-243564 | 9/1995 |
| JP | 08-014449 | 1/1996 |
| JP | 11201347 | 7/1999 |
| JP | 2001-099337 | 4/2001 |
| JP | 2001-099360 | 4/2001 |
| KR | 1998-72685 | 11/1998 |
| WO | 84/00796 A1 | 3/1984 |
| WO | 88/04385 A1 | 6/1988 |
| WO | 89/009904 A1 | 10/1989 |
| WO | 89/012190 A1 | 12/1989 |
| WO | 93/24780 A1 | 12/1993 |
| WO | 93/25837 A1 | 12/1993 |
| WO | 94023234 A1 | 10/1994 |
| WO | 97/007356 A1 | 2/1997 |
| WO | 97/14905 A1 | 4/1997 |
| WO | 97/043571 A1 | 11/1997 |
| WO | 98/032999 A1 | 7/1998 |
| WO | 99/24750 A1 | 5/1999 |
| WO | 99/34142 A1 | 7/1999 |
| WO | 01/20214 A1 | 3/2001 |
| WO | 02/063194 A2 | 8/2002 |
| WO | 02/063195 A2 | 8/2002 |
| WO | 04/013527 A2 | 2/2004 |
| WO | 05/019717 A1 | 3/2005 |
| WO | 05/106310 A1 | 11/2005 |
| WO | 07/048021 A2 | 4/2007 |
| WO | 08/057983 A1 | 5/2008 |
| WO | 09/003016 A1 | 12/2008 |
| WO | 09/18079 A1 | 2/2009 |
| WO | 09/20900 A2 | 2/2009 |
| WO | 11/99667 A1 | 8/2011 |

OTHER PUBLICATIONS

4F0-6GC product drawing, Apr. 26, 2004.
One page drawing dated Apr. 28, 2009—Standard 800 Series Space Collar Assy., (illustrated collar and fitting assembly offered for sale at least as early as Feb. 5, 2000) Swagelok Compan.
Parker Hannifin Corporation, Suparcase, The Invisible Breakthrough, Parker Suparcase Promotion Folder, Parker Hannifin Corporation, Huntsville, AL.
Parker Hannifin Corporation, Parker Suparcase Process Hardens Stainless Steel to Become More Resistant to Corrosion, News Release, Parker Hannifin Corporation, Huntsville, AL.
Parker Hannifin Corporation, Engineering Report—Ferrule Design Suparcase, Parker Suparcase Bulletin, 4230-B15.1, Parker Hannifin Corporation, Huntsville, AL.
Parker Hannifin Corporation, Parker Suparcase, A Proprietary Process for the Hardening of Stainless Steel Ferrules, Parker Suparcase Bulletin, Mar. 1993, 4230-B15.3, Parker Hannifin Corporation, Huntsville, AL.
Two pages, 4300 Catalog, Triple-Lok 37 degrees flared tube fitting, Parker Hannifin, Sep. 2000.
European Search Report from Application No. 12161443.2 dated May 9, 2012.

* cited by examiner

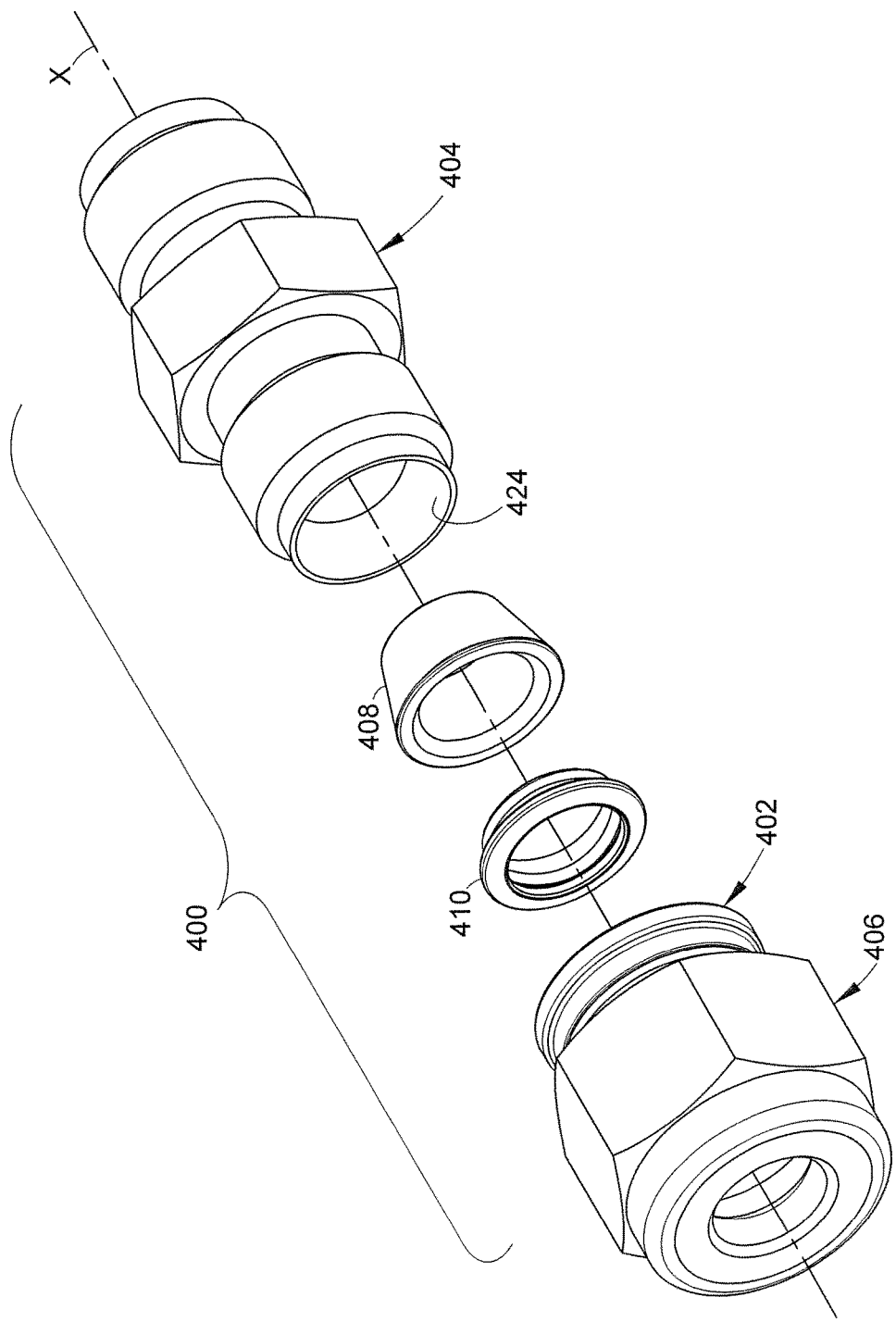

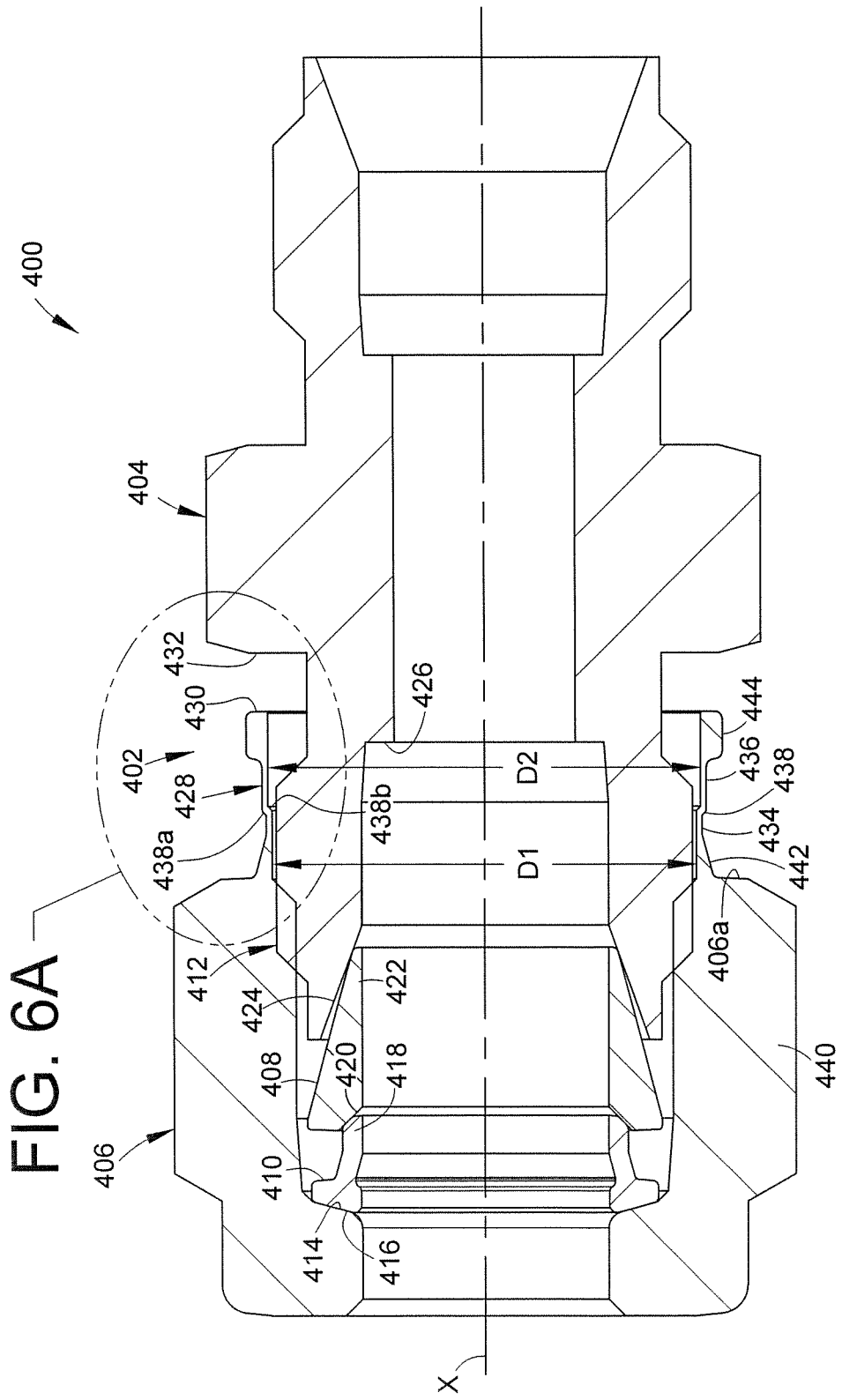

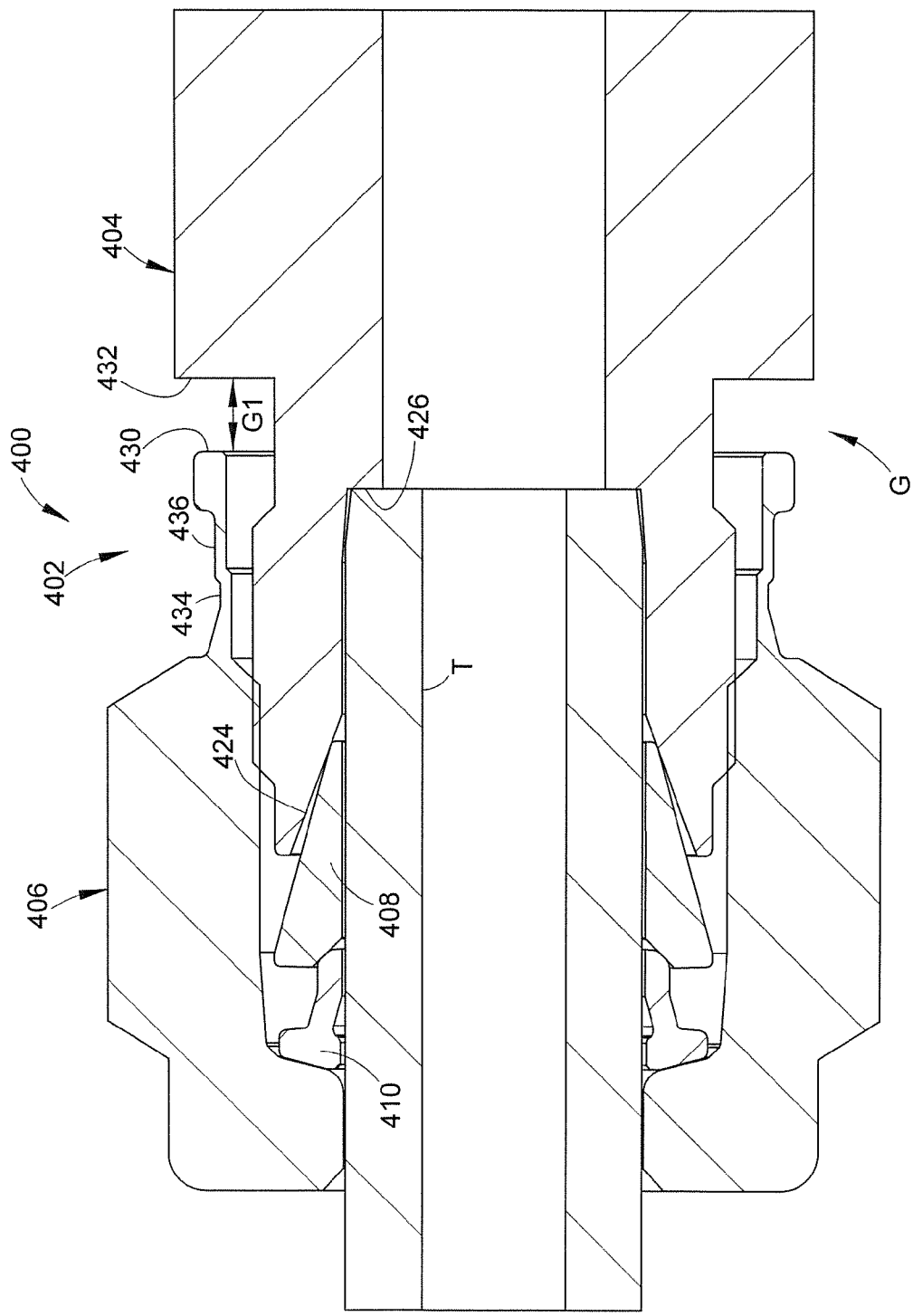

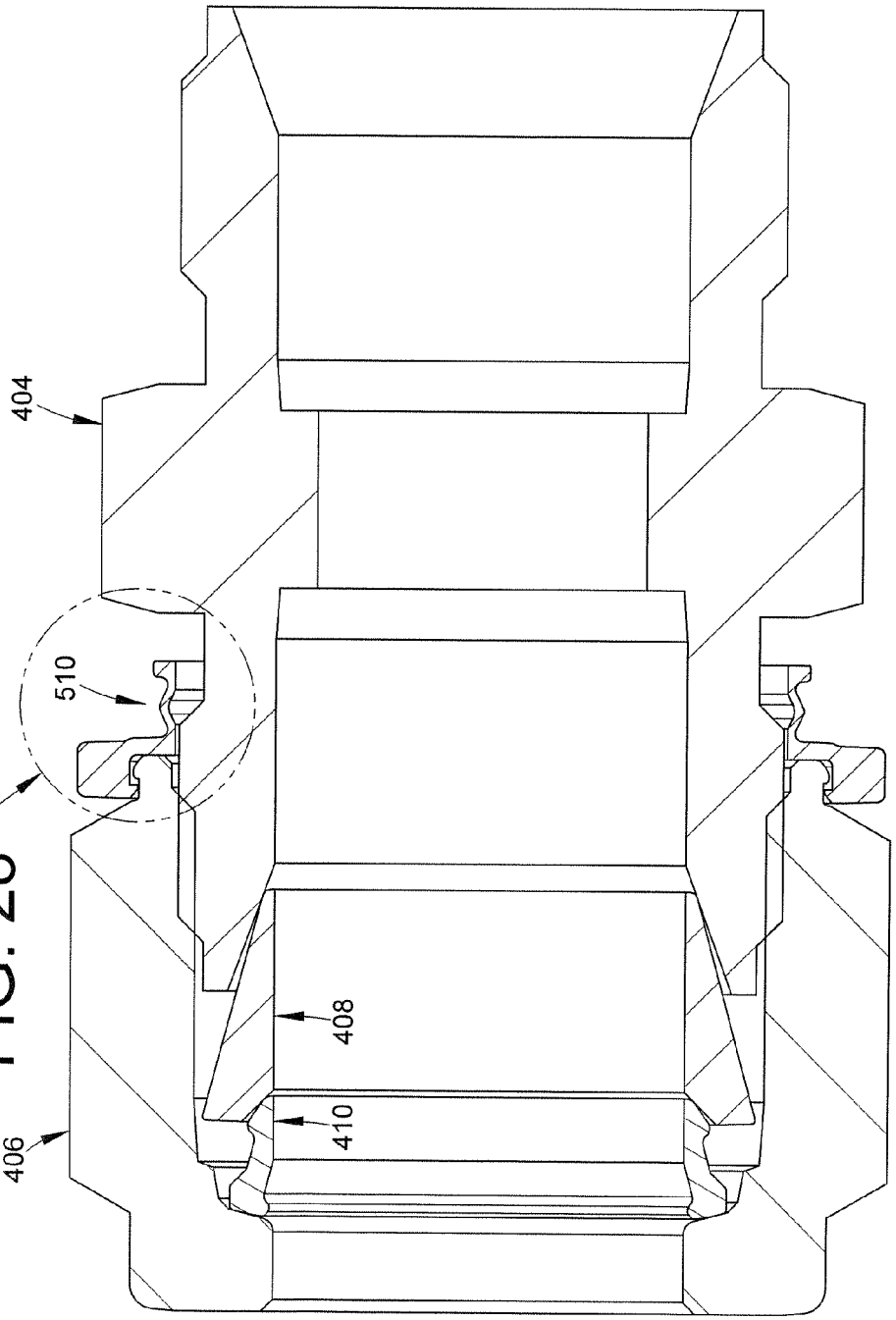
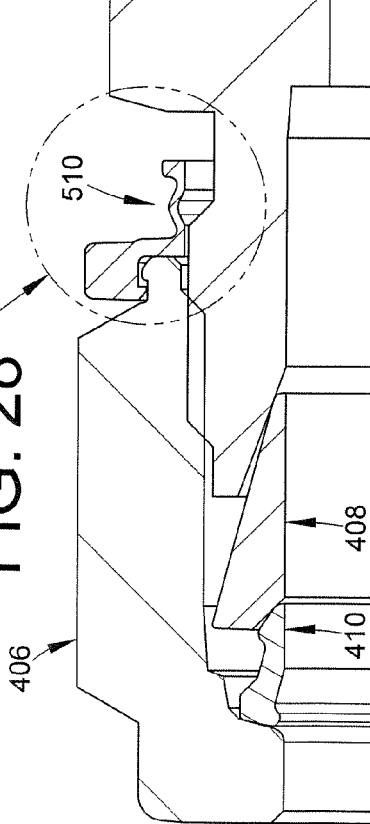
FIG. 27
FIG. 28

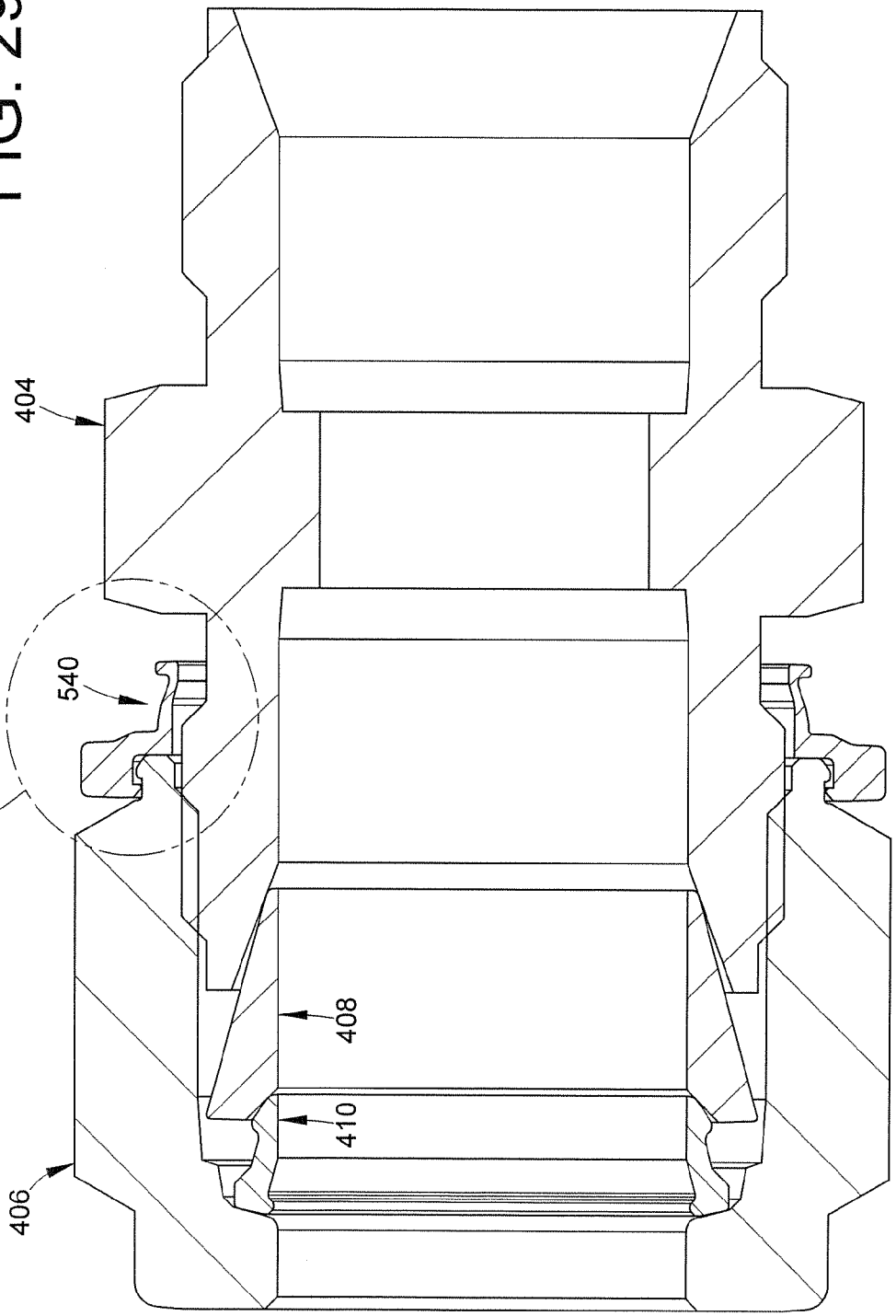

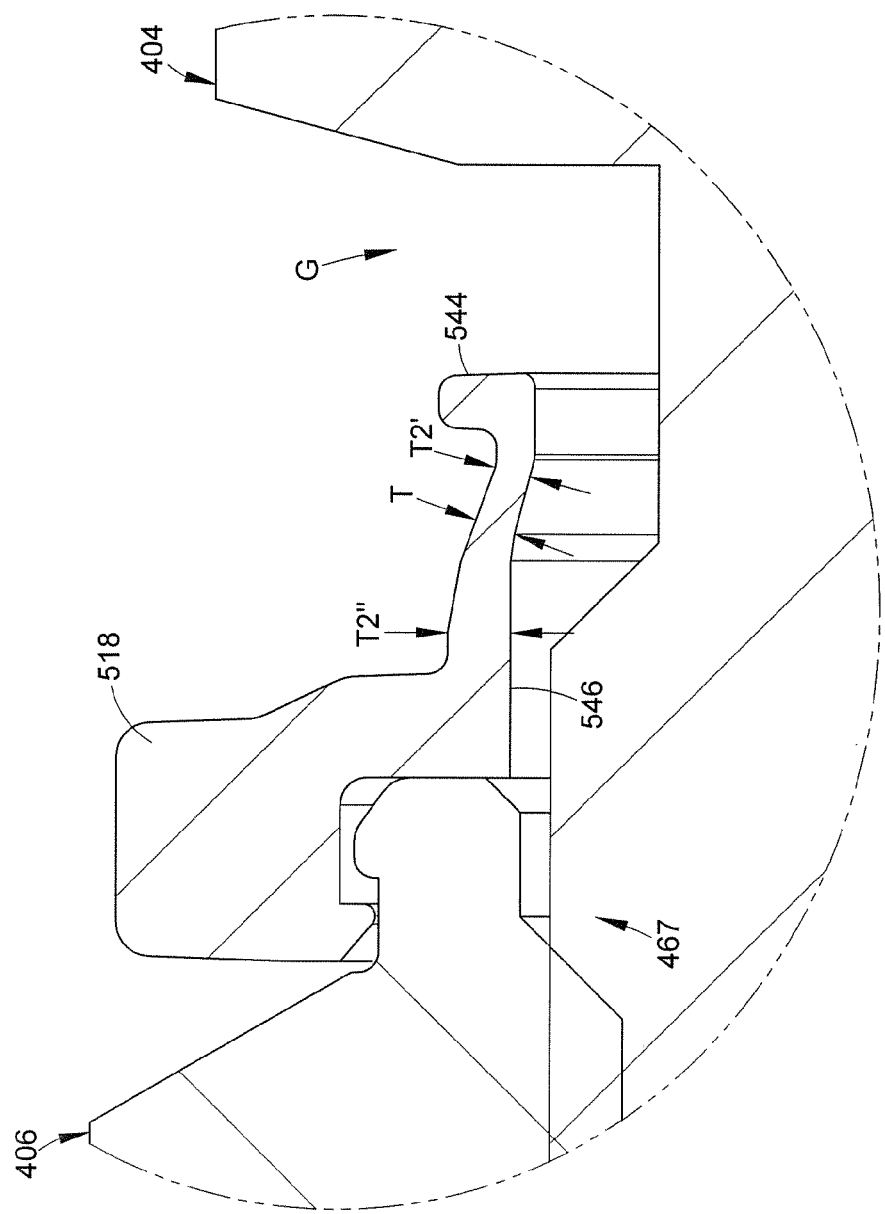

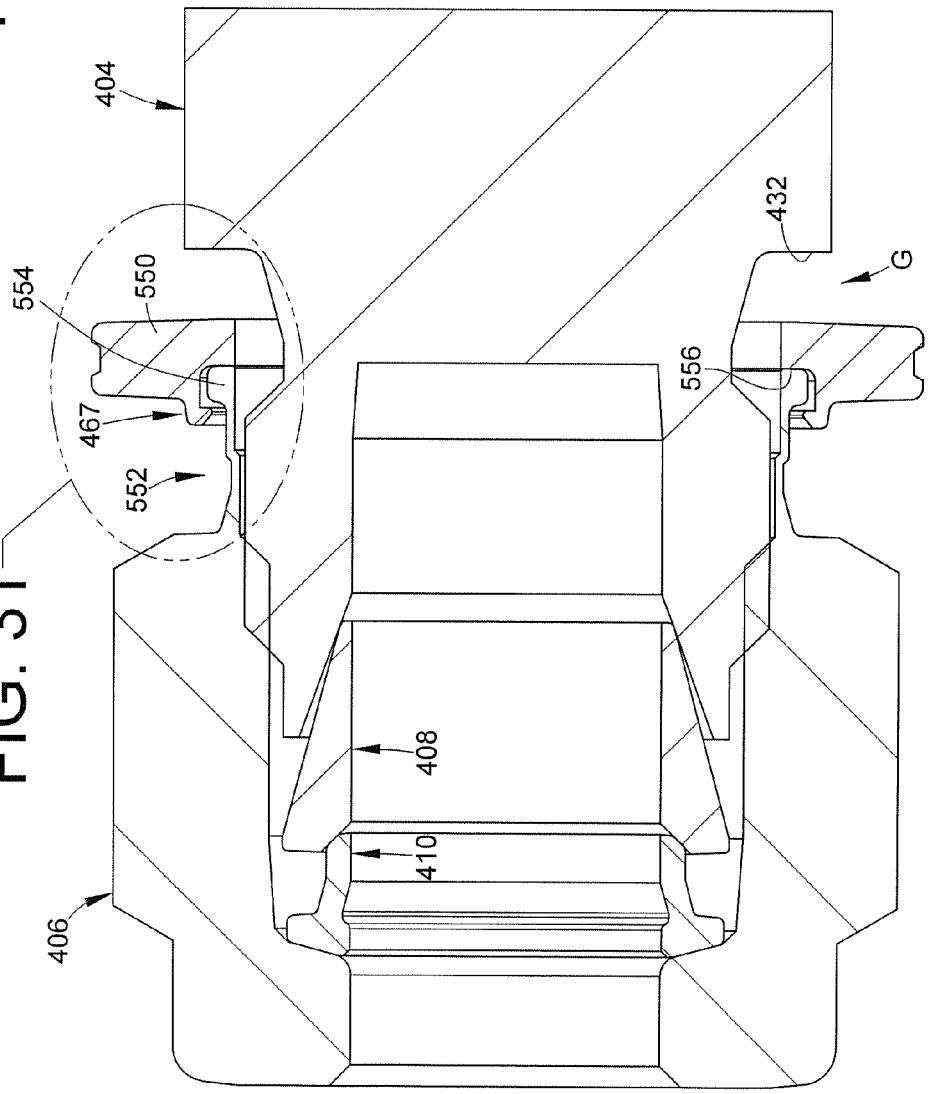

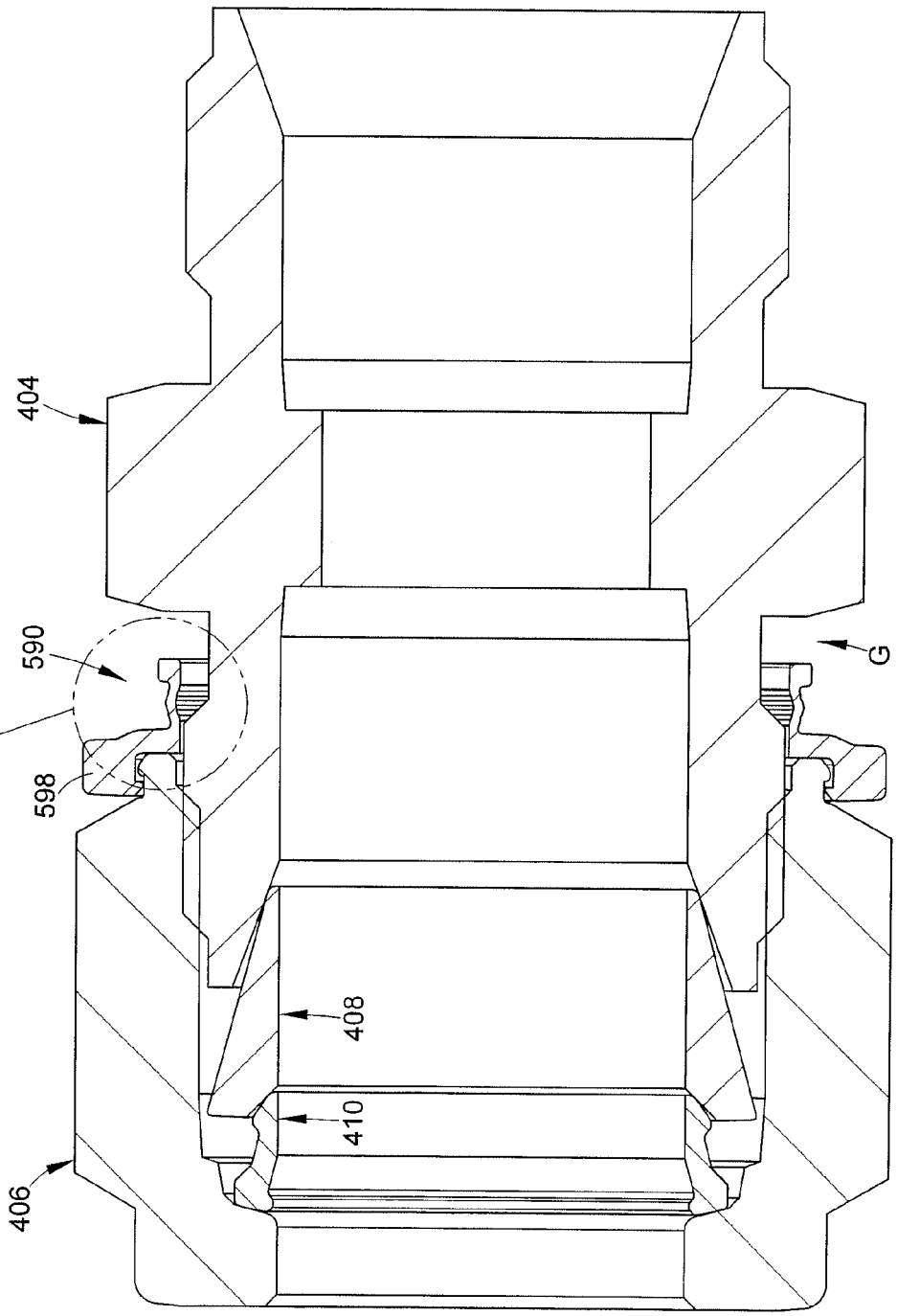

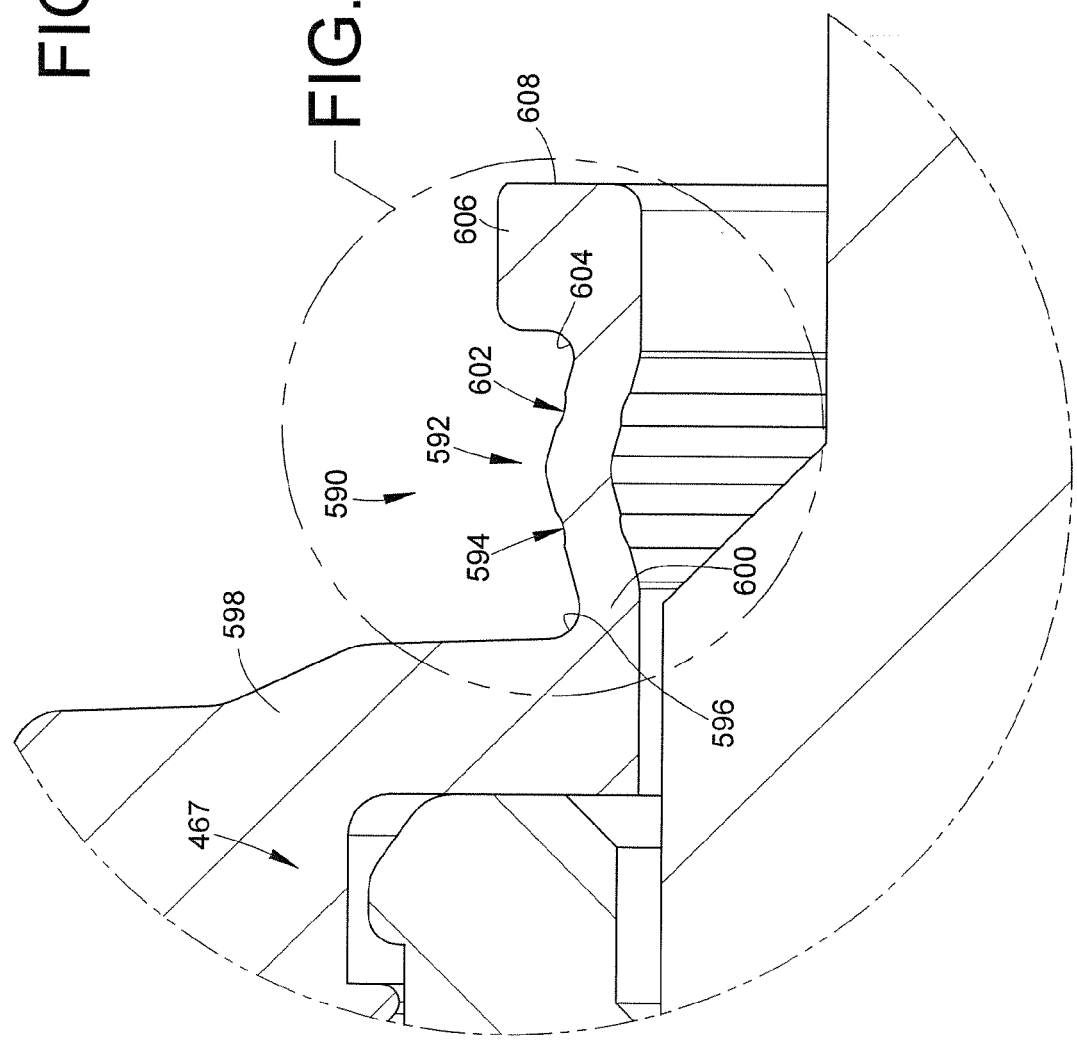

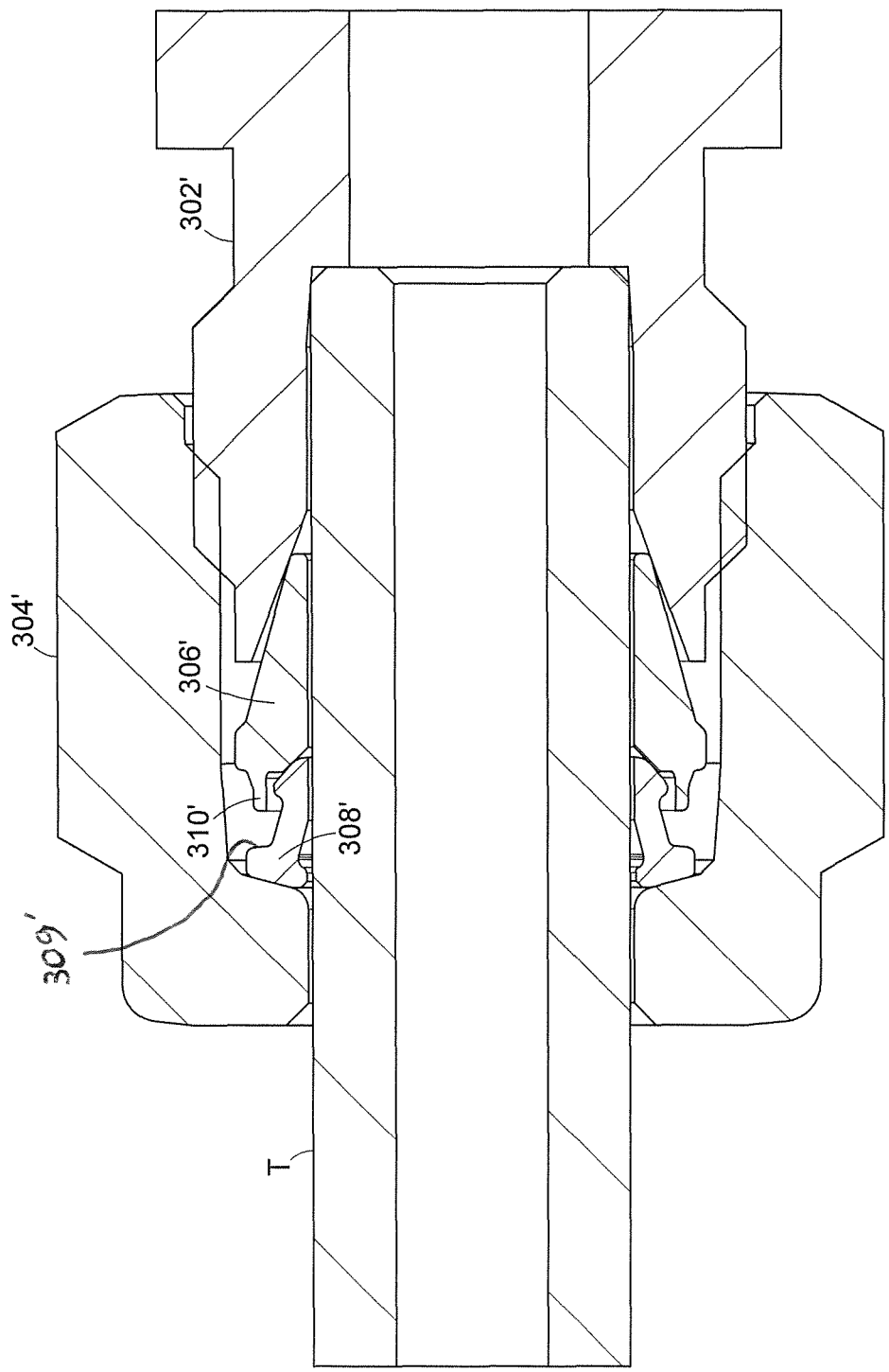

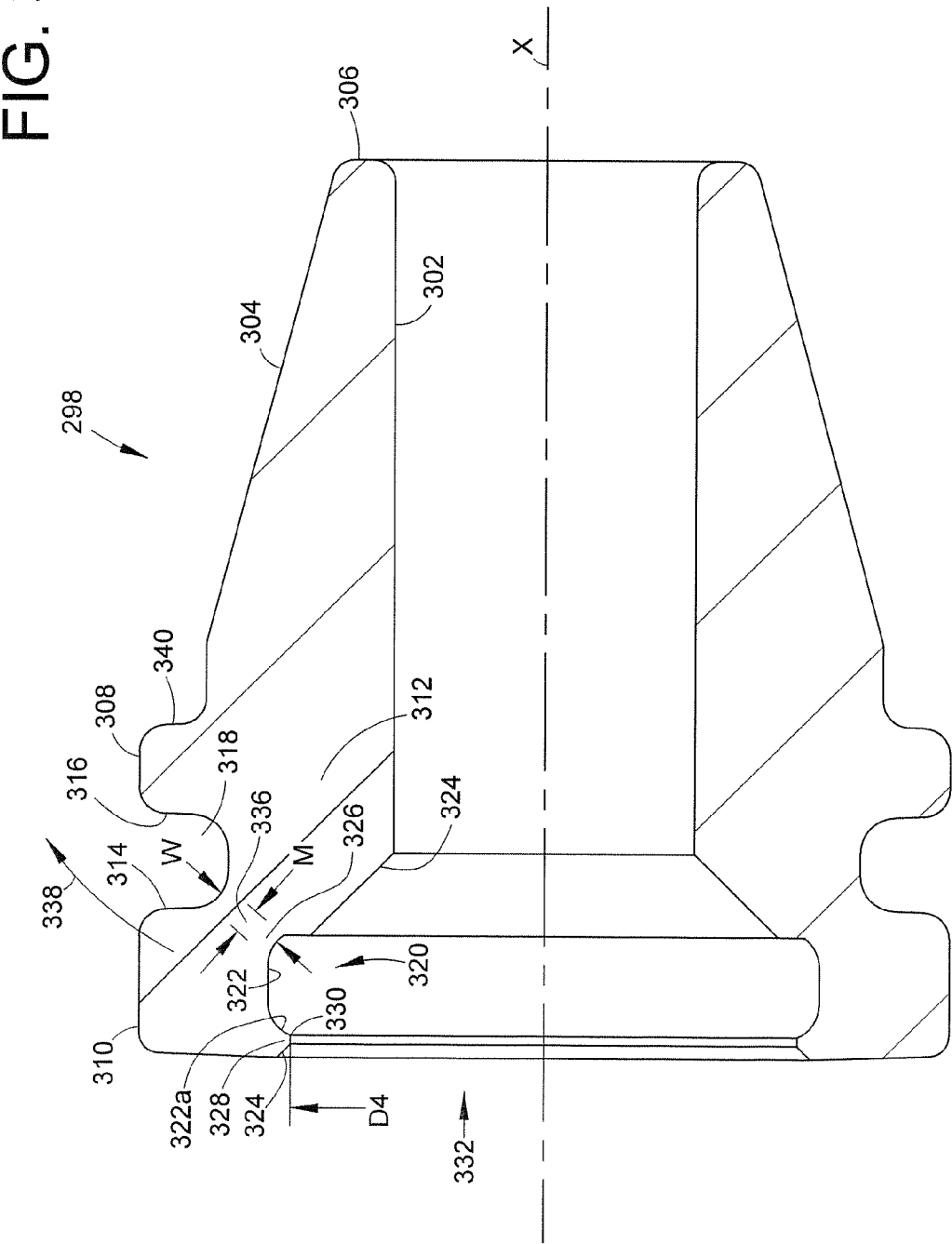

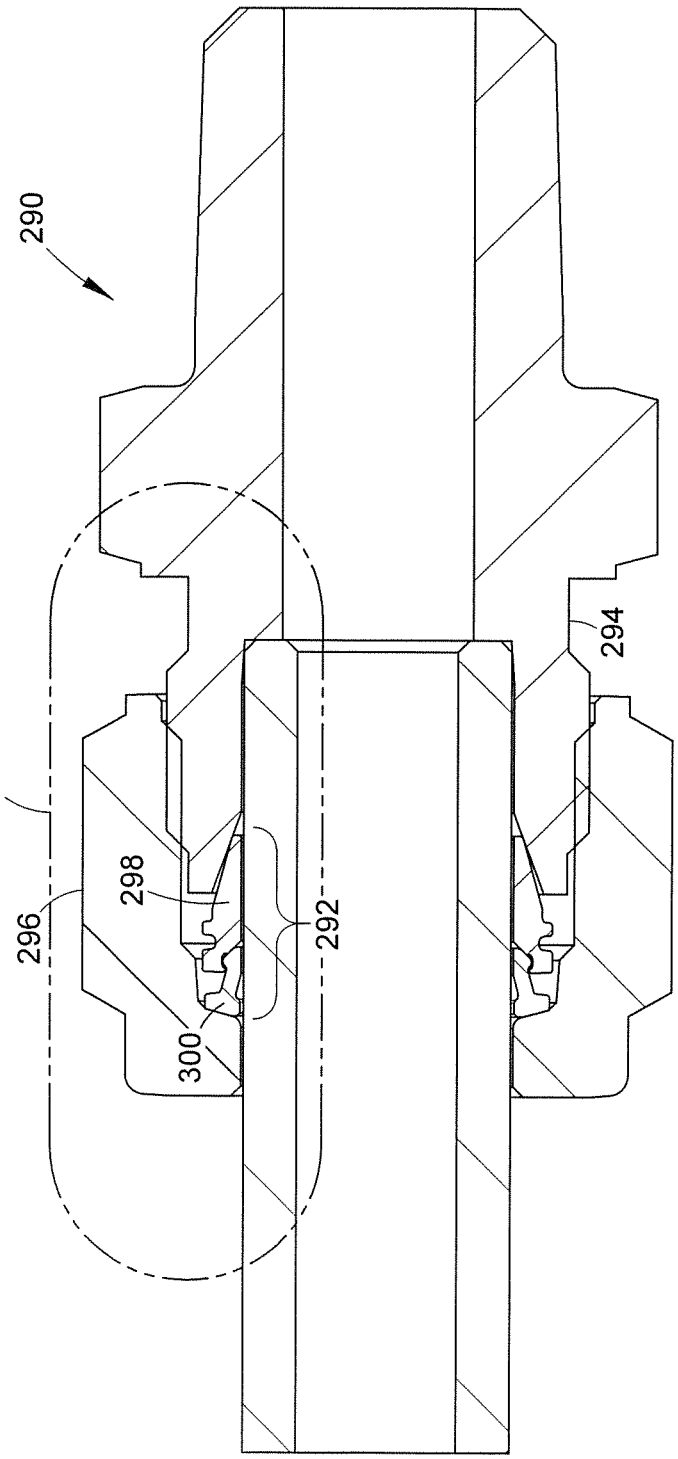

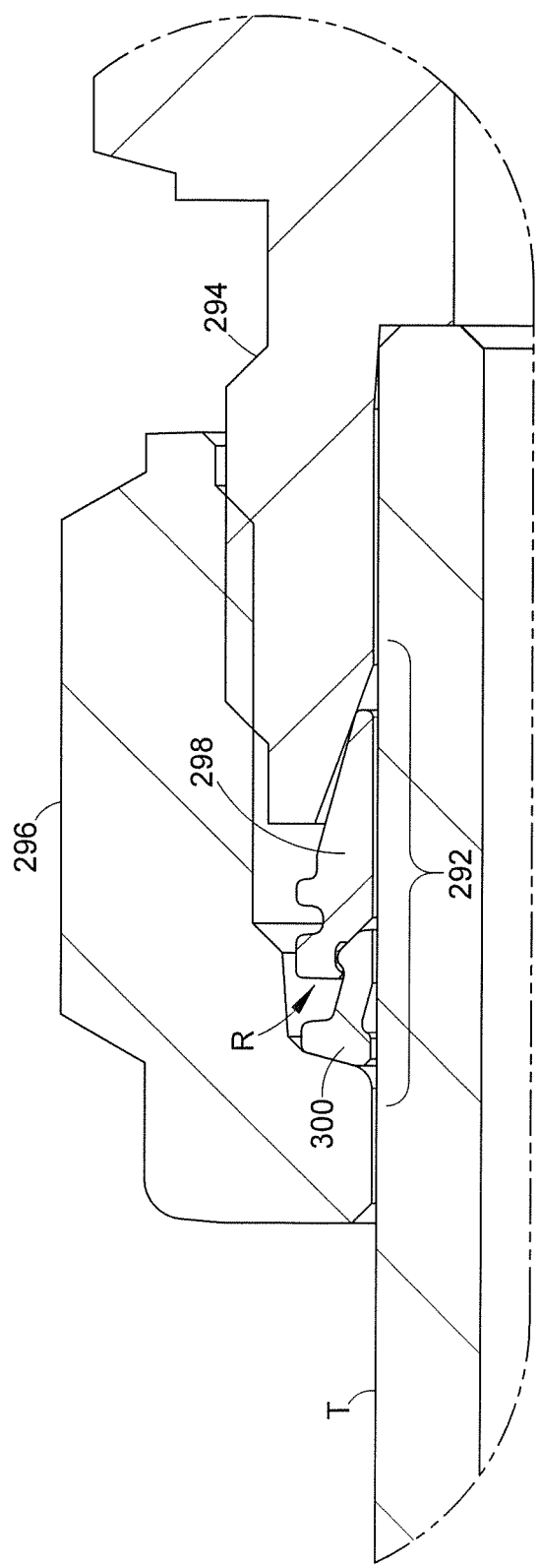

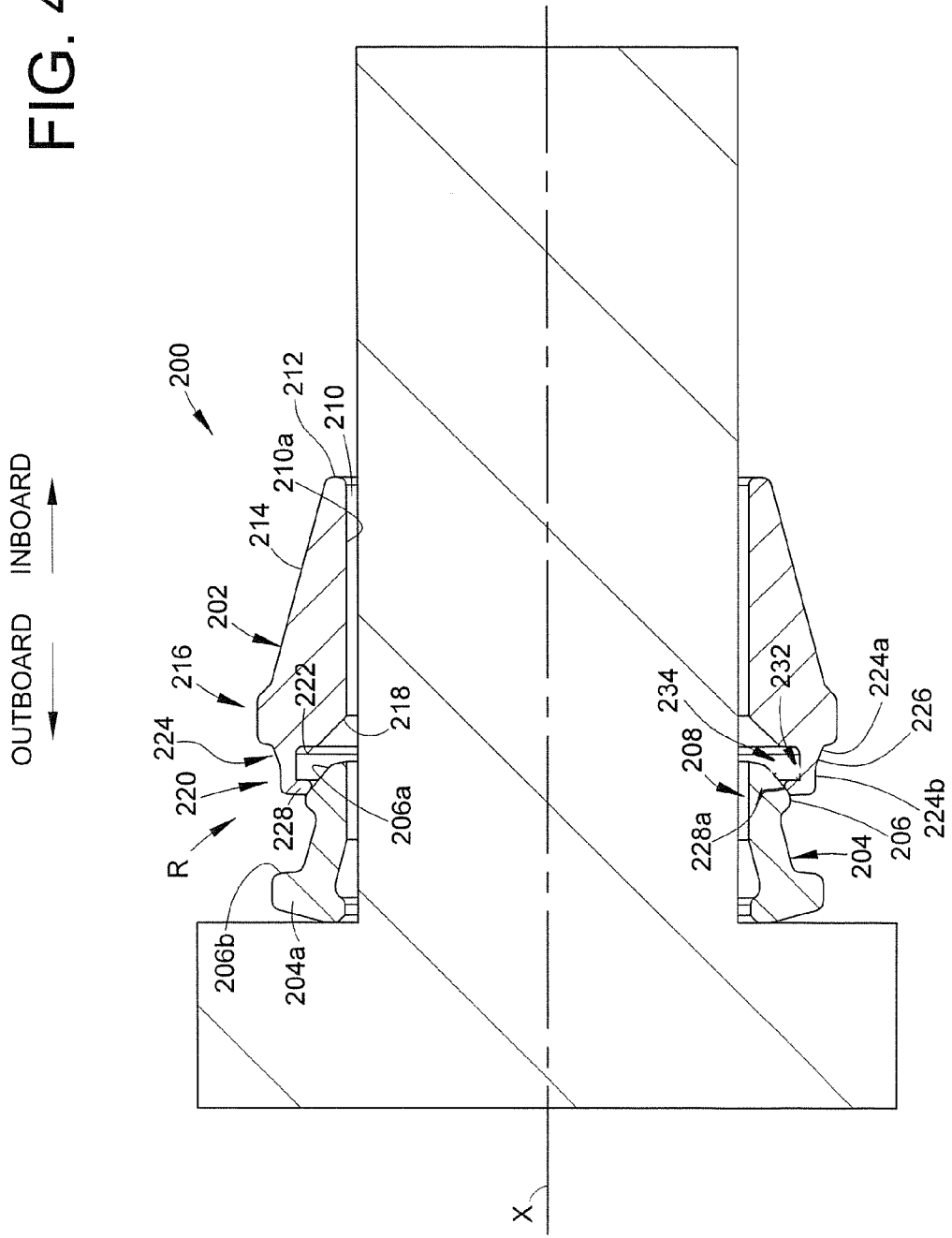

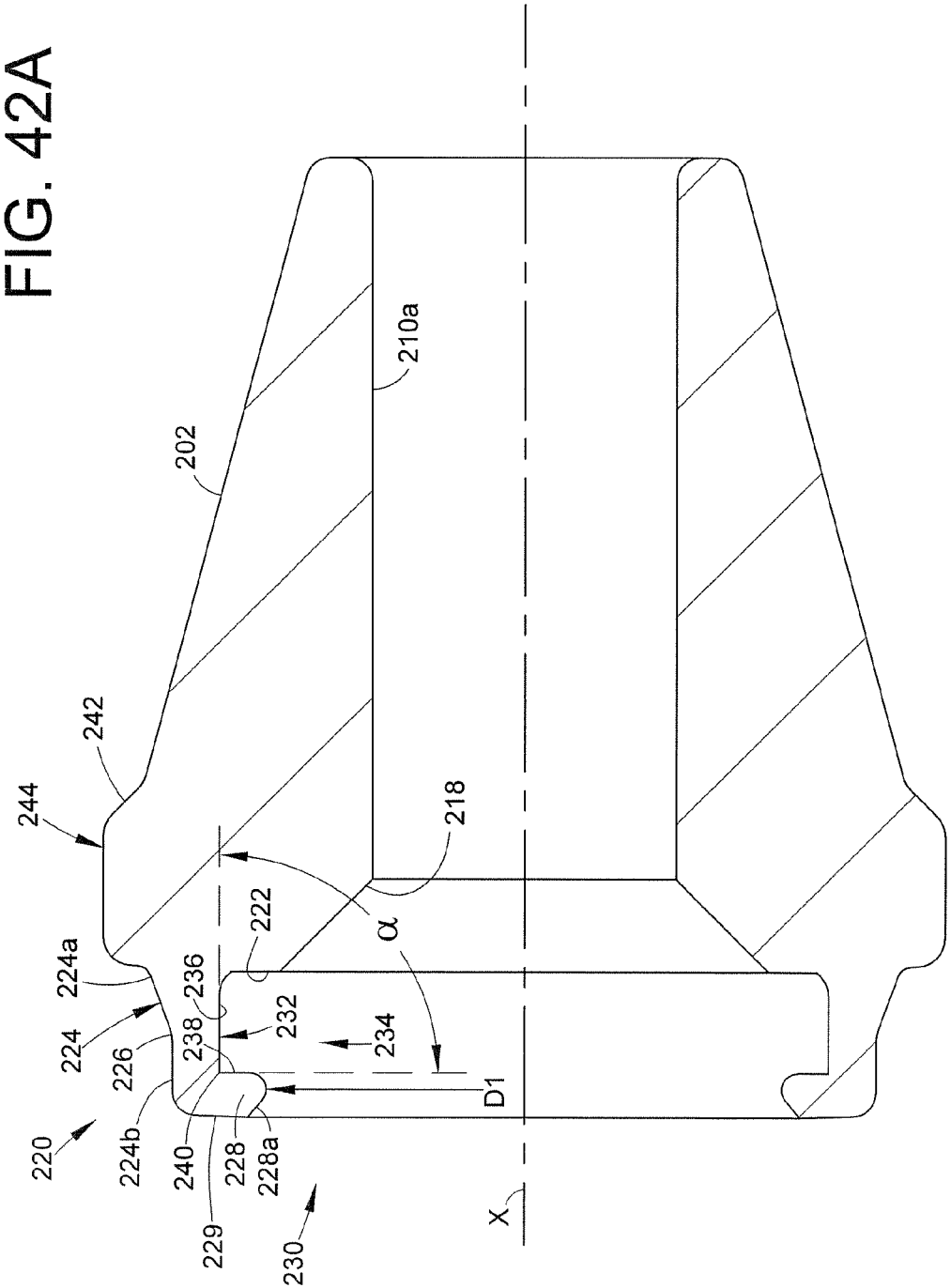

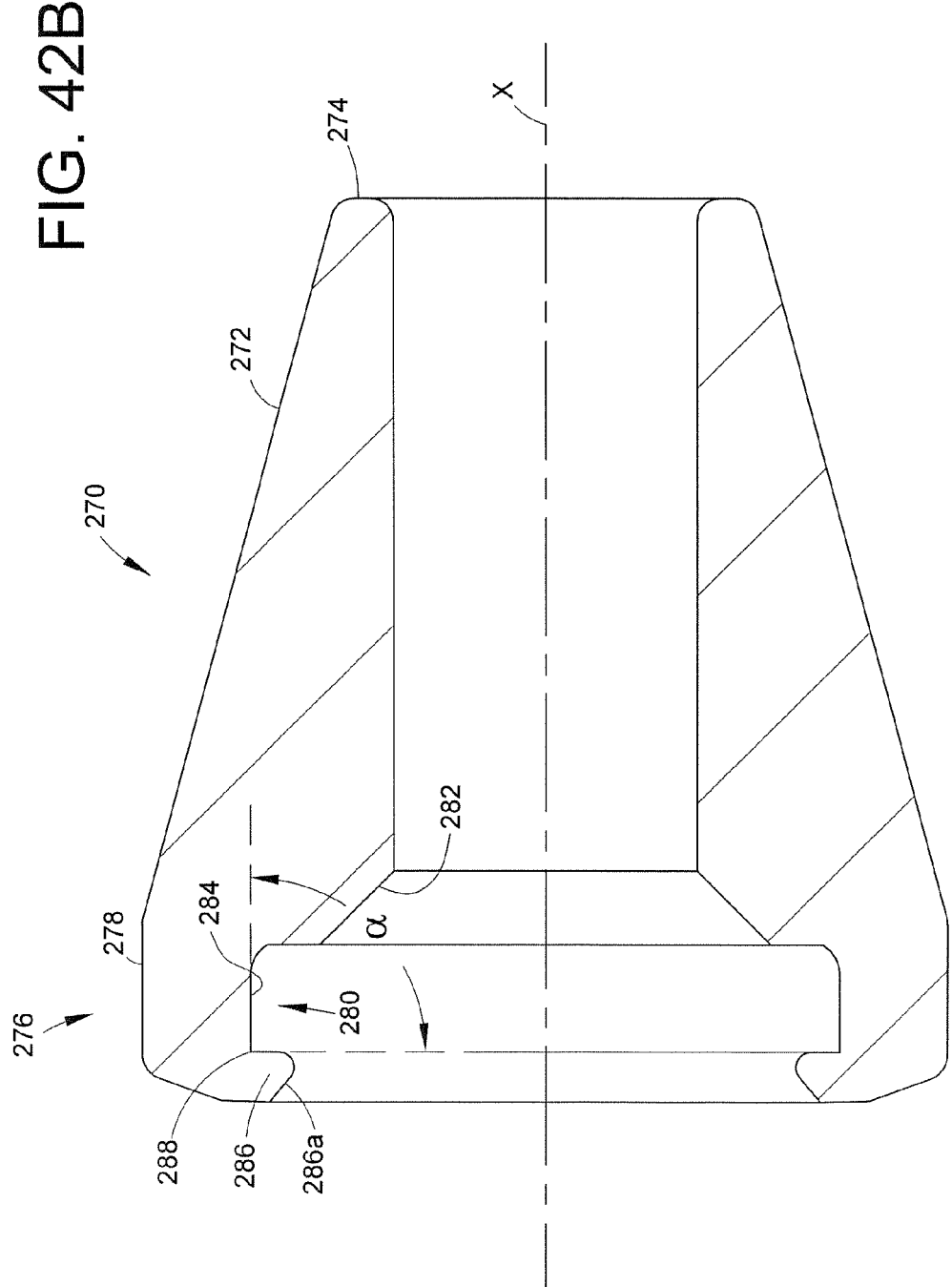

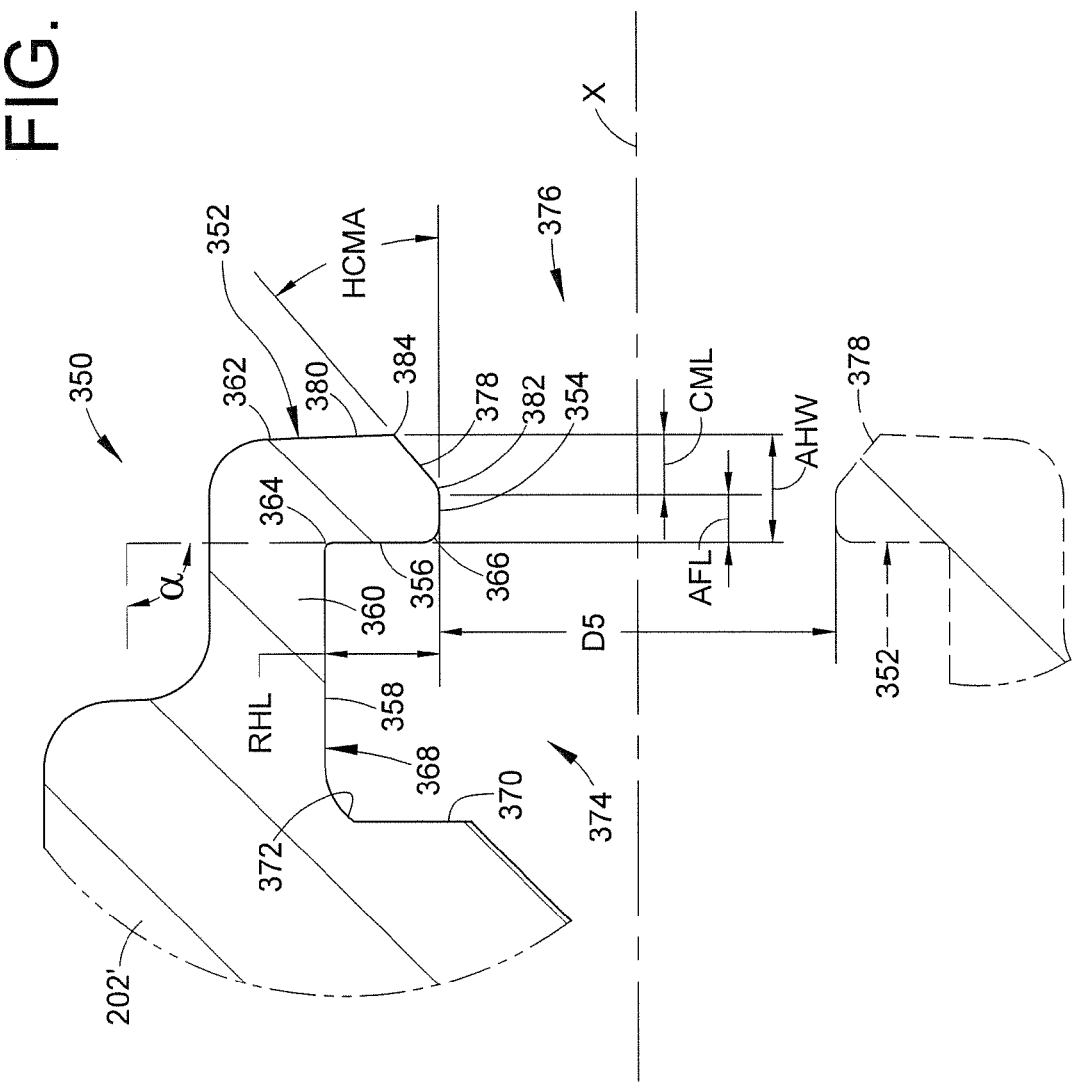

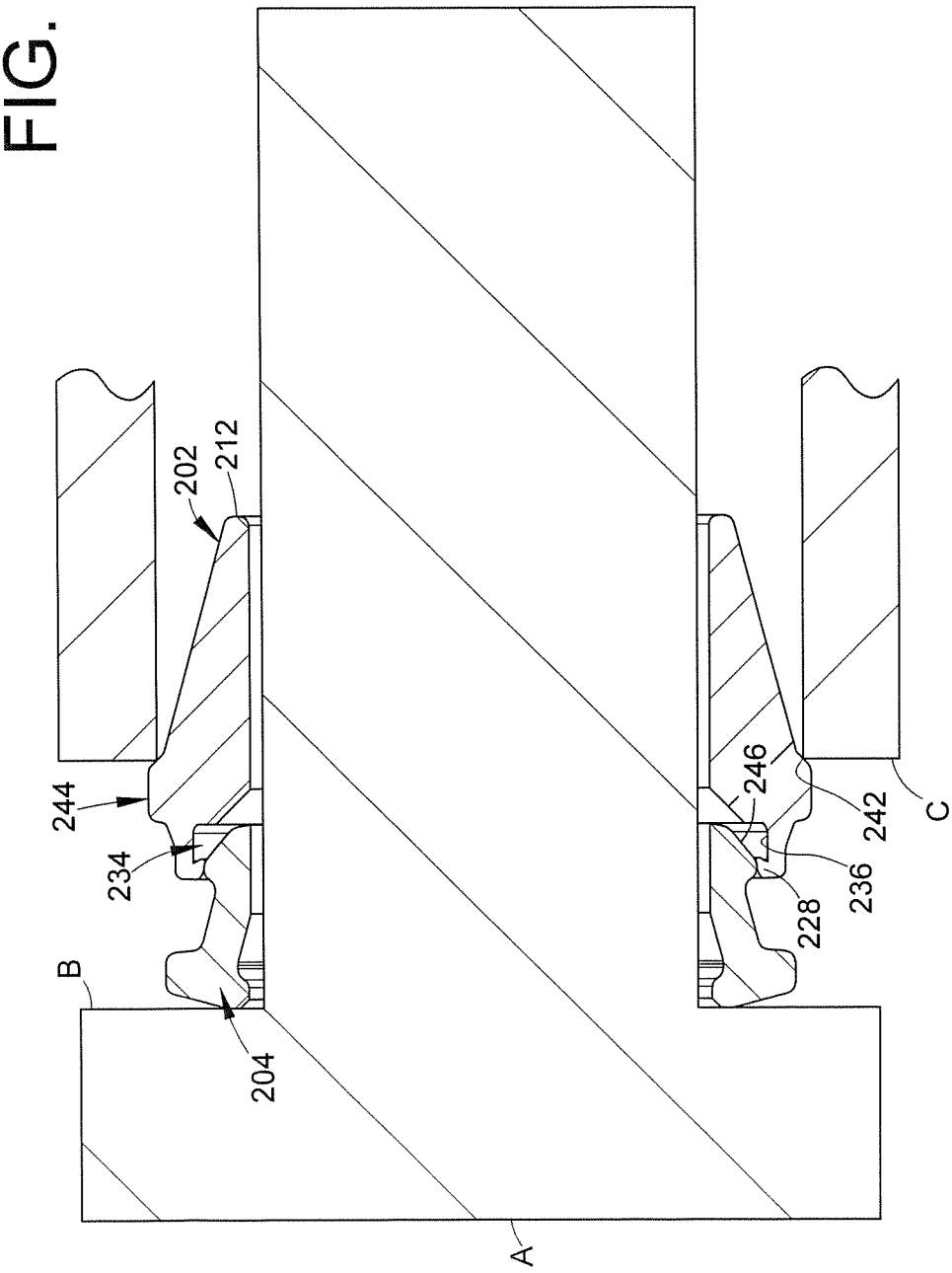

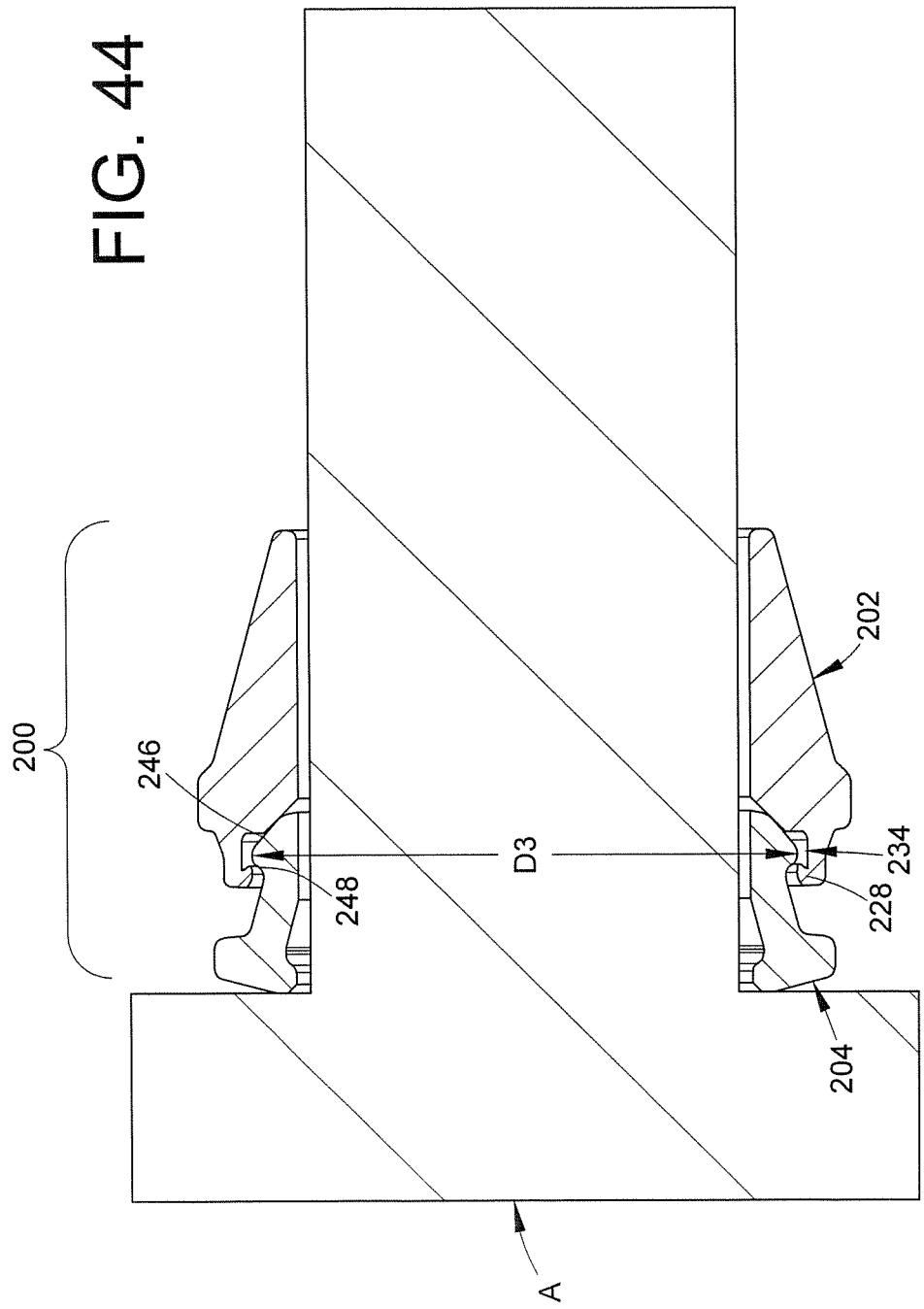

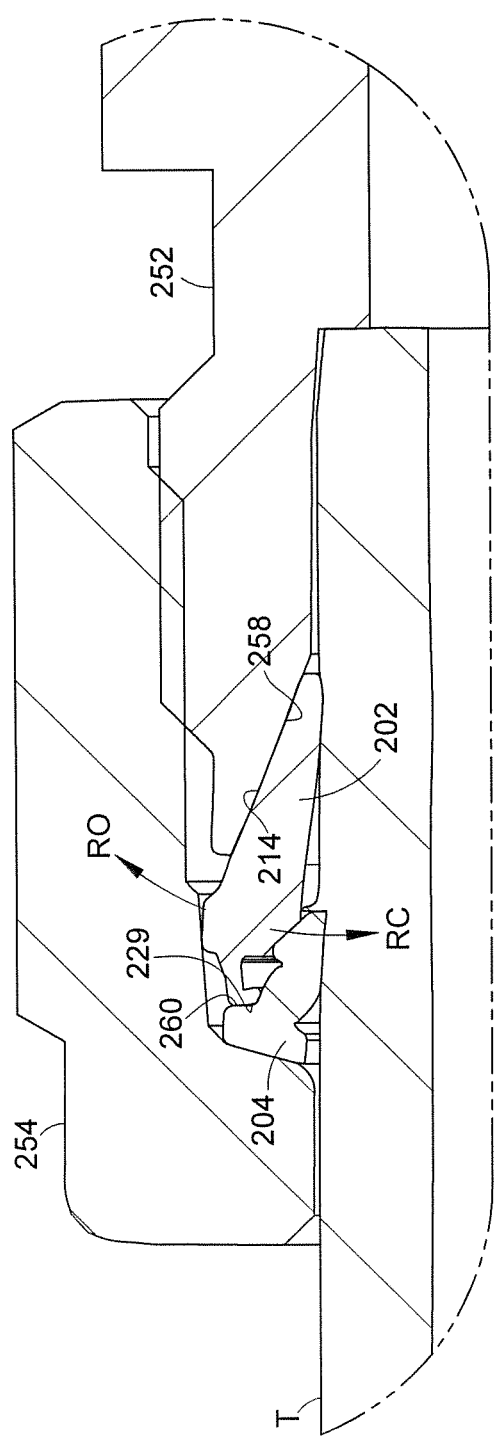

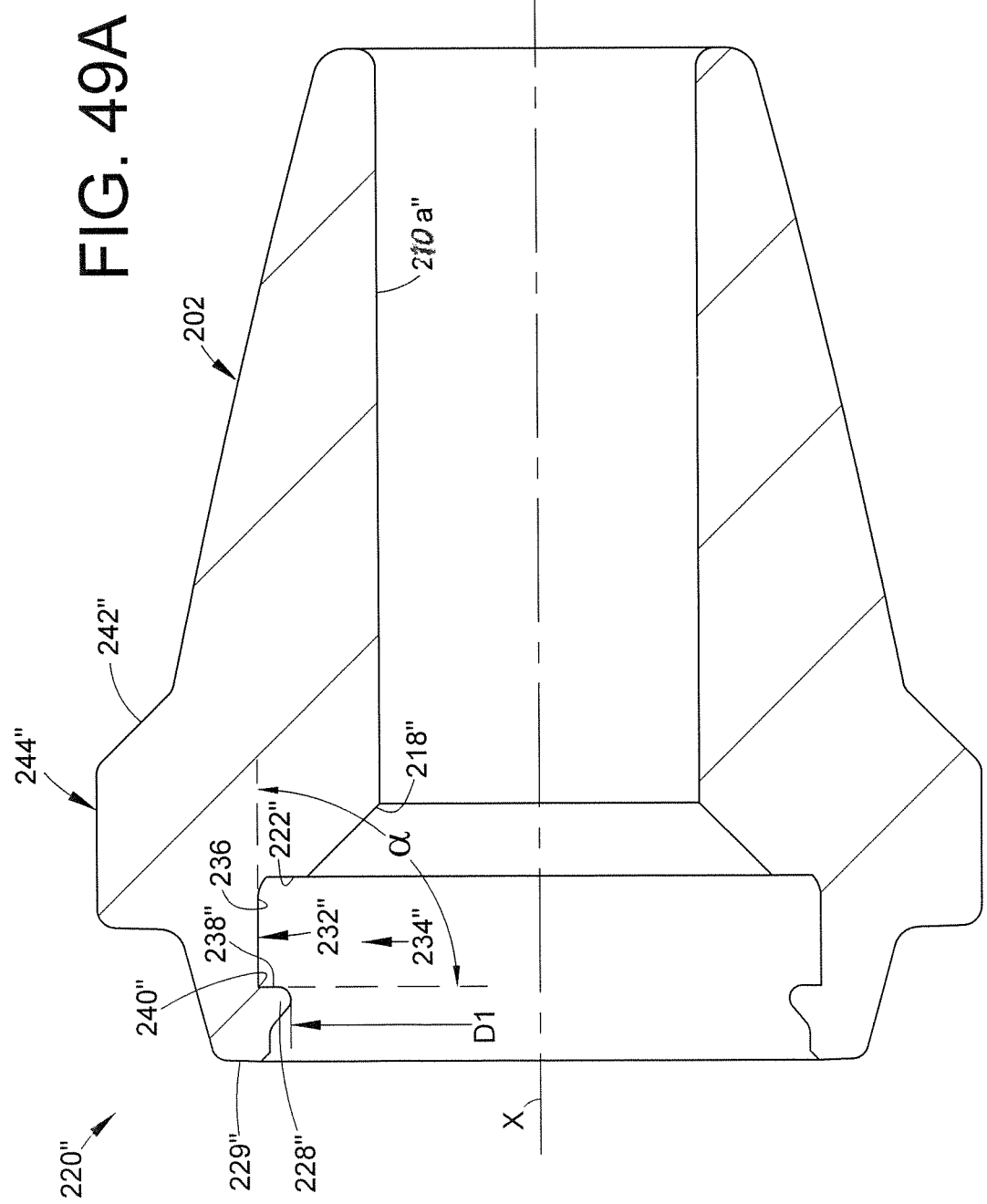

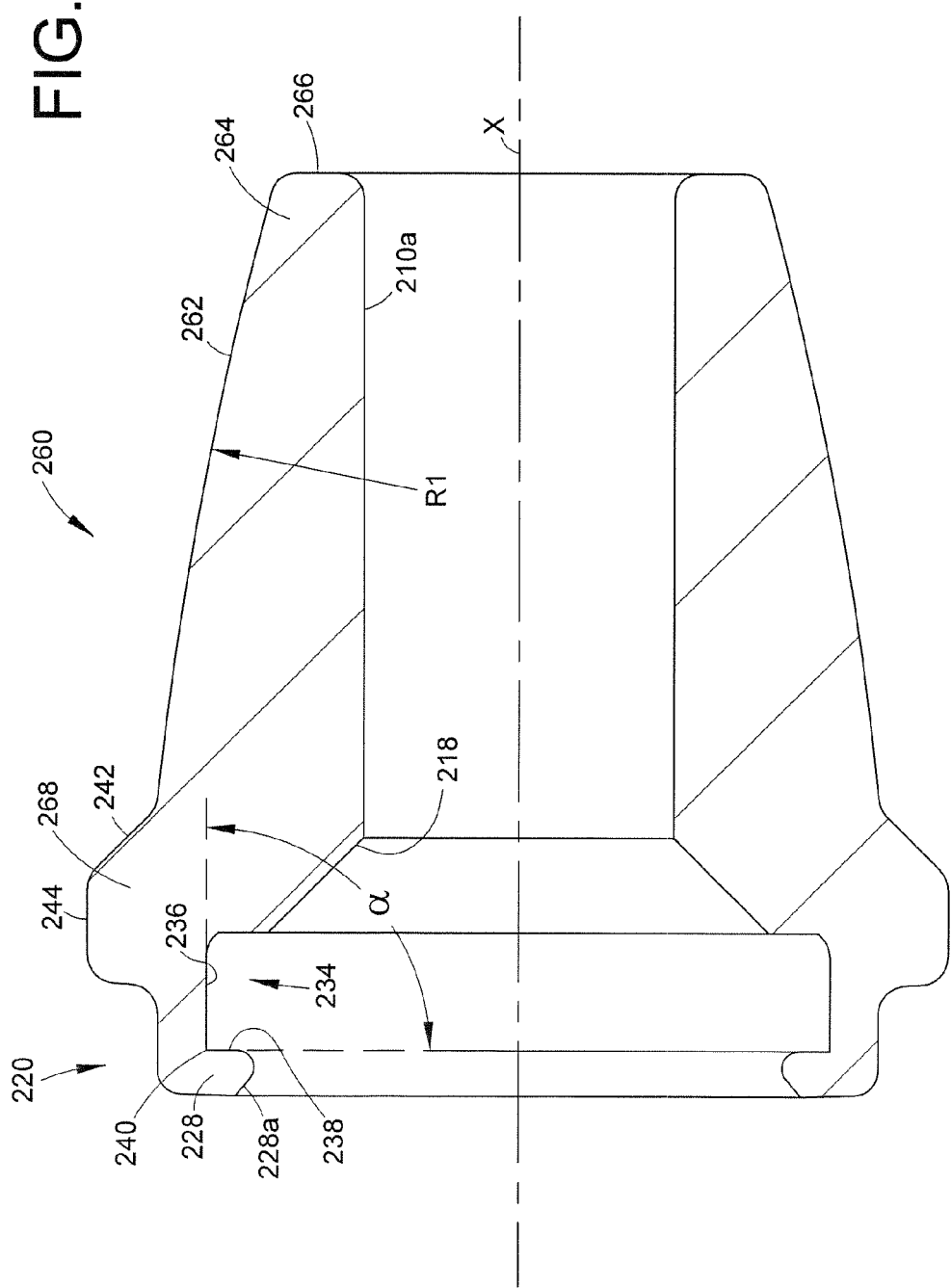

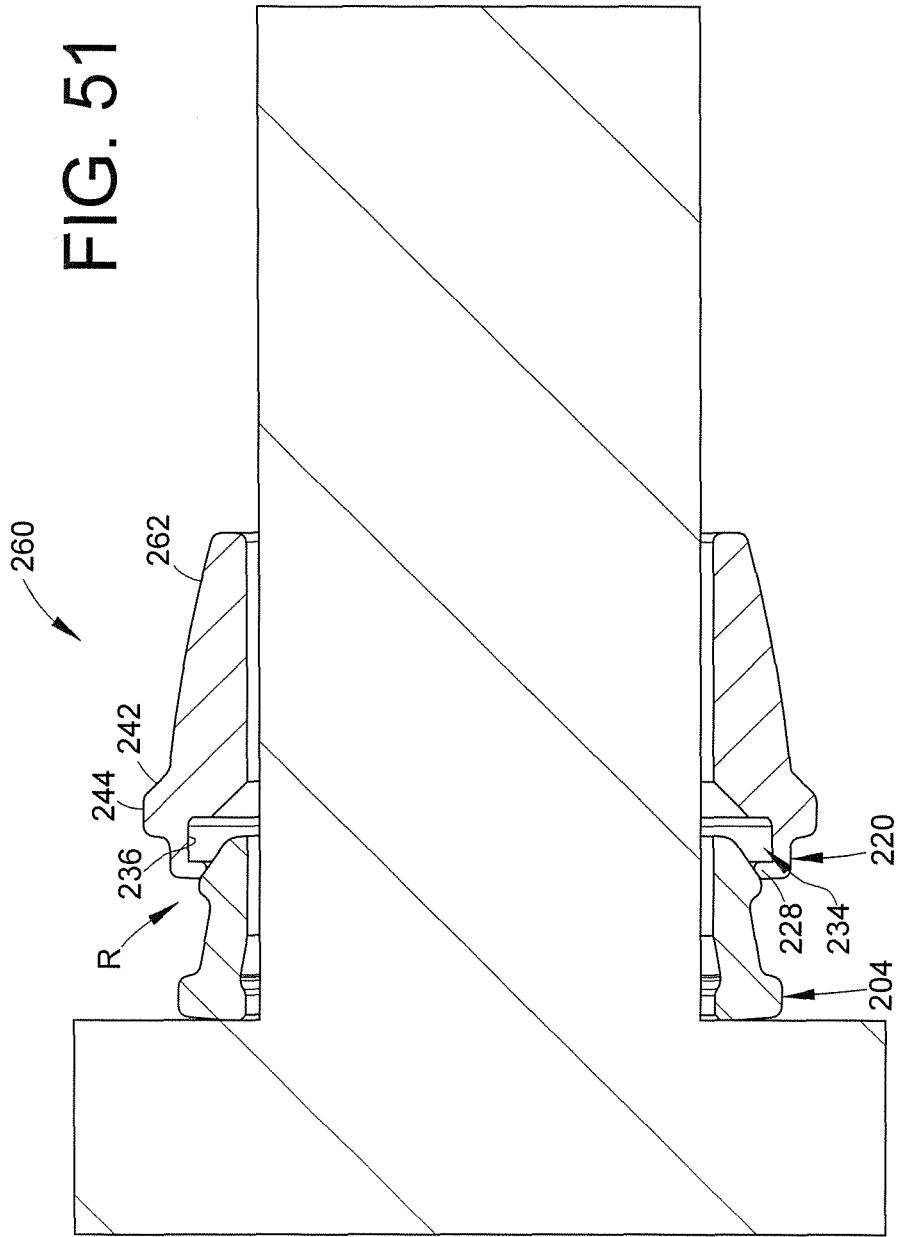

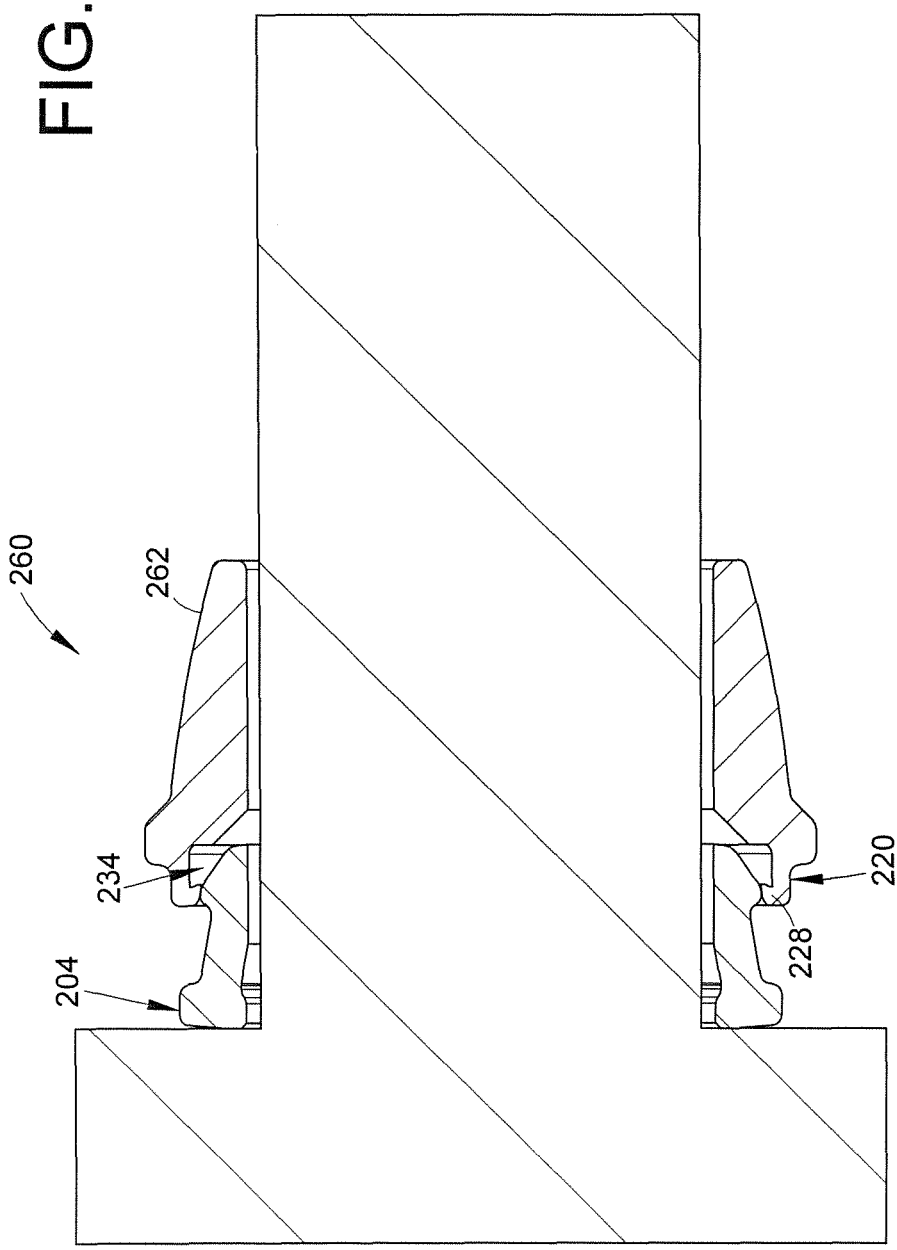

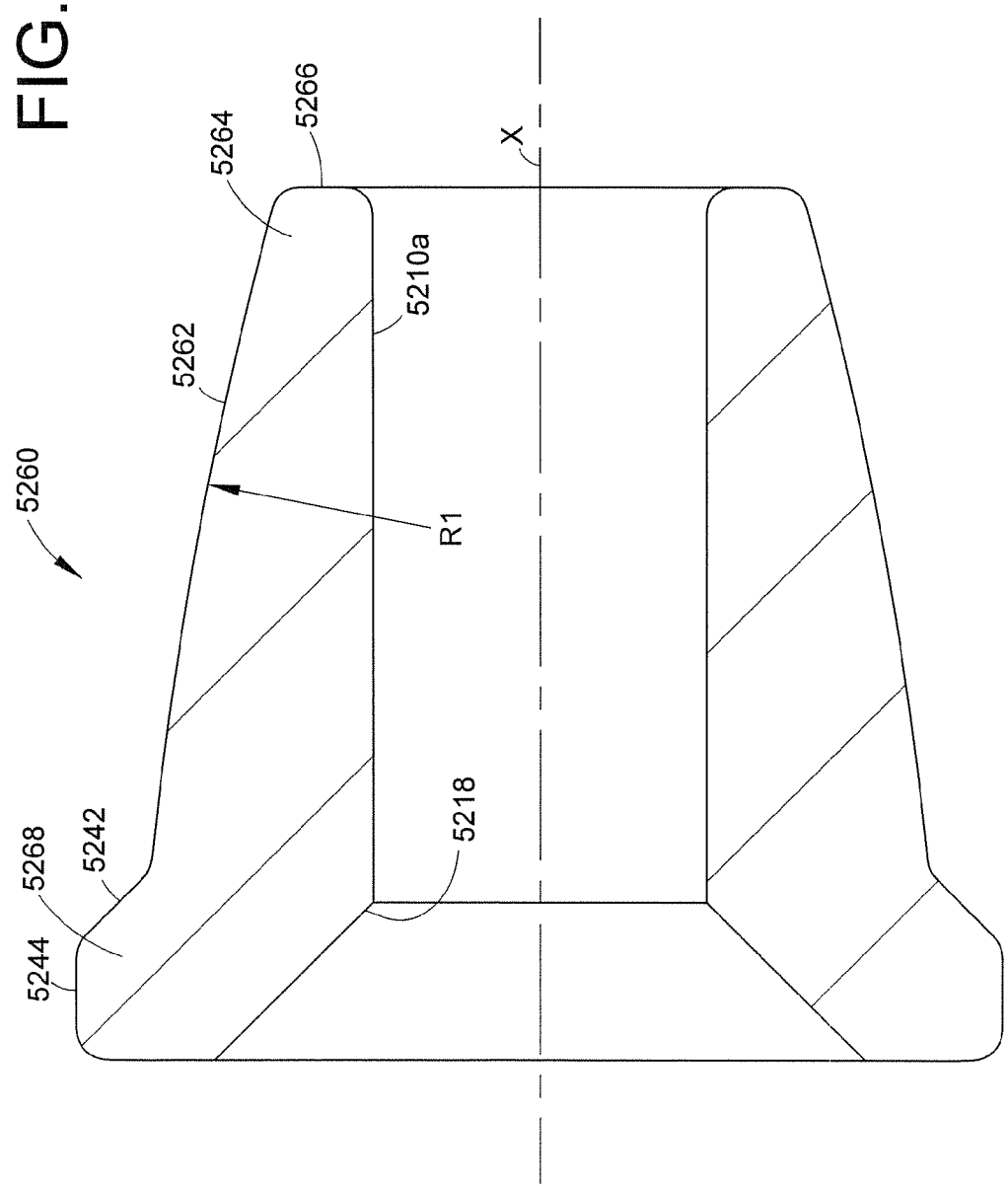

CONDUIT FITTING WITH COMPONENTS ADAPTED FOR FACILITATING ASSEMBLY

CROSS-REFERENCE TO RELATED APPLICATIONS

This application claims priority to and all benefit of U.S. Provisional Patent Application Ser. No. 61/990,822, filed on May 9, 2014, for FERRULE CARTRIDGE ASSEMBLY FOR CONDUIT FITTING, U.S. Provisional Patent Application Ser. No. 61/990,823, filed on May 9, 2014, for CONDUIT FITTING WITH TORQUE COLLAR INTEGRAL WITH NUT AND OPTIONAL CARTRIDGE FERRULES, and U.S. Provisional Patent Application Ser. No. 62/007,441, filed on Jun. 4, 2014, for CONDUIT FITTING WITH ASSEMBLY BY TORQUE USING FERRULES, the entire disclosures of each of which are fully incorporated herein by reference.

TECHNICAL FIELD OF THE INVENTIONS

The present disclosure relates to fittings for metal conduits such as metal tube and pipe. More particularly, the disclosure relates to fittings that provide conduit grip and seal by tightening together mating threaded fitting components. One example of a conduit fitting is a flareless fitting that uses one or more conduit gripping devices to establish conduit grip and seal.

BACKGROUND OF THE DISCLOSURE

Conduit fittings are used in gas or liquid fluid systems to provide a fluid tight mechanical connection between a conduit and another fluid flow device, such as another conduit, a flow control device such as a valve or regulator, a port and so on. A particular type of conduit fitting commonly used is known as a flareless fitting that uses one or more conduit gripping devices such as ferrules, for example, to provide the grip and seal functions. Such fittings are popular as they do not require much preparation of the conduit end, other than squaring off and de-burring. We use the term "fitting" herein as a shorthand reference to a conduit fitting, such as a tube or pipe fitting, for example.

Other fittings, however, will be of interest for use with the present inventions, including any fitting design that is assembled by tightening together two mating threaded fitting components.

A conventional ferrule type fitting is pulled-up by turns, meaning that the threadably mating fitting components are tightened together a specified number of relative turns and partial relative turns with respect to each other past a reference position. The reference position is often a finger tight position. By controlling the number of turns and partial turns past the finger tight position, the relative stroke or axial advance of the fitting components together may be controlled to assure that the ferrules effectively grip and seal the conduit. Oftentimes, such fittings are loosened for various repair and maintenance activities in the fluid system, and then the loosened fitting is re-tightened, commonly referred to as "remake" or "remaking" the fitting. Such remakes may be done with the same fitting components and ferrules, or sometimes one or more parts are replaced.

SUMMARY OF THE DISCLOSURE

An exemplary inventive concept provides a stroke resisting member that is associated with a threaded fitting component for conduit. In an embodiment, the stroke resisting member may be formed integral with the threaded fitting component to provide a one piece or unitary part. The stroke resisting member comprises a structure that deforms when the stroke resisting member is axially loaded or compressed. Additional embodiments are disclosed herein.

Another exemplary inventive concept provides a stroke resisting member that is associated with a threaded fitting component. In an embodiment, the stroke resisting member may be formed non-integral with the threaded fitting component to provide a two piece assembly. The stroke resisting member comprises a structure that deforms when the stroke resisting member is axially loaded or compressed. Additional embodiments are disclosed herein.

Another exemplary inventive concept provides a stroke resisting member that is associated with a threaded fitting component. In an embodiment, the stroke resisting member may be formed non-integral with the threaded fitting component to provide a two piece assembly, with the stroke resisting member being attachable or cartridged to the threaded fitting component. Additional embodiments are disclosed herein.

Another exemplary inventive concept provides a stroke resisting member that functions as a gauging feature, so that the stroke resisting member gauges the pull-up condition of a conduit fitting. In an embodiment, the stroke resisting member comprises a structure that deforms when the stroke resisting member is axially loaded or compressed. The stroke resisting member may be used to gauge an initial pull-up as well as pull-up for one or more remakes of the fitting. The gauging feature may be used for pull-up by torque, or turns, or both. The gauging feature may be used with threaded fittings and non-threaded fittings, and may be used with all metal fittings and fittings that are not all metal. Additional embodiments are disclosed herein.

Another exemplary inventive concept provides a threaded fitting component that is a first threaded fitting component that threadably mates with a second threaded fitting component, and a stroke resisting member, said stroke resisting member comprises a structure that plastically deforms when the stroke resisting member is loaded or compressed axially, the stroke resisting member having a first axial length at a first relative axial position between said first threaded fitting component and said second threaded fitting component, and a second axial length at a second relative axial position between said first threaded fitting component and said second threaded fitting component, wherein said first axial length and the second axial length are different. Additional embodiments are disclosed herein.

Another exemplary inventive concept that is presented herein provides a subassembly for a conduit fitting including first and second ferrules alignable relative to an axis. The first ferrule includes a camming surface at a back portion thereof, and the second ferrule includes a surface that contacts the camming surface when the first ferrule and the second ferrule are axially moved together along the axis. The subassembly further includes a retaining structure that retains the first ferrule and the second ferrule together as a subassembly, with the retaining structure including a member at a rearward portion of the first ferrule; the member including a wall that delimits a recess, with the second ferrule including a portion that is disposed in the recess. The wall includes a portion that is acute relative to the axis in a forward direction. Additional embodiments are disclosed herein.

Another exemplary inventive concept that is presented herein provides a ferrule including a unitary body with a bore therethrough along an axis, and a member that extends from a back portion of the body. The member includes a web and a hook, and a wall that forms part of the web and the hook, with the wall, the web and the hook delimiting a recess, and the hook and the web being joined by a portion of the wall that forms a hinge. The hook includes a camming surface extending rearward and radially outward from an axially extending radially inward end portion, the camming surface being angled with respect to the radially inward end portion. Additional embodiments are disclosed herein.

Another exemplary inventive concept that is presented herein provides a subassembly for a conduit fitting, including first and second ferrules alignable relative to an axis, and a retaining structure that retains the first ferrule and the second ferrule together as a subassembly. The retaining structure includes a member at a back portion of the first ferrule. The member includes a web, a hook, and a wall that forms part of the web and the hook and delimits a recess. The second ferrule includes a portion that is disposed in the recess. The wall includes a hinge or crease that joins the hook to the web, the wall further including a portion that is acute in a forward or inboard direction relative to the axis. Additional embodiments are disclosed herein.

Another exemplary inventive concept that is presented herein provides a subassembly for a conduit fitting, including first and second ferrules alignable relative to an axis, and a retaining structure that retains the first ferrule and the second ferrule together as a subassembly. The retaining structure includes a member at a back portion of the first ferrule, the member including a web, a hook, and a wall that forms part of the web and the hook and delimits a recess. The second ferrule includes a portion that is received in the recess when the first ferrule and the second ferrule are retained together. The wall includes a hinge or crease that joins the hook to the web, with the hook being deformed or bent in a forward or inboard direction relative to a radial line from the axis. Additional embodiments are disclosed herein.

Another exemplary inventive concept that is presented herein provides a method of cartridging first and second ferrules as a discontinuous preassembly. In the exemplary method, a first ferrule is provided having a rearward extending retaining member defining an inner radial recess, with the retaining member including a radially inward extension defining a rearward facing camming surface. A second ferrule is aligned with the first ferrule along a common central axis. The second ferrule is axially pressed against the first ferrule such that a radially outward projection of the second ferrule engages the camming surface of the retaining member to axially deform and radially expand the radially inward extension, thereby receiving the second ferrule projection in the inner radial recess. At least one of the axial deformation and the radial expansion of the radially inward extension is at least partially elastic, such that the radially inward extension snaps into a second ferrule retaining condition after the second ferrule projection is received in the inner radial recess. Additional embodiments are disclosed herein.

Another exemplary inventive concept that is presented herein provides a ferrule including a unitary body with a bore therethrough along an axis and a member that extends from a back portion of the body. The member includes a web and a radially inward extension together defining an inner radial recess, and a radially outward flange separated from the back portion of the body by the web. Additional embodiments are disclosed herein.

Another exemplary inventive concept that is presented herein provides a fitting including first and second threaded fitting components and first and second conduit gripping devices. When the fitting is pulled-up on a conduit the first fitting component and the second fitting component can be joined together to a first relative axial position of the first fitting component and the second fitting component to effect conduit grip and seal at a first relative axial position, with a rear surface of the first conduit gripping device engaging a front surface of the second conduit gripping device. At least one of the first conduit gripping device and the second conduit gripping device comprises a stroke resisting member axially engaging a bearing surface of the other of the first conduit gripping device and the second conduit gripping device at a location spaced apart from the rear surface first conduit gripping device and the front surface of the second conduit gripping device when the first and second fitting components are joined together to the first relative axial position, such that a tightening torque beyond the first relative axial position is increased by the axial engagement. The stroke resisting member is plastically axially compressed when the first and second fitting components are joined together to a second relative axial position advanced beyond the first relative axial position. Additional embodiments are disclosed herein.

Another exemplary inventive concept that is presented herein provides a ferrule set including a first ferrule having a stroke resisting member extending axially rearward from a back portion of the first ferrule, and a second ferrule having a radially extending outer flange portion. A majority of the outer flange portion is radially aligned with a majority of a rearmost end surface of the stroke resisting member when the first and second ferrules are aligned about a common central axis. Additional embodiments are disclosed herein.

Another exemplary inventive concept that is presented herein provides a fitting including a first fitting component and a second fitting component that can be joined to said first fitting component to form a fitting assembly, and a ferrule receivable between the first fitting component and the second fitting component. The ferrule includes a forward portion that engages a tapered camming surface of the first fitting component, and a contoured surface extending rearward from the forward portion at a continuous rearward declining angle with respect to the forward portion. Additional embodiments are disclosed herein.

Another exemplary inventive concept that is presented herein provides a ferrule including a forward frustoconical portion, a contoured surface extending rearward from the forward portion at a continuous rearward declining angle with respect to the forward portion, and a rear flange portion extending radially outward of the contoured surface. Additional embodiments are disclosed herein.

These and other embodiments of various inventions disclosed herein will be understood by those skilled in the art in view of the accompanying drawings.

BRIEF DESCRIPTION OF THE DRAWINGS

FIGS. 4-6A illustrate in perspective, exploded perspective and in longitudinal cross-section respectively an embodiment of a conduit fitting with torque collar that includes a stroke resisting member;

FIG. 7 illustrates the conduit fitting of FIGS. 4-6A in a finger-tight position;

FIGS. 27-35B illustrate alternative embodiments of a stroke resisting member;

FIG. 36 is another embodiment of a pull-up by torque fitting in a finger-tight position;

FIG. 39 is another embodiment of a front ferrule;

FIGS. 40 and 41 illustrate a conduit fitting having a ferrule cartridge using a front ferrule of the type illustrated in FIG. 39;

FIG. 42 illustrates an embodiment of a ferrule cartridge with a tool for cartridge assembly, shown prior to cartridging;

FIG. 42A is an enlarged view of a front ferrule as presented in the embodiment of FIG. 42, shown in half longitudinal cross-section and prior to cartridging;

FIG. 42B is another embodiment of a front ferrule, shown in half longitudinal cross-section and prior to cartridging;

FIG. 42C illustrates geometric relationships for a member that may be part of a retaining structure for a ferrule cartridge;

FIG. 43 illustrates the ferrule cartridge of FIG. 42 and cartridging process during cartridging;

FIG. 44 illustrates the ferrule cartridge of FIG. 42 after cartridging;

FIG. 49A is another embodiment of a front ferrule, shown in half longitudinal cross-section and prior to cartridging;

FIG. 50 is an alternative embodiment of a front ferrule;

FIGS. 51-53 show a cartridging process comparable to FIGS. 43-45 for a ferrule cartridge that includes the front ferrule of FIG. 50;

FIG. 61 illustrates another embodiment of a front ferrule.

DESCRIPTION OF THE EXEMPLARY EMBODIMENTS

Figure 1:
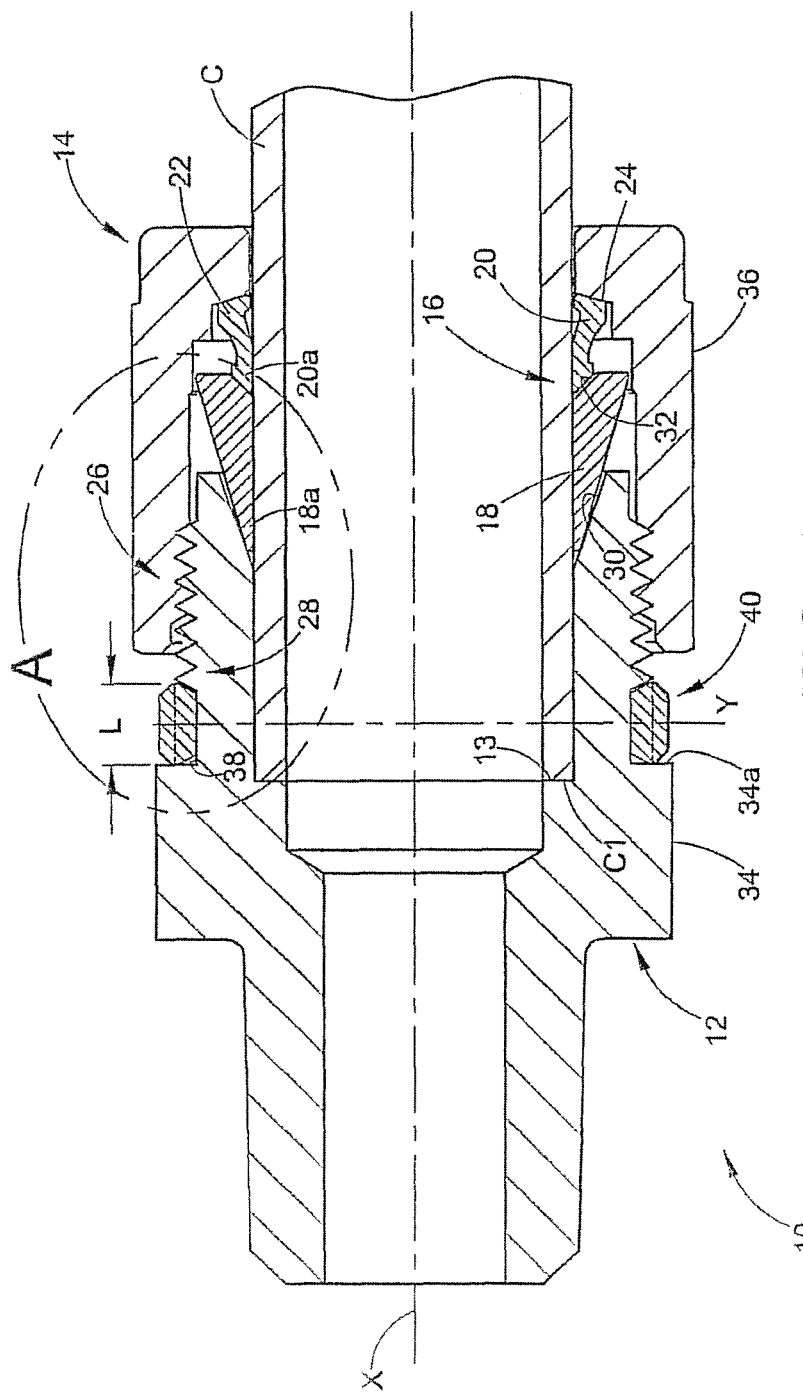
FIG. 1 is an embodiment of a conduit fitting illustrating one embodiment of one or more of the inventions herein, shown in longitudinal cross-section and in a finger tight position.

Although the exemplary embodiments herein are presented in the context of a stainless steel tube fitting, the inventions herein are not limited to such applications, and will find use with many different metal conduits such as tube and pipe as well as different materials other than 316 stainless steel, and may also be used for liquid or gas fluids. Although the inventions herein are illustrated with respect to exemplary design of the conduit gripping devices and fitting components, the inventions are not limited to use with such designs, and will find application in many different fitting designs that use one or more conduit gripping devices. In some fittings, in addition to the conduit gripping devices there may be one or more additional parts, for example seals. The inventions may be used with tube or pipe, so we use the term "conduit" to include tube or pipe or both. We generally use the terms "fitting assembly," "conduit fitting" and "fitting" interchangeably as a shorthand reference to an assembly of typically first and second fitting components along with one or more conduit gripping devices. The concept of a "fitting assembly" thus may include assembly of the parts onto a conduit, either in a finger-tight, partial or complete pull-up position; but the term "fitting assembly" is also intended to include an assembly of parts together without a conduit, for example for shipping or handling, as well as the constituent parts themselves even if not assembled together. Fittings typically include two fitting components that are joined together, and one or more gripping devices, however, the inventions herein may be used with fittings that include additional pieces and parts. For example, a union fitting may include a body and two nuts.

The term "complete pull-up" as used herein refers to joining the fitting components together so as to cause the one or more conduit gripping devices to deform, usually but not necessarily plastically deform, to create a fluid tight seal and grip of a fitting assembly on a conduit. The conduit in many cases may also be plastically deformed during pull-up. A partial pull-up as used herein refers to a partial but sufficient tightening of the male and female fitting components together so as to cause the conduit gripping device or devices to deform so as to be radially compressed against and thus attached to the conduit, but not necessarily having created a fluid tight connection or the required conduit grip that is achieved after a complete pull-up. The term "partial pull-up" thus may also be understood to include what is often referred to in the art as pre-swaging wherein a swaging tool is used to deform the ferrules onto the conduit sufficiently so that the ferrules and the nut are retained on the conduit prior to being mated with the second fitting component to form a fitting assembly. A finger tight position or condition refers to the fitting components and conduit gripping devices being loosely assembled onto the conduit to an abutting position where the conduit gripping devices are in axial contact with and between the male and female fitting components, but without any significant tightening of the male and female fitting components together, usually typified by the conduit gripping device or devices not undergoing plastic deformation. We also refer to an initial or first pull-up or make-up to refer to the first time that a fitting is tightened to a complete pulled-up position, meaning that the ferrules and conduit had not been previously deformed. A subsequent pull-up or remake refers to any complete pull-up after a previous pull-up, whether that previous pull-up was the initial pull-up or a later pull-up or remake of the fitting.

We also use the term "fitting remake" and derivative terms herein to refer to a fitting assembly that has been at least once tightened or completely pulled-up, loosened, and then re-tightened to another completely pulled-up position. Effective remakes may be done with the same fitting assembly parts (e.g. nut, body, ferrules), for example, or may involve the replacement of one of more of the parts of the fitting assembly. An effective pull-up or remake or an effectively pulled-up or remade fitting as used herein is one that is effectively tightened (or re-tightened) to establish a mechanically attached connection with a conduit using the same or in some cases one or more replaced fitting parts, without adverse effects on fitting performance as to fluid tight seal and grip. In other words, an effective remake as used herein means a remake in which the fitting performance is not compromised or altered from its original performance criteria, specification or rating (for example, will achieve the same pressure rating upon remake within the allowed number of remakes as may be specified by the manufacturer). When we use the term remake in the context of the various embodiments and inventions herein, we are referring to effective remakes. We use the terms "effective remake" and "reliable remake" interchangeably herein. Reference herein to "outboard" and "inboard" are for convenience and simply refer to whether a direction is axially towards the center of a fitting (inboard) or away from the center (outboard).

We also use the term "flexible" herein to mean a structural characteristic of a member so that the member can deform, strain, bend, deflect, elongate or otherwise move or shift under load without fracturing or breaking. This flexible deformation may accompany a strain induced hardening. This flexible deformation may also accompany a permanent set or plastic deformation or may be a plastic deformation with an attendant elastic deformation, but at least some degree of plastic deformation is preferred to facilitate remakes. Further, the relative elastic and plastic deformations may be influenced or controlled by one or more of a strain hardening of the material from which the member is subsequently fabricated, a heat treated metallurgical or precipitation hardening of the material, and a low temperature interstitial case hardening of the member after fabrication.

When two threaded parts are tightened together to pull-up a fitting, turns and torque are related factors and applicable to the tightening process. For a tube or pipe fitting, this follows from the fact that when the threaded fitting components such as a nut and body are tightened together, the ferrule or ferrules undergo a plastic deformation and also in most cases plastically deform the conduit, and in many designs also can involve cutting into the exterior surface of the conduit or swaging the exterior surface of the conduit. These deformations, along with engaging threads and other metal to metal contact within the fitting, necessarily result in an increasing torque as the nut and body are tightened. But, in many prior known fitting designs, there is not necessarily a repeatable and reliable association between pull-up torque and the number of turns it takes past finger tight position to reach the completed pull-up position. Even for high quality high performance fittings such as available from Swagelok Company, pulling up by torque or feel requires experienced assemblers and the fittings are only recommended to be pulled-up by turns. This is in part due to the fact that for such high quality fittings one of the design goals is to reduce pull-up torque and to prevent galling and other torque related issues, thereby further reducing the noticeable effects of torque at the complete pull-up position even to a highly experienced assembler.

For purposes of this disclosure, however, in the context of pulling up or making up a fitting by tightening together two threaded fitting components (for example, a nut and a body), pull-up "by torque" means tightening the parts together using a prescribed or predetermined or minimum torque without requiring a count of the number of relative turns and partial turns. The torque may be a distinct or precise torque value or the prescribed or predetermined or minimum torque may be a range of torque values. The predetermined torque may be any range of torque values, depending on the application. In one exemplary embodiment, the predetermined torque is any torque at or above a predetermined torque that either ensures that the fitting is properly pulled-up to grip and seal the conduit, or that effects relative axial displacement of the fitting components that corresponds to the desired number of turns and partial turns past the reference position, or both. In another embodiment, the predetermined torque may be a predetermined torque +/− an acceptable tolerance. For example, the prescribed or predetermined torque may be a torque value +/−0 to 15% of a torque value, such as +/−10% of the torque value or +/−15% of the torque value or any range within +/−15% of the torque value. A pull-up "by turns" means tightening the parts together using a prescribed or desired number of relative turns and/or partial turns past a reference position without requiring a predetermined torque. Pull-up by torque and pull-up by turns are used in association with both initial pull-up and remakes as further explained below.

We therefore provide, in an exemplary aspect of the present application, a flexible member, for example a stroke resisting member or load bearing member, having a surface that engages another surface of the fitting assembly during relative axial displacement of the threaded fitting components during pull-up. These engaging surfaces preferably do not engage at the reference position but initially engage after additional relative axial displacement past the reference position. This is preferably the case for the first pull-up that a fitting undergoes. These engaging surfaces initially engage each other preferably to either coincide with or closely correspond to the relative axial displacement of the threaded fitting components that may be associated with the number of turns and partial turns past finger tight position for complete pull-up had the fitting been pulled-up alternatively by turns. In this way, a fitting can be optionally pulled-up by turns, by torque or both. Depending on the applications and criticality of the pull-up process, we do not require that in all situations that the surfaces engage precisely at the point of the prescribed relative axial displacement past the reference position. However, for repeatable and reliable pull-ups, it is preferred that the surfaces engage in close alignment with the corresponding relative axial displacement used for pull-up by turns. In other words, it is preferred but not required in all cases that the surfaces engage or make contact with each other upon tightening of the fitting components to a relative axial displacement that closely aligns with the prescribed number of turns and partial turns past the reference position. In this manner also, the amount of stroke used during any pull-up may be controlled so as to maximize or optimize the number of useful remakes of the fitting.

In the exemplary embodiments, when the surface of the flexible member engages the other surface of the fitting assembly, the manual assembler preferably will sense a distinct increase in the torque required to continue tightening the fitting components together. But alternatively, when using a torque applying tool, such as a torque wrench, the tool may be used to effect the same pull-up although the assembler will not necessarily sense the torque increase.

The words "limiting" and "resisting" as used in connection with stroke herein are not intended to include the idea of a positive stop. Rather we use the terms stroke limiting and stroke resisting interchangeably to mean that the flexible member or torque collar resists relative axial displacement upon contact with the engaging surface, but does not prevent further axial advance. This is important because positive stops do not facilitate effective and reliable remakes. For example, stop collars typically are removed when a fitting is remade in order to allow reliable additional axial advance for remake.

Because we can optionally use the flexible member for multiple remakes, it is notable that for the very first pull-up of a fitting, meaning no other prior pull-up that deformed the conduit gripping device(s), the reference position is the initial finger tight position past which there is needed a number of full and/or partial turns (i.e. relative axial advance) to further advance the fitting components together to effect pull-up. But when comparing the very first pull-up with subsequent remakes, there is not the same degree of additional relative axial displacement or stroke needed to assure grip and seal. In other words, each remake typically involves only a smaller additional partial turn past the reference position. The reference position for a remake is the position that the components were at after the last pull-up. This prior pull-up position (the remake reference position) tends to be at a position where the components, especially the conduit gripping devices, have already taken a set but also may have experienced a bit of elastic spring back or relaxation. In the context of the flexible member used for pull-up by torque, for each remake the engaging surfaces may actually be very close or even touch at the remake reference position, but the flexible member will still allow further axial advance to effect the remake of the fitting. Therefore, the idea of the engaging surfaces not contacting initially until additional relative axial displacement of the threaded fitting components, may only in practice apply to the very first pull-up that the fitting is subjected to, and not necessarily, although it may, for each remake. Particularly after a number of remakes, the conduit gripping devices become more and more set and fixed in position on the conduit so that later remakes involve possibly imperceptible further relative axial advance of the fitting components to effect conduit grip and seal.

Moreover, while the exemplary embodiments herein illustrate the flexible member surface and the engaged surface as engaging at the very first pull-up, such is not required in all cases. For example, the flexible member may be designed so that a desired torque can be used to effect the initial pull-up, but that the surfaces do not engage until the first or subsequent pull-up.

As will be further described hereinbelow, the flexible member may also provide the capability for an intrinsic gauging function associated with the fitting assembly. By intrinsic we mean that the fitting assembly self-contains or inherently or integrally includes the gauging function without necessarily the need for an external tool, although the use of an external tool may also be facilitated for different embodiments. Because the flexible member presents a repeatable and reliable relationship between pull-up by torque and relative axial displacement (relative turns past the reference position), the gauging feature may be used for not only gauging initial pull-up by torque but also initial pull-up by turns. Moreover, the flexible member facilitates a gauging function and structure, intrinsic or otherwise, that can be used for gauging remakes by torque or turns.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

We note at the outset that as described in detail hereinabove, the ability to successfully remake a conduit fitting by torque or turns, particularly for a number of remakes, requires the ability to provide incremental relative axial stroke or advance of the nut and body. This incremental relative axial stroke decreases or decrements with each additional remake and with sufficient remakes can become almost imperceptible. This can be attributed to the ferrules in particular being more and more fixed in position and alignment so that as the number of remakes increases it takes less stroke to return the ferrules to a proper position for conduit grip and seal. The additional relative axial stroke with each remake can be provided by plastic deformation of a number of different components and structural features of the fitting, either alone or in various combinations, however, one of the advantages of using a stroke limiting or stroke resisting arrangement, such as a torque collar—whether integral or as a separate part—is that the additional relative axial stroke can be better controlled by using the torque collar to provide a controlled stroke resisting feature at a predetermined torque that corresponds to the predetermined axial displacement needed to effect proper conduit grip and seal. Stated another way, the stroke resisting arrangement provides a surface that initially engages another surface of the fitting assembly at a point of relative axial displacement of the threaded fitting components past the reference position (particularly but not necessarily only for the very first pull-up of a fitting) and that preferably aligns with or is closely associated with the desired relative axial displacement corresponding to a pull-up by turns. For example, the engaging surfaces may first contact each other at a relative axial displacement past the finger tight position of the threaded fitting components that aligns with about one and a quarter turns past finger tight position (for a fitting that can alternatively be pulled-up by turns by counting one and one quarter turns past finger tight position). The stroke resisting arrangement also presents a controllable plastic deformation and additional relative axial stroke or displacement between the nut and body for each remake, rather than having to rely on plastic deformation of a myriad of other possibilities.

Therefore we consider that the inventions herein may be realized in many forms, including but not limited to the use of a separate or integral torque collar to provide pull-up by torque, but if so desired alternatively pull-up by turns, or both, the geometry of a fitting component having a torque collar included therewith, integral or non-integral, and the use of a fitting component geometry that provides a gauging feature for a fitting that can be pulled-up by torque and also for a fitting that can be pulled-up by turns, with gauging for remakes as well as the first pull-up.

Several, but not all, embodiments of the inventions disclosed herein relate to providing a fitting for conduits that may be pulled-up by torque or optionally by turns. There are a number of different aspects to this concept. The exemplary embodiments herein disclose apparatus and methods for a fitting that may be pulled-up by turns, by torque or both. Advantageously, although not required, the fittings may be initially pulled-up by torque or turns and undergo numerous remakes by torque or by turns. Still further, these remakes may each be accomplished with the same torque value or range of predetermined torque values as the initial make up or prior remakes. As still another important aspect, apparatus and methods are provided by which a fitting that is designed to be pulled-up by turns may be adapted as taught herein to alternatively be pulled-up by torque.

As described herein, a fitting designer may select a predetermined torque that will achieve a leak-tight initial pull-up within whatever confidence level the manufacturer desires. Some manufacturers may want the predetermined torque to give a leak-free initial pull-up every time, others may want ninety-seven percent reliability, others maybe even less, to give some examples. Even if the predetermined torque does not produce 100% leak-free initial pull-up, the assembler can still further snug up the fitting a bit more if needed, while still allowing for a large number of remakes by torque. The predetermined torque may be selected to produce a reliable initial pull-up for any tolerance stack-up as desired. A stroke resisting feature is provided such that the feature is first engaged either at the initial pull-up or after one or more remakes, so as to limit the stroke used during remakes. This arrangement may facilitate many remakes even to the same predetermined torque value if so desired, even as many as fifty or more reliable remakes. The initial pull-up by torque may be selected so as to use the stroke needed to effect proper grip and seal, and optionally up to an optimized stroke beyond which successful reliable remakes can be achieved with small incremental axial advance, as controlled then by the stroke resisting feature.

For example, for a given one and a quarter turns fitting design population, assume 15 N-m (Newton meters) is a predetermined torque for initial pull-up a fitting having a high tolerance stack-up. That same 15 N-m torque will also pull-up a fitting at the low end of the tolerance stack-up, but would result in more than one and a quarter turns, maybe even two full turns or more. The torque limiting feature may be axially positioned so as to engage before such excessive stroke is consumed, and thus may but need not engage during the initial pull-up. For fittings near nominal or on the higher side of the tolerance stack-up, however, the torque limiting feature might not engage until the first, second or possibly even later remake. The torque limiting feature has thus permitted pull-up by torque to a predetermined torque for a fitting design population, while at the same time preventing over-tightening for low end tolerance stack-up assemblies, thereby facilitating many reliable remakes. The stroke resisting feature also provides a stroke controlled pull-up for each remake by torque, which also contributes to allowing many reliable remakes by torque.

Not all fittings from manufacturers will have similar torque to stroke characteristics. Some manufacturers may have looser tolerances on dimensions and material properties, while others may have very tight controls. Some fittings may be designed with torque reducing features such as the use of lubricants, or some fittings may be designed with softer materials for lower pressure applications. But regardless of the multitude of choices made for a fitting design, a predetermined torque may be selected to assure the proper stroke to achieve conduit grip and seal. This predetermined torque may optionally be set high enough that the stroke resisting feature will engage on every pull-up including the initial pull-up and remakes. Once engaged, whether first at the initial pull-up or a later remake, the stroke resisting feature will allow control of the additional axial movement or stroke for each remake, thus maximizing the available number of remakes for a particular fitting design.

Co-pending U.S. Patent Application Publication No. 2010/0213705 (the "'705 application"), entitled "Conduit Fitting with Torque Collar," and incorporated herein by reference in its entirety, describes a stroke resisting arrangement utilizing a dynamic wedge concept, summarized and disclosed more generally below and in FIGS. 1-3.

Figure 2:
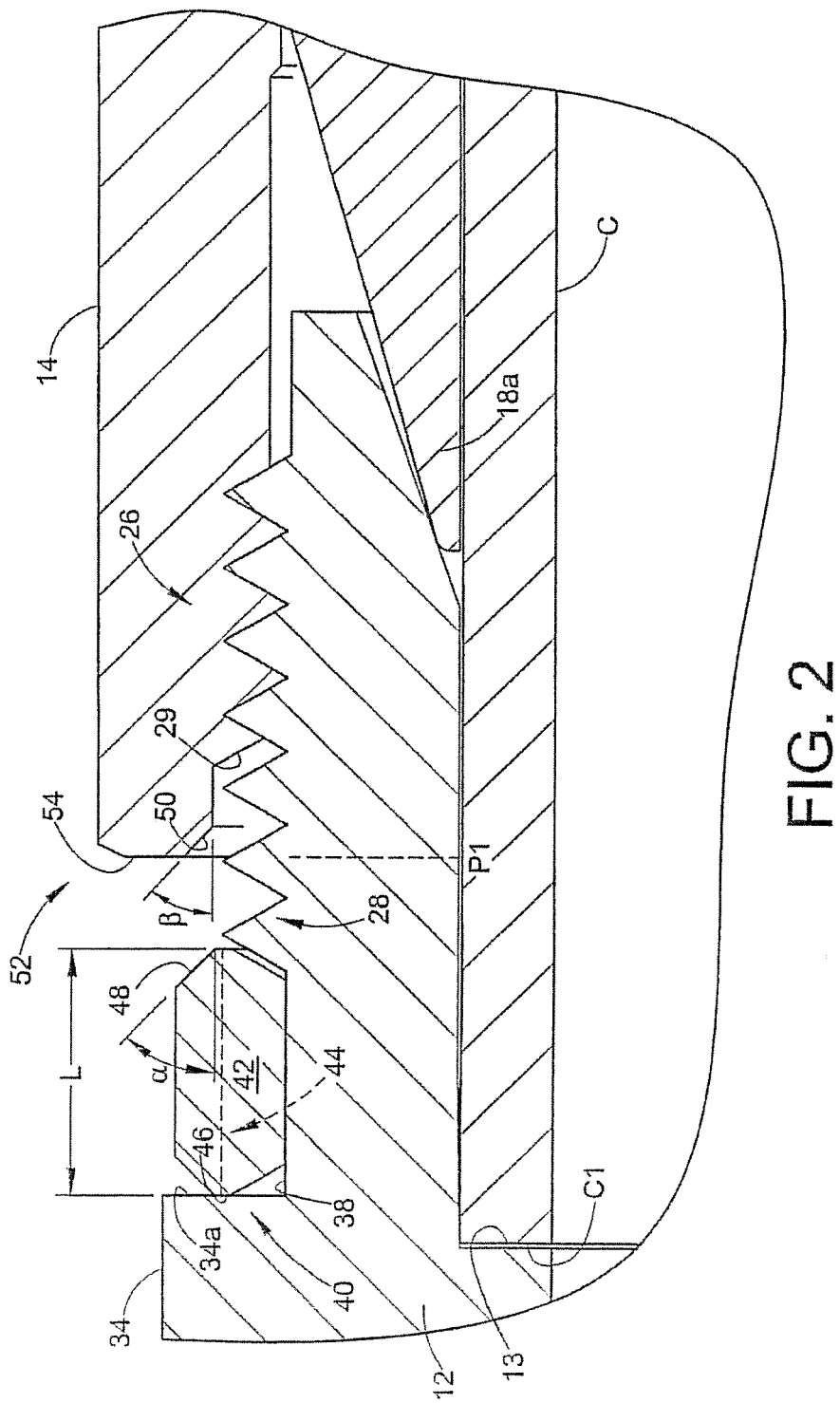
FIG. 2 is an enlarged illustration of the portion of FIG. 1 in circle A.
Figure 3:
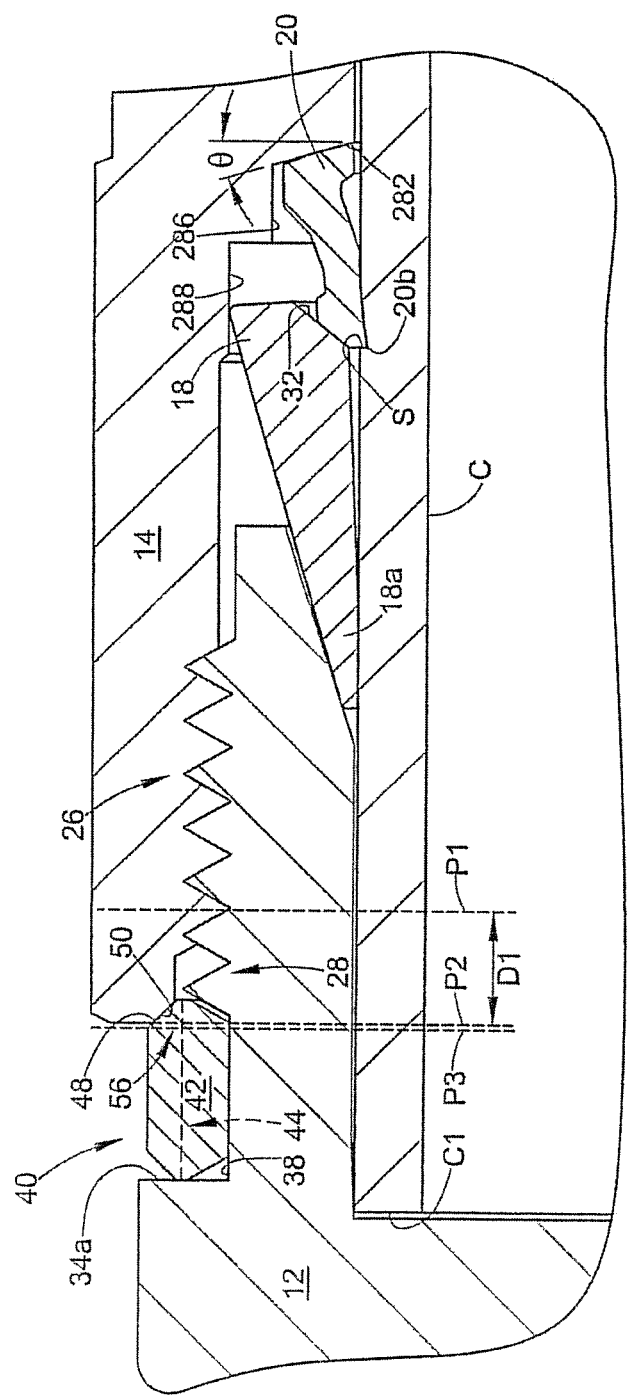
FIG. 3 is an enlarged illustration of the portion of FIG. 1 in circle A but with the fitting in a complete pulled-up position.

With reference to FIGS. 1-3, a stroke resisting arrangement 40 may be included with a fitting 10 to facilitate pull-up by torque. While many different forms of stroke resisting features may be utilized, in the illustrated embodiment, the stroke resisting arrangement includes a separate annular ring torque collar having an outward facing wedge surface 48 and a threaded fitting nut having an inward facing taper surface 50 that are axially pressed against each other when the nut 14 is pulled up on the body 12. Also, while the illustrated example shows the inward facing taper surface 50 as being axially advanced against the outward facing wedge surface 48 by tightening of the nut 14, in other embodiments (not shown), an outward facing wedge surface may be axially advanced against an inward facing taper surface by tightening of a fitting nut. Further, as described in several embodiments of the above incorporated '705 application, an integral feature of one or both of the threaded fitting components (i.e., an "integral torque collar") may similarly provide interengaging wedge and taper surfaces that function as a stroke resisting arrangement.

As viewed in cross-section, the wedge surface 48 may be formed at an angle α relative to the central axis X (FIG. 1) of the fitting 10, and the taper surface 50 may be formed at an angle relative to the central longitudinal axis of the fitting. In one embodiment, when the fitting 10 is in the finger-tight position, the taper surface 50 is axially spaced from the wedge surface 48, and after a completed pull-up, the taper surface 50 is axially pressed against the wedge surface 48. The outward facing surface 48 is referred to as a wedge surface because that surface acts to significantly resist axial advance of the nut after the taper surface 50 first makes contact with the wedge surface 48, yet will allow additional axial stroke during subsequent remakes. This contact produces a distinct and optionally sharp increase in torque that can be either sensed by the assembler or that will allow a torque wrench to be used to make up the fitting 10. The angles α and β may be but need not be the same. Many different angle values may be used, including, for example, about ten degrees to about seventy-five degrees, or about 45 degrees.

Although it is optional to use the same predetermined torque for remakes as used for the initial pull-up, it can be expected that this will be a great convenience for the end user as only a single torque wrench or torque specification needs to be used. The stroke resisting arrangement 40 facilitates this benefit by providing a controlled additional axial displacement with each remake at the prescribed applied torque. The additional axial displacement with each remake will depend on many factors, including but not limited to the angles of the engaging surfaces 48, 50, friction values, hardness, yield strength, creep and so on, as well as how many remakes have already been made.

A leading edge 54 of the taper surface 50 will initially contact the wedge surface 48 as the fitting 10 is pulled-up. Further advance of the nut 14 relative to the body 12 will cause the forward portion 56 of the wedge surface 48 to enter the frustoconical recess defined by the taper surface 50 with tighter and tighter engagement between the wedge surface 48 and the taper surface 50. This will result in a distinct and significant increase in torque compared to the torque increase that would otherwise be noted for the same nut stroke if the stroke resisting arrangement 40 were not present. The wedge surface 48 and the taper surface 50 cooperate during pull-up to produce a distinctly and perceptible increase in torque that is higher than the predetermined torque value that corresponds with the predetermined relative axial stroke for proper make up of the fitting 10 and is accompanied by a significant resistance to additional relative axial stroke of the nut and body. In other words, the wedge surface 48 and the taper surface 50 are designed to produce a distinct torque increase due to the increasing load between the wedge surface 48 and the taper surface 50 when combined with the interaction of the conduit gripping devices and the conduit. As illustrated in FIG. 3, this cooperation between the wedge surface 48 and the taper surface 50 may result in significant surface to surface contact and load between the wedge surface 48 and the taper surface 50, but this drawing is only intended to be exemplary. The actual amount of contact for initial pull-up as well as one or more remakes will be determined by overall design criteria for the fitting 10.

Figure 3A:
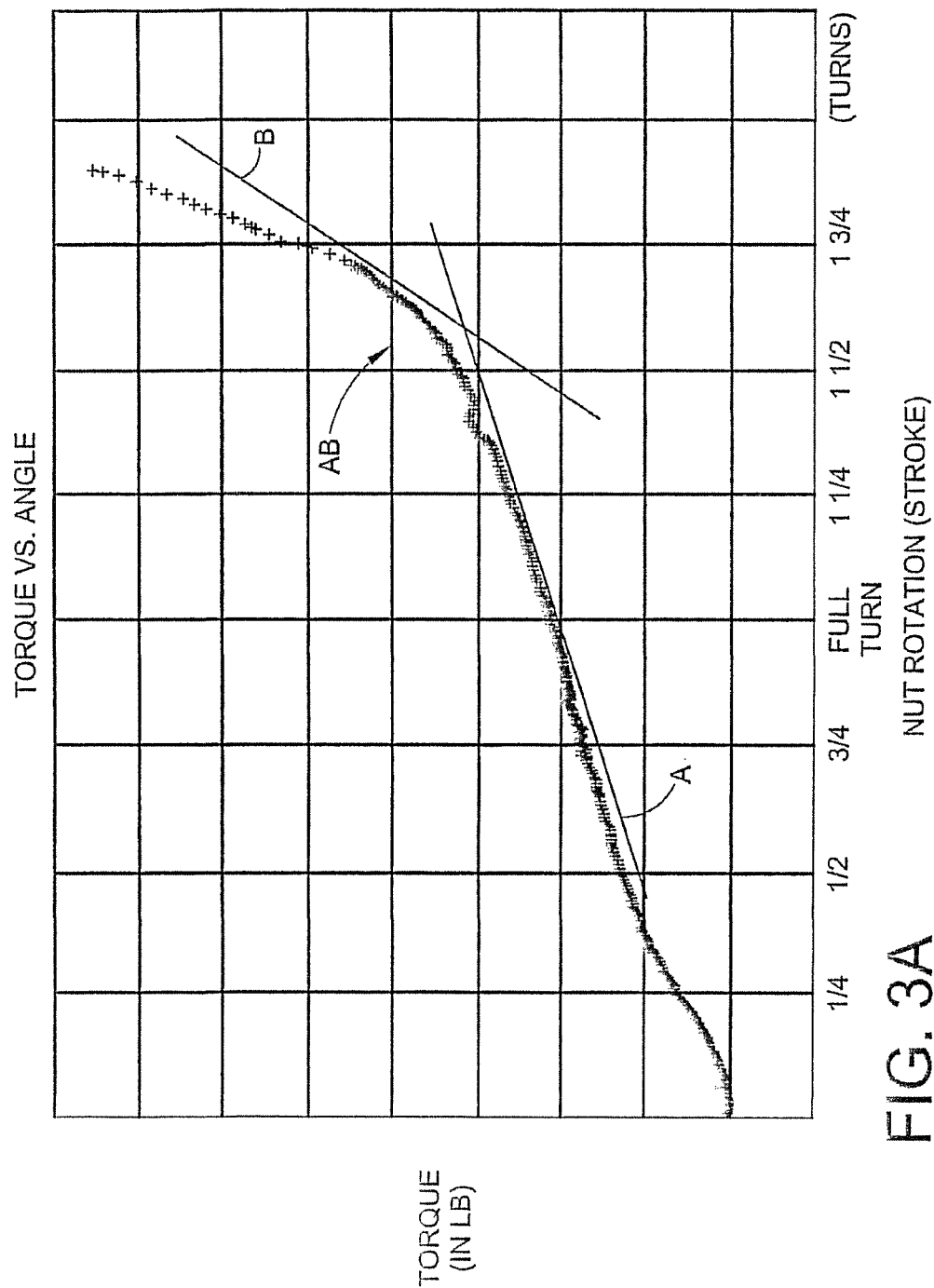
FIG. 3A is a chart illustrating an example of torque versus turns.
Figure 4:
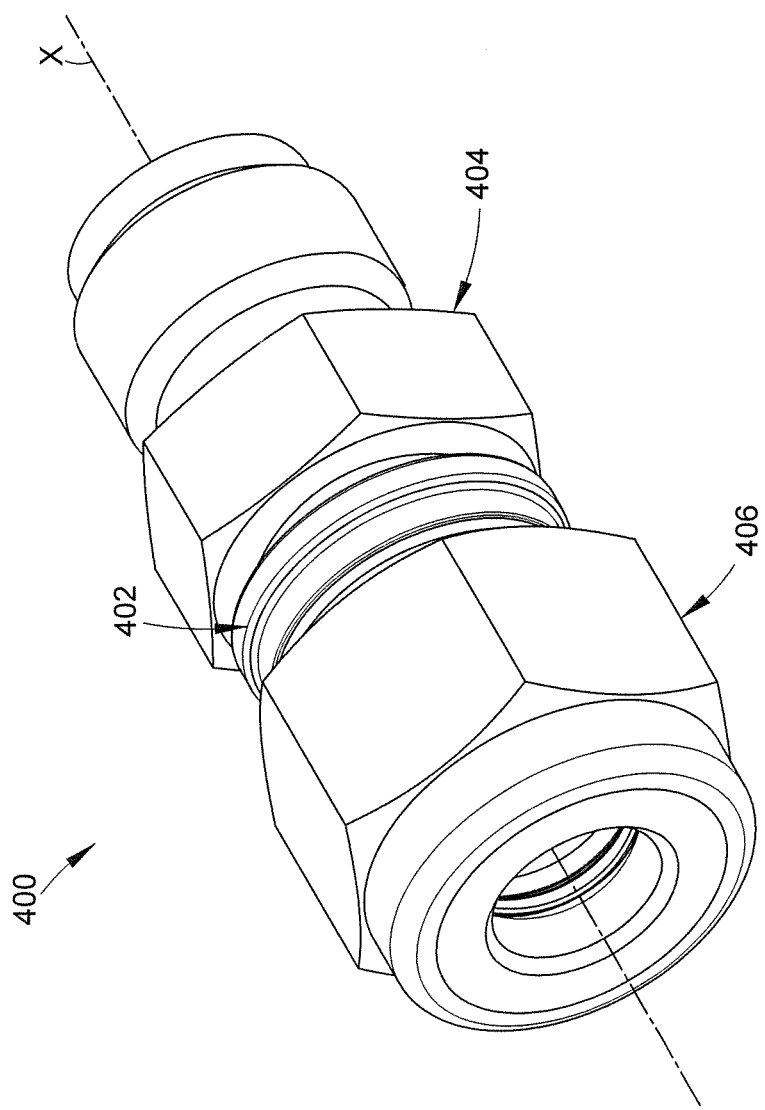
Figure 6A:
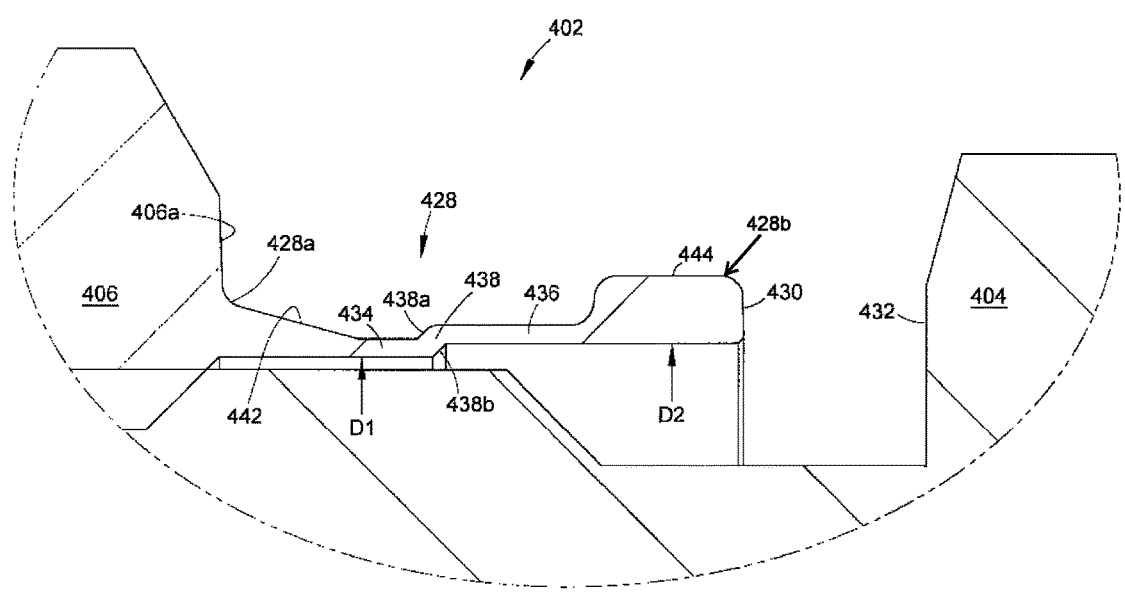

FIG. 3A is an exemplary chart of torque versus turns of the nut relative to the body (stroke). Actual values for the stroke and torque are not important but rather the concept of the relationship between torque and stroke. Note that for up to a desired or predetermined stroke, the torque gradually increases as represented by slope A. Then the torque rate of increase changes distinctly after the nut has engaged the torque collar, such as represented by slope B. In the transition region AB, the torque collar 40 can be designed to produce a significant resistance (sensed as torque or corresponding to a specified torque such as could be used to enable a torque wrench to be used for pull-up) to additional stroke with a tight correspondence to torque. It is important to recognize that the graph in FIG. 3A is only exemplary and intended to illustrate some of the concepts herein. For example, where the transition region AB occurs relative to the number of turns can be shifted left and right. Also, the amount of torque change and the resistance to further stroke can also be set by the design of the stroke resisting arrangement.

Another aspect of the stroke resisting feature is to allow remakes of the fitting 10. This may be accomplished by designing the stroke resisting arrangement 40 to allow further axial advance of the nut 14 relative to the body 12 for fitting remake, beyond the axial position of the nut 14 relative to the body 12 for the just prior pull-up. In this embodiment then, the wedge surface 48 thus allows for remakes by allowing for further axial advance of the nut 14 relative to the body 12. However, other surface profiles may be used to provide the desired torque increase relative to stroke of the nut while also allowing for one or more remakes. We have found that the angle α of about forty-five degrees can result in twenty-five or more remakes. The torque increase is also a function of the shape of the taper surface 50. The designer may choose those shapes and angles that best achieve the desired performance for pull-up by torque and remakes.

Many factors may be used to control the amount of additional axial stroke for each remake. In addition to the angles and profiles of the wedge surface 48 and the taper surface 50, additional axial displacement actually occurs due to either radially outward flaring or expansion of the nut 14, radially inward compression of the torque collar 40, plastic deformation such as creep at the engaging surfaces 48, 50, or any combination thereof. These deformations may be controlled, for example, through the hardness of the components, surface finish and so on. The designer therefore has available a number of different factors including others not listed here, to effect controlled axial displacement with each remake, without adversely affecting the performance of the fitting.

Many factors will influence the final design, including but not limited to the hardness of the torque collar 40, surface characteristics of the wedge surface 48 and the nut taper surface 50 to effect desired friction between the torque collar 40 and the nut 14, thread pitch (for the nut and body), the axial distance between the leading edge 54 that initially contacts the wedge surface 48 and the drive surface 22 that contacts that back ferrule 20, and the angles α and β.

Because the torque collar 40 allows for one or more remakes, the wedge surface 48 may be thought of as a dynamic wedge in that the torque collar permits controlled additional relative axial advance or stroke of the nut and body for each remake, meaning that the contact position of the nut taper surface 50 against the wedge surface 48 will change, even ever so slightly, with each remake. The torque collar 40 therefore will preferably characterized by a high yield strength but may yield somewhat, to facilitate many remakes when such is a desired performance characteristic of the fitting 10.

In accordance with one of the inventive concepts presented in this disclosure, a torque collar or other stroke resisting feature is provided in the form of a member, for example a load bearing flexible member or stroke resisting member of one or both of the fitting components, in which the flexible member may be characterized by a yield strength that permits the flexible member to deflect under load in a controlled manner so as to allow additional relative axial displacement of the nut and body during remakes. The flexible member may be integrally formed, such as by machining for example, with one or both of the fitting components, or integrated therewith, such as by welding for example, to form an integral structure. The flexible member may be provided on a nut, a body, a nut and body, and may be used with female and male conduit fittings as set for below. The deflection of the flexible member under load provides the desired plastic deformation to facilitate additional relative axial stroke during one or more remakes of a conduit fitting, whether the initial pull-up or the one or more remakes is by torque or by turns. It should be noted that although the load bearing flexible member is designed to exhibit a desired plastic deformation for each pull-up, this does not imply nor necessitate that there be no elastic deformation. The load bearing flexible member, for example, may be designed with a flexure or give so as to allow the load bearing flexible member to deflect under load. The load bearing flexible member may indeed exhibit some elastic deformation, however, in order to accommodate additional remakes by torque, it will be desired that the load bearing flexible member also undergo some degree of plastic deformation or take a set under load in response to each remake or pull-up.

With reference to FIGS. 4-6A we provide another embodiment of a conduit fitting 400 (also referred to herein as a fitting for short) with a torque collar 402 that may be used to facilitate pull-up by torque. As in the other embodiments herein, the torque collar 402 does not preclude the fitting 400 from being pulled-up in a traditional manner by turns. The fitting 400 may comprises all metal parts, for example, stainless steel, however other materials may be used as needed as well as fittings that do not use all metal parts.

The fitting 400 may include a first fitting component 404 which may be in the form of a threaded body 404 and also will be referred to herein as the body 404 for short; and a second fitting component 406 which may be in the form of a threaded nut 406 and also will be referred to herein as the nut 406 for short. Although the embodiment of FIGS. 4-6A illustrates a particular configuration of the body 404, in this example a union, many different types and configurations for the body 404 may alternatively be used as is well known. The common features of a body 404 (identified below) regardless of geometry or configuration used in a conduit fitting include a threaded portion that mates with threads of a nut, a frustoconical camming mouth that receives the forward portion of a conduit gripping device, and a bore that receives an end of a conduit. The conduit gripping device may be realized in many forms as is well known, including but not limited to a single ferrule or a pair of ferrules, the latter commonly referred to as a front ferrule and a back or rear ferrule. In a two ferrule fitting, a forward portion of the front ferrule engages the camming mouth of the body, and a forward portion of the back ferrule engages a frustoconical camming surface at a rearward portion of the front ferrule. The camming surface and camming mouth need not be frustoconical as is well known. Furthermore, although the embodiment of FIGS. 4-6A et seq. illustrate a male style fitting—meaning that the body 404 is male threaded and the nut 406 is female threaded, alternatively the inventions may be used with female style fittings.

The fitting 400 includes a first or front conduit gripping device 408 and a second or back conduit gripping device 410. We will also refer herein to these conduit gripping devices as ferrules, but structures other than what may be commonly referred to as ferrules may alternatively be used for the conduit gripping devices. The conduit gripping devices 408, 410 are axially assembled in a space defined between the body 404 and the nut 406. References herein to axial and radial and similar terms are referenced to the longitudinal axis X in the drawings. In this case the axis X is the central longitudinal axis of the fitting 400 and also is coaxial with the central longitudinal axis of a conduit (not shown in FIGS. 4-6A but see FIG. 7 et seq.) that is inserted into the fitting 400. However, the axis X may be any longitudinal reference axis.

The pull-up process begins with assembling the fitting 400 to a finger tight position which is the position of FIG. 6. The nut 406 and the body 404 have a threaded mechanical connection 412 as noted above. The nut 406 includes a ferrule drive surface 414 that contacts the back end 416 of the back ferrule 410. The back ferrule 410 has a forward portion 418 that contacts a frustoconical camming surface 420 at a rearward portion of the front ferrule 408. And, a forward portion 422 of the front ferrule 408 is received in and contacts a frustoconical camming mouth 424 of the body 404. The finger tight position is thus one where the nut, the two ferrules and the body are in intimate contact with each other but there is no actual tightening of the assembly. This finger tight position is historically a reference position for pulling up conduit fittings by turns. For example, a fitting may be designed to be pulled-up 1.25 turns past finger tight position (also herein referred to as FTP for short). But other fitting designs may be pulled-up to a different specification, for example, 1.5 turns past FTP. Although not shown in FIG. 6, a conduit T is inserted into the fitting 400 with a forward end of the conduit T contacting an interior shoulder 426 of the body 404, known in the art as bottoming. But alternative body designs may not use the shoulder 426. Also, although typically the fitting 400 may be assembled first and then the conduit is inserted, it is also known to pre-swage the ferrules 408, 410 onto the conduit end (with the nut 406 retained with the ferrules on the conduit after pre-swage) prior to finger tight assembly with the body 404, such that the reference position for pulling up the fitting by turns to a prescribed relative axial position may in some embodiment be this partially tightened or "pre-swaged" condition. In either case, the finger tight position is as shown in FIG. 6 (without the conduit being shown). FIG. 6, for example, illustrates a common arrangement of the parts for shipping or storage.

The number of turns (full and partial) past the FTP (also referred to herein as relative rotation between the body 404 and the nut 406) directly corresponds to relative axial stroke or translation between the body 404 and the nut 406 as the fitting 400 is pulled-up (also referred to herein as tightening the fitting). As noted, fittings are usually specified by the manufacturer to be pulled-up a specific number of turns and partial turns past the reference position, for example, the FTP. Such is the case for the first or initial time that a fitting is pulled-up. For remakes, typically the fitting is again assembled to the FTP and then tightened or snugged up for a partial turn, for example, approximately 0.125 turns although this amount will depend in part on how many remakes are made because the additional stroke consumed during remakes becomes smaller as the number of remakes increases.

The amount of relative axial stroke that corresponds to the number of turns and partial turns past the FTP depends on the design of the fitting, the thread pitch of the threaded mechanical connection 412 and the fitting size. Fitting sizes are commonly expressed in terms of the nominal outer diameter of the conduit with which the fitting will be used. For example, a quarter inch fitting is used for quarter inch tubing. Metric equivalents are also known. The exemplary embodiments herein illustrate a ¼ inch (or 6 mm metric) fitting, but the inventions herein may be used on any size fitting.

The manufacturer specifies the number of turns and partial turns past the reference position (the FTP typically) because the corresponding relative axial stroke between the nut 406 and the body 404 acts to drive the ferrules together and cause the ferrules to deform such that the ferrules grip and seal the conduit so as to form a fluid tight mechanical connection. As an example, for a fitting that is specified to be pulled-up the first time to 1.25 turns past FTP, it means that 1.25 turns are needed to assure the needed axial stroke of the ferrules, nut and body so that the ferrules 408, 410 grip and seal the conduit T. Again, remakes do not involve the same number of turns as the initial pull-up because the ferrules have already been plastically deformed to grip and seal the conduit. For remakes, it is only necessary to return to a FTP and then snug up the fitting, for example, with a partial turn of 0.125 or as otherwise specified by the manufacturer. It should be noted, as in well known, that the FTP reference position for remakes is a function of the just prior pull-up due to the plastic deformation of the ferrules. But for both remakes and an initial pull-up, the FTP reference position is that position at which the nut 406 contacts the back ferrule 410 with the ferrules in contact with each other and the front ferrule 408 in contact with the camming mouth 424 of the body 404.

The fitting 400 conveniently may be pulled-up by torque or by turns. Pulling up a fitting by turns is the traditional way to pull-up a conduit fitting onto a conduit so that the conduit gripping device or devices grip and seal the conduit. But as noted in the embodiments hereinabove, our inventions allow a fitting alternatively to be pulled-up by torque rather than having to count turns. The torque collar 402 provides this capability. Remakes may also be by torque or by turns.

The torque collar 402 may be integral with the nut 406 to form a one-piece component. Alternatively, the torque collar 402 may be a separate part, or may be a separate part that is attached to or cartridged with the nut 406 as described hereinbelow. Whether the torque collar 402 is integral with the nut 406 or a separate part, the torque collar deforms in a similar manner and may be used to effect pull-up of the fitting 400 by torque rather than by turns. As still a further alternative embodiment, the torque collar may be integral with the body 404 to form a one-piece component.

The torque collar 402 is generally in the form of an annular stroke resisting—also alternatively referred to herein as stroke limiting—member 428 (also referred to herein as a member 428). The stroke resisting member 428 provides a structure that may be used to resist additional relative stroke between the body 404 and the nut 406 during pull-up. In the integral version of FIGS. 4-6A, once the distal end surface 430 of the stroke resisting member 428 contacts a contacting surface 432 of the body 404, further relative rotation between the body 404 and the nut 406 applies an axial load or compression on the member 428. Preferably, the axial position and the inside diameter of the member 428 is sufficient to provide an axial and radial gap from the threaded connection 412. The member 428 may be designed as needed to absorb this load to resist additional relative axial stroke between the body 404 and the nut 406. This resistance may be used to cause a significant or sharp increase in torque required to continue tightening the body 404 and the nut 406 together, similar in effect to the other torque collar embodiments described herein that use engaging surfaces. Therefore, the torque collar 402 may be used to allow pull-up by torque rather than pull-up by turns. The torque collar 402 may be designed to exhibit the desired increase in torque at a desired relative axial displacement of the body 404 and the nut 406 (i.e., a prescribed relative axial position of the body and nut) that corresponds with sufficient relative axial stroke to cause the ferrules 408, 410 to grip and seal the conduit T. As an example, the increase in torque may be designed to occur at a first relative axial position of 1.25 turns past the FTP. As described hereinabove, the torque collar 402 allows a significantly tighter control between relative stroke and pull-up torque than can be achieved without use of a torque collar.

In addition to resisting additional axial stroke, the member 428 is designed to plastically deform in a controlled manner so as to take a plastic set. As described in detail above, pull-up by torque uses a structure that takes at least a partial plastic set during pull-up so that pull-up by torque may also be used on remakes. As described above and in the above incorporated '705 application, the torque collar may be designed so that the same torque may be used for remakes as is used for the initial pull-up. Alternatively, a different torque may be used for remakes if so needed.

In an embodiment, as illustrated in FIG. 6, the member 428 may be designed to deform in a controlled manner when placed under axial load or axial compression, such that the member is axially compressed to a reduced axial length, relative to an initial axial length of the member. The deformation may be but need not be in the form of buckling or may include buckling as an optional form of deformation. Now, the load on the member 428 alternatively need not be primarily axial, and in any case the resultant deformation may involve radial and axial forces, and in some designs and application these radial and axial forces may produce radial expansion and other deformations as will be apparent from the descriptions below. The buckling or other plastic deformation as needed will allow the assembler to remake the fitting 400 by reassembling the parts to a FTP and re-tightening the body 404 and the nut 406 together until the member 428, with a reduced axial length due to plastic axial deformation, again contacts the surface 430 of the body and the resultant torque increase occurs.

The member 428 includes a first cylinder portion or first axially extending wall portion 434 and a second cylinder portion or second axially extending wall portion 436. A web 438 connects the first cylinder portion 434 with the second cylinder portion 436. The web 438 may be designed with a geometry that facilitates a deformation, for example, a buckling action. Other deformations may be used besides buckling. The first wall portion 434 may have a first inner diameter D1 and the second wall portion 436 may have a second inner diameter D2. Preferably, although not necessarily, the diameter D1 is less than the diameter D2. Alternatively, the diameters D1 and D2 may be the same or D2 may be the smaller diameter compared with D1. The outer diameters of the first and second wall portions may likewise vary with respect to each other. The member 428 has a first or proximal end or proximal ring portion 428*a* that is connected to an axially inward end 406*a* of the second fitting component 406 (the surface 406*a* may be radial or may alternatively include a draft or taper.) The first wall portion 434 may extend from an inner radial portion of the proximal ring portion, and may blend to the main body 440 of the nut 406 with an optional tapered portion 442. An enlarged flange or distal ring portion 444 may be disposed at a second or distal end 428*b* of the member 428, which is axially opposite the proximal end 428*a*, with the second wall portion 436 extending axially from an inner radial portion of the distal ring portion 444. The web 438 is angled with respect to each of the first and second wall portions to define a hinge portion, and may be joined with the first cylinder portion 434 by a radius 438*a* and with the second cylinder portion 436 by a radius 438*b*. These radii may be thought of as creases or hinges that facilitate controllable deformation, for example buckling, of the web 438 when the member 428 is under axial load or axial compression. The first and second wall portions and the web may be provided with radial thicknesses that are smaller than corresponding radial thickness of the proximal and distal ring portions, for example, to facilitate buckling or other such controllable deformation. In one embodiment (not shown), the distal ring portion may have a radial thickness that is substantially the same as the second wall portion. In still other exemplary embodiments, the first and second axially extending wall portions may extend at an angle with respect to a central axis, such that the inner and outer diameters of the first and second wall portions vary, for example, to facilitate buckling or other such controllable deformation in response to an axial load.

The geometry of the member 428 may alternatively be different from the embodiment of FIG. 6. But the use of the tapered portion 442, the web 438, the two cylinder portions 434 and 436 and the enlarged flange 444, as well as material properties and wall thicknesses, allow the designer many options for controlling the deformation, for example by buckling of the web 438, to control pull-up torque versus relative axial stroke between the body 404 and the nut 406. In particular, the geometry and characteristics of the member 428 may be different among different size fittings. Having the deformable torque collar integral with the nut 406 rather than the body 404 allows much simpler and cost effective implementation of the torque collar concept. This is because the body 404 as noted above may have many different configurations, yet the nuts 406 that mate with the body all basically are the same other than as to size.

Note that in contrast to the dynamic wedge embodiments of the '705 application described hereinabove, torque is controlled by axial compression of the torque collar 402 rather than engaging surfaces such as one or more engaging tapered surfaces. The member 428 distal end surface 430 may simply be a radial surface as illustrated, although such is not required, and the contacting surface 432 of the body 404 may also be a radial surface as illustrated, although again such is not required. For example, the contacting surface 432 of the body 404 may include a small draft or outward taper, for example about 2°. The distal end surface 430 may also include an optional taper or draft. The draft angles may be selected as needed.

FIGS. 7-13 illustrate an embodiment of a deformation of a stroke resisting member 428, for example, by a buckling action. These figures are representations of FEA analysis of the fitting 400 during various stages of pull-up and remake. FIG. 7 shows a finger tight position as described above prior to an initial or first-time pull-up of the fitting 400. Note the axial end to end contact of the nut 406, the back ferrule 410, the front ferrule 408 and the body 404, but there is no deformation or stress applied to the parts in the FTP as is well known. The example shown in FIGS. 7-13 is for a ¼ inch conduit fitting but the description will apply for any size fitting including metric sizes. For initial pull-up as well as remakes, there will be a gap G between the distal end 430 of the member 428 and the body contacting surface 432. In the FTP for the various drawings we use G1, G2 and so on to distinguish the gap G that is presented during different pull-ups and remakes of a fitting; but we also generally designate the gap G in the drawings as well for reference purposes. Therefore, the different designations of G1, G2 and so on are examples of the gap G at the FTP. Accordingly, for an initial pull-up there is an axial gap G1 between the distal end surface 430 of the member 428 and the oppositely facing contacting surface 432 of the body 404. In an embodiment, the axial gap G1 may correspond with the relative axial stroke needed between the body 404 and the nut 406 to effect an initial pull-up of the fitting 400 so that the ferrules 408, 410 grip and seal the conduit T. This may be used, for example, when a specified torque may be used that empirically will be known to achieve the desired relative axial stroke for initial pull-up, whether contact is made or not between the member 428 and the body 404 during the initial pull-up. Alternatively, the member 428 need not make contact with the body 404 on the initial pull-up of the fitting 400, but may make contact only after one or more remakes of the fitting 400 if so desired. Designing at what relative axial stroke to have the member 428 first make contact with the body 404 is a design choice based in part on how much control of the stroke is desired to optimize the number of remakes of the fitting 400. But, such contact is useful after one or more remakes because the torque collar 402 provides control of the stroke versus torque relationship so as to reduce over-torque which can waste stroke that could otherwise be used for additional remakes.

Figure 8:
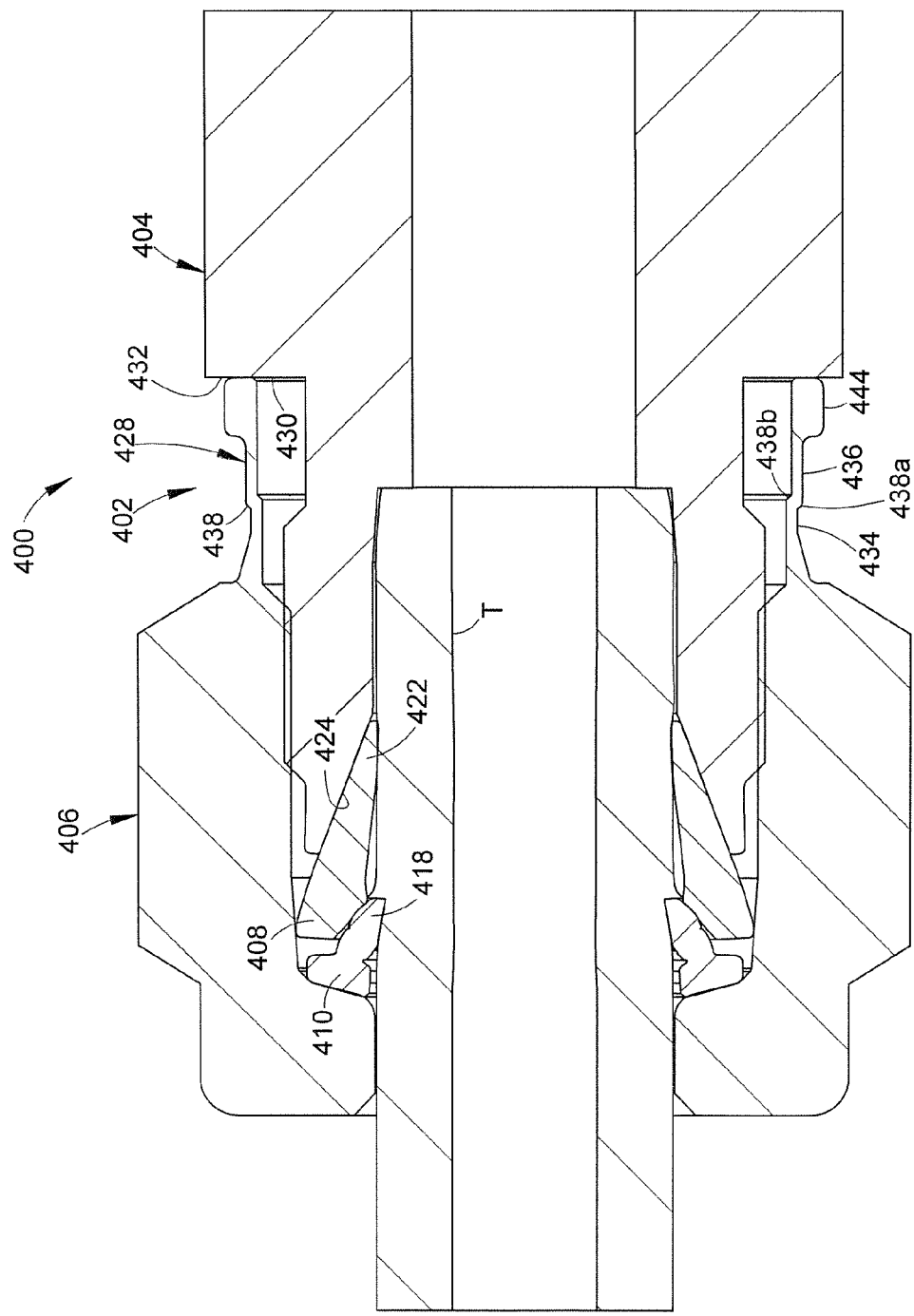
FIG. 8 illustrates the conduit fitting of FIGS. 4-6A at a pulled-up position.

FIG. 8 illustrates the fitting 400 just prior to an initial pulled-up position, for example a relative axial displacement between the body 404 and the nut 406 that corresponds with just short of 1.25 relative turns of rotation between the body 404 and the nut 406. Note that in this example, the member 428 distal end surface 430 is in contact with the body contacting surface 432, thus reducing the prior FTP gap G1 to zero. In other words, the full stroke represented by G1 has been consumed on the initial pull-up, just as if the fitting had been pulled-up by turns rather than by torque. But because the contact between the member 428 and the body 404 will cause a significant and controlled increase in pull-up torque, the fitting 400 can be pulled-up by torque rather than by counting turns and partial turns (although alternatively the fitting may also be pulled-up by turns as noted hereinabove). Also note that the ferrules 408, 410 are deformed so as to grip and seal the conduit T. This is evidenced by the back ferrule forward portion 418 biting into the outer surface of the conduit, which provides conduit grip, and the front ferrule forward portion 422 being wedged between the camming mouth 424 of the body and the outer surface of the conduit T so as to form fluid tight seals against the camming mouth surface 424 and the outer surface of the conduit T. Other fitting designs may have different deformations of the ferrules and different ways to provide conduit grip and seal. But for any fitting, there will be a relative axial stroke between the body 404 and the nut 406 that effects conduit grip and seal by the conduit gripping device or devices.

FIG. 8 could also be representative of the fitting 400 at the initial pulled-up position of relative axial displacement that corresponds with 1.25 turns. This could be the case, for example, where contact is either not made or is lightly made between the member 428 and the body 404 at the initial pulled-up position. In such an example, there would not be any appreciable deformation of the member 428.

Figure 9:
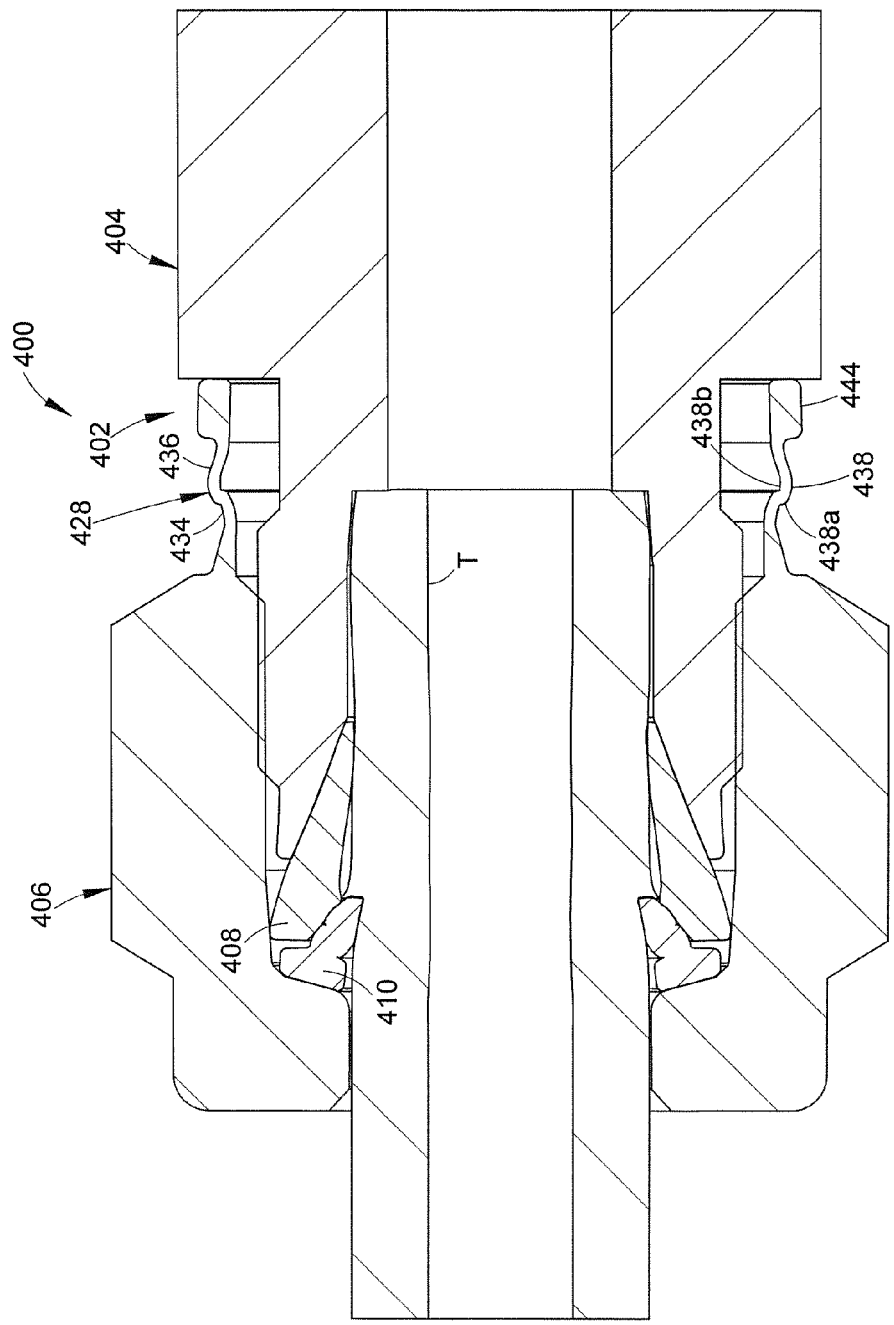
FIG. 9 illustrates the conduit fitting of FIGS. 18-20 in a pulled-up position past the position of FIG. 8.

FIG. 9 shows the fitting 400 in the initial pulled-up position. Once the member 428 makes contact with the body 404 (as in FIG. 8), further relative axial displacement (i.e. tightening) of the body 404 and the nut 406 places the member 428 under axial load or axial compression. This axial load or axial compression stresses the web 438. The web 438 deforms, such as for example by a buckling action, at the creases 438a and 438b. Note that the second cylinder portion 436 may flare outwardly while the first cylinder portion 434 may compress inwardly. Alternatively, the first cylinder portion 434 may flare outwardly and the second cylinder portion 436 may flare inwardly; or both cylindrical portions 434, 436 may flare in the same direction, inwardly or outwardly. Preferably, any inward flaring will be controlled so as not to interfere with the threaded portion of the body 404. Also, the nature of the deformation of the member 428 will depend on the particular design of the member 428. In the position of FIG. 9 the ferrules 408, 410 achieve grip and seal of the conduit T. Further note that the deformation of the member 428 evidences the resistance to additional relative axial stroke between the body 404 and the nut 406 after contact is made between the surfaces 430 and 432.

Figure 10:
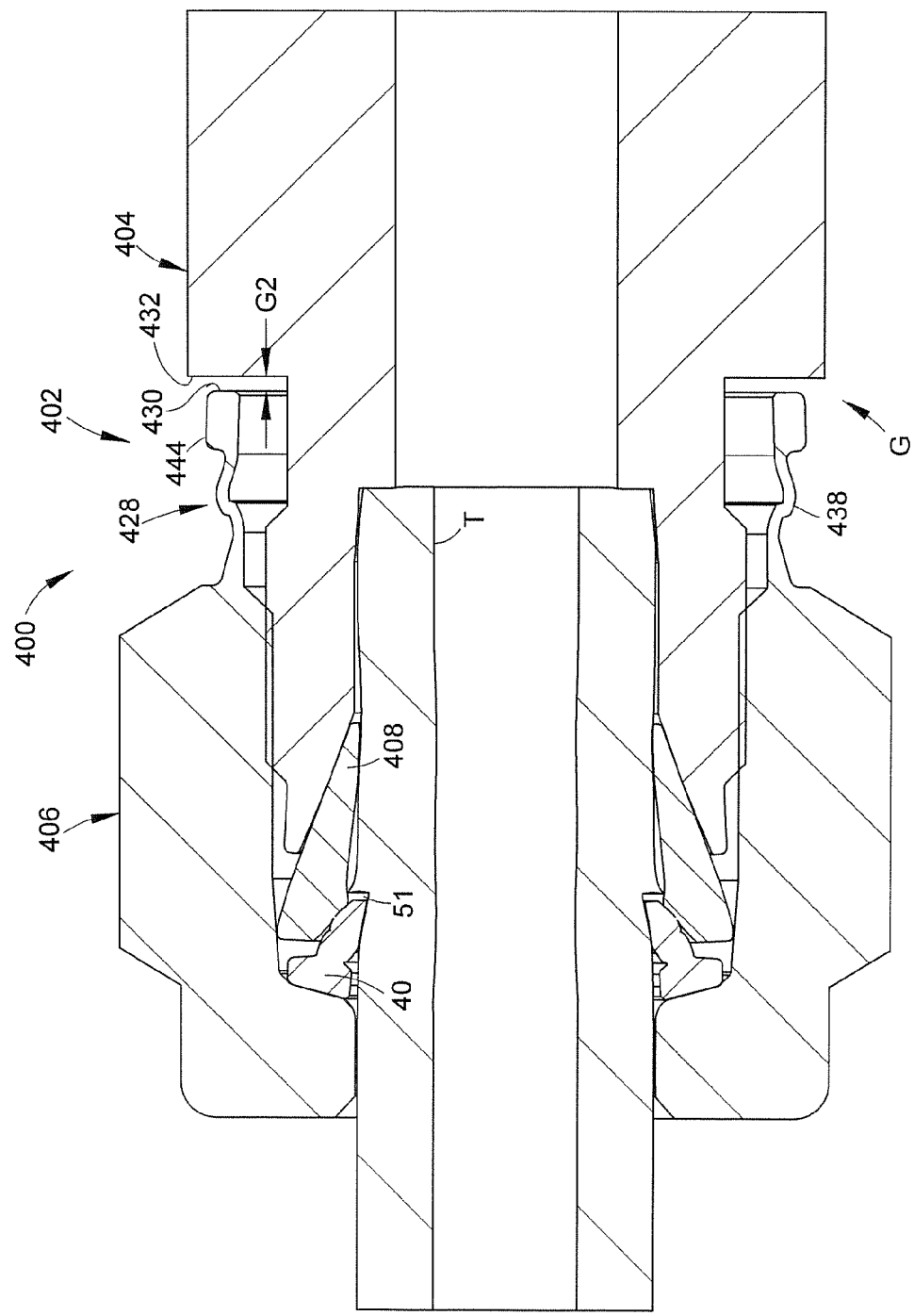
FIG. 10 illustrates the conduit fitting of FIGS. 4-6A in a FTP following the pull-up of FIG. 9.

FIG. 10 shows the fitting 400 in a FTP preparatory to a remake following a loosening or disassembly of the fitting 400 from a prior pull-up such as the initial pull-up of FIG. 9. Note that in this FTP the back ferrule 410 and possibly the front ferrule 408 exhibit a spring back when the nut 406 is loosened from the body 404 during disassembly. This spring back is typical particularly during the first several remakes of the fitting. The spring back is evidenced by a gap S1 between the forward portion of the back ferrule 410 and the indentation in the conduit T caused by the back ferrule grip of the conduit in the pulled-up condition. Note further that the member 428 has retained its deformed state from the prior pull-up due to plastic deformation. There may be some elastic deformation as well but it is the plastic deformation that facilitates remake by torque. As a result of the plastic deformation of the member 428, there is a gap G2 between the distal end surface 430 of the member 428 and the contacting surface 432 of the body 404. Further note that the gap G2 will be smaller than the gap G1 because after the initial pull-up of the fitting 400 the ferrules 408, 410 have also plastically deformed (as has the conduit T) and taken a plastic set so that the overall axial length of the fitting 400 has been compressed and shortened. The difference between G1 and G2 also evidences the fact that each successive pull-up or remake of the fitting 400 requires less relative axial stroke between the body and the nut to effect conduit grip and seal.

Figure 11:
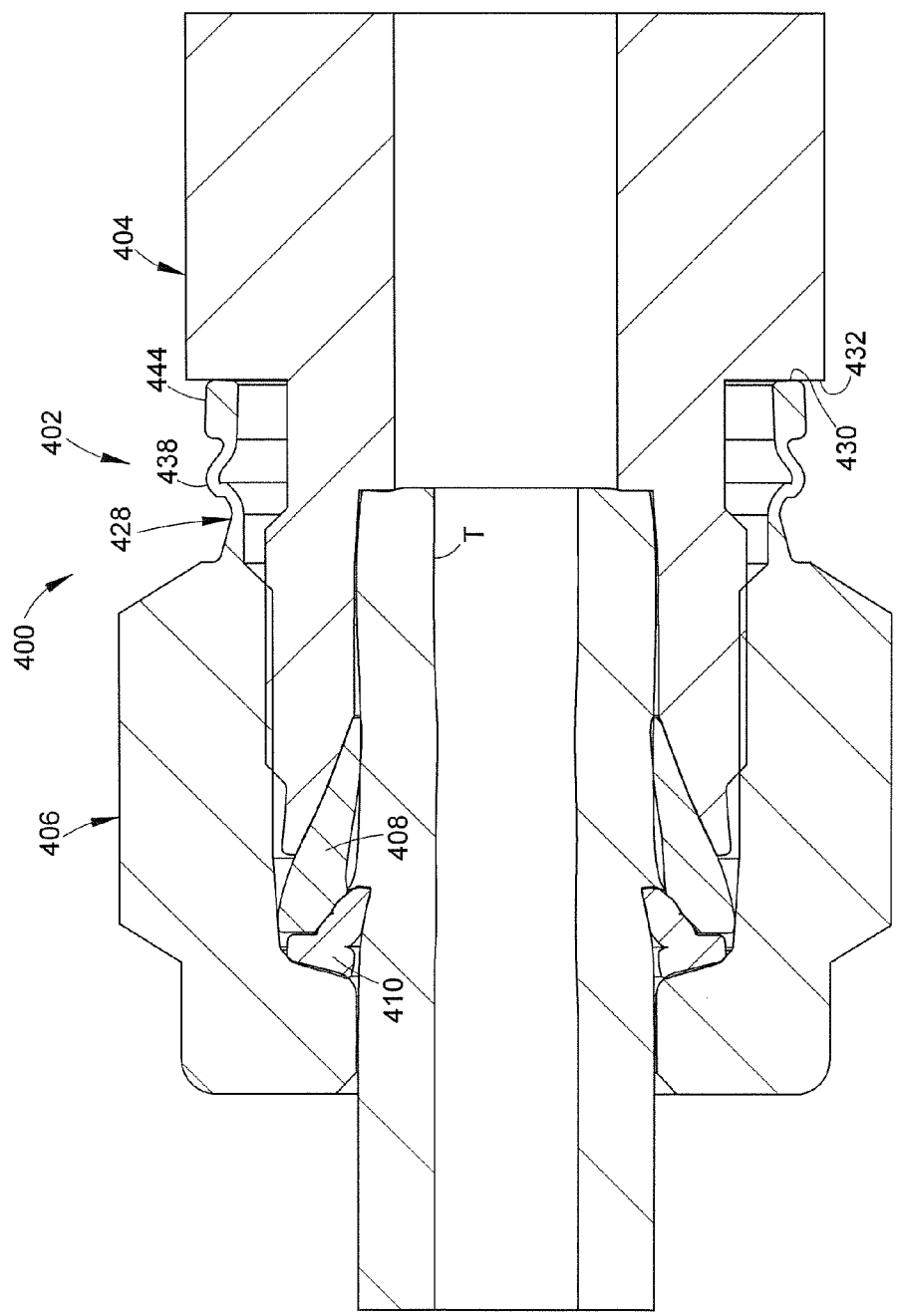
FIG. 11 illustrates the conduit fitting of FIGS. 4-6A after a first remake.

FIG. 11 illustrates the fitting 400 after the remake from the FTP position of FIG. 10. Note that in comparison with FIG. 9 the member 428 has become more axially compressed and deformed by the buckling action, and that the ferrules 408, 410 are returned to a position for conduit grip and seal. The gap G2 has been reduced on remake again to zero. The same torque may be used for the remake as was used for the initial pull-up, or a different torque may be used as needed.

Figure 12:
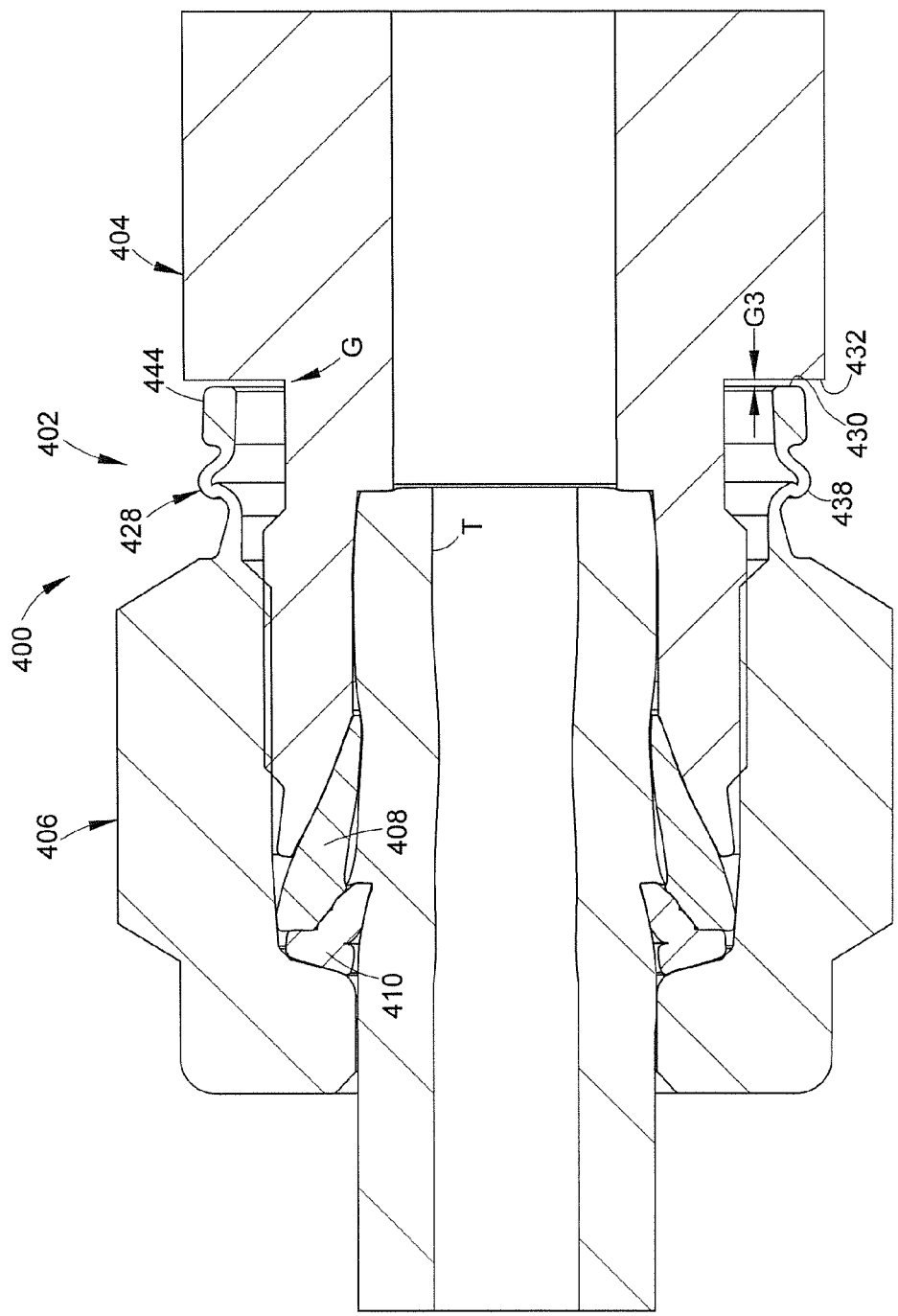
FIG. 12 illustrates the conduit fitting of FIGS. 4-6A in a FTP following the pull-up of FIG. 11.

FIG. 12 illustrates the fitting 400 in another FTP position prior to another remake after the nut 406 again was loosened from the body 404. Note that there may be a spring back of the ferrules 408, 410 although it is not noticeable, and with each remake becomes less and less as the ferrules plastically deform towards their maximum extent. Also note that the member 428 has taken a further plastic set due to the prior pull-up placing the member 428 under axial compression or axial load. As a result, in the FTP preparatory to another remake, there is a gap G3 between the end surface 430 of the member 428 and the contacting surface 432 on the body 404. The gap G3 will be smaller than the gap G2 of the prior pull-up due to the further axial compression and plastic set of the member 428.

It will be noted that with each pull-up the plastic deformation of the member 428 in effect produces a shorter axial length of the member 428. For example, in the FTP prior to initial pull-up the member 428 may have a length X. After an initial pull-up, presuming that the initial pull-up involved axial compression of the member 428, the member will have an axial length of X-Y where Y represents the reduction in axial length caused be the plastic set and axial compression of the member 428 during initial pull-up. After a remake, the member 428 may have an axial length of X-Y-Z where Z represents an additional reduction in axial length of the member 428 following another pull-up during remake of the fitting.

Figure 13:
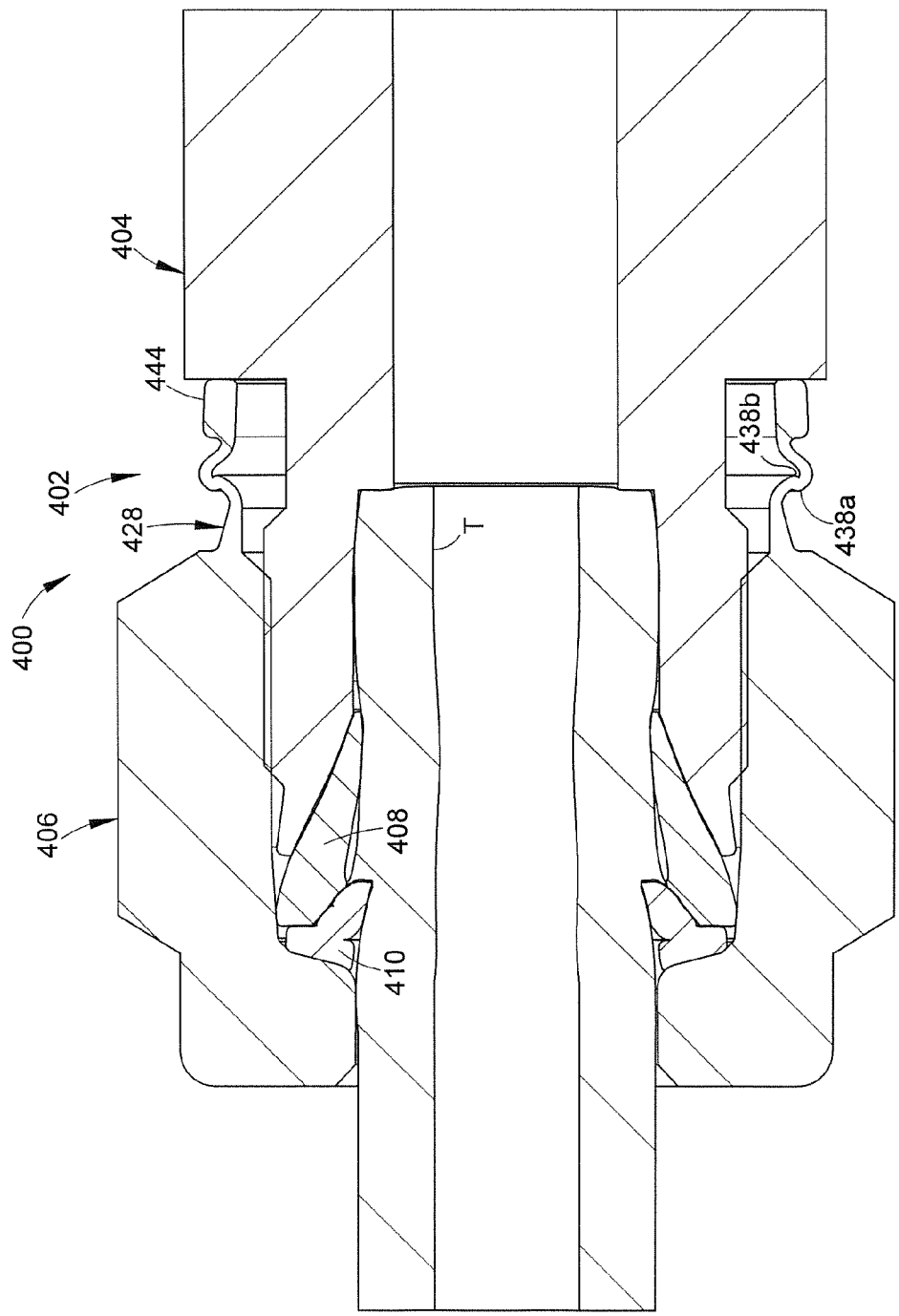
FIG. 13 illustrates the conduit fitting of FIGS. 4-6A after a second remake.

FIG. 13 shows the fitting 400 after the remake from the FTP position of FIG. 11. Again, the gap G3 has been reduced to zero as the body 404 and the nut 406 are further axially advanced together relative to each other. Note further the additional deformation of the member 428. Successive remakes and deformation of the member 428 show pronounced deformation and effect of the creases 438a and 438b. Again, the remake may be to the same or different torque as the prior pull-ups.

It should also be noted that any of the remakes may alternatively be made by turns rather than torque, as with the initial pull-up. Both techniques may be used throughout the life of the fitting 400.

A comparison of the change in the gap between the member 428 and the contacting surface 432 of the body illustrates another useful aspect of the member 428. Comparing FIGS. 7 and 8, or FIGS. 10 and 11, for example, when the gaps G1 and G2 are reduced to zero, there is a visually perceptible effect that indicates or gauges that pull-up has been completed. This is particularly so for an initial pull-up in which the member 428 is designed to make contact with the body 404. Therefore, the gaps G1, G2 and G3 that are present in the FTP positions prior to a pull-up provide the ability to visually confirm, or in other words the member 428 functions as a gauge, that pull-up has been achieved when the gap reduces to zero. With many remakes the FTP gap becomes smaller and smaller so that depending on the particular design of the member 428 and the fitting 400, the visual indication and ability to gauge may only be used or needed for a selected number of remakes, for example five remakes. But nonetheless, the member 428 provides a means and technique for visual verification that pull-up has been completely for the initial pull-up as well as remakes.

Although in the embodiment of FIGS. 4-13 we use the torque collar 402 for pull-up by torque of the fitting 400, and the torque collar 402 also may be used as a gauge to confirm pull-up was completed, separately we note that the member 428 may be used as a gauge only, regardless of whether the member 428 is also used as a torque collar for pull-up by torque. The member 428, whether integral as in FIGS. 4-13 or as a separate piece as described below, may be used as a gauge for a visual confirmation of initial pull-up and remakes for many different fitting designs, including non-metal fittings as well as fittings that are pulled-up or tightened to a final condition without a threaded connection. An example of a non-threaded mechanical connection for a conduit fitting is a fitting that is pulled-up by a clamping device. The usefulness of the member 428 as a gauge for pull-up indication derives from the incremental plastic deformation that occurs with each pull-up and remake.

The above description of an exemplary remake process is an available remake technique in which the body 404 and the nut 406 are rejoined to the FTP and then snugged up to further deform the member 428. The torque collar 402 provides another alternative way to remake the fitting 400. In an alternative remake process, the body 404 and the nut 406 are rejoined to the FTP and then further tightened until the distal end 430 contacts the contacting surface 432 of the body 404. This position is evidenced by the gap G being reduced to zero. This position would correspond to the just prior pulled-up position of the fitting 400. The body 404 and the nut 406 are then snugged up for an additional partial turn, for example a 0.125 partial turn although this amount will depend in part on how many remakes are made because the additional stroke consumed during remakes becomes smaller as the number of remakes increases. By using the gap G to determine return of the fitting to the just prior pulled up position, the additional snug up partial turn may be controlled and less stroke may be needed to snug up the body and nut to complete the remake. This alternative remake process may also be used with the non-integral torque collar embodiments described hereinbelow. The alternative remake process may be used with each of the remakes of the fitting if so desired.

FIGS. 14-22 illustrate another embodiment of a fitting 450 with a torque collar 452. In an embodiment, the torque collar 452 is a separate and distinct part of the fitting 450, as distinguished from the embodiment of FIGS. 4-13 in which the torque collar 402 is an integral part of the nut 406. As will be apparent, the torque collar 452 may be designed to operate in a manner similar to the embodiment of FIGS. 4-13. Like the embodiment of FIGS. 4-13, the torque collar may be axially fixed to a threaded fitting component (e.g., the threaded nut), but instead of being integral with the fitting component, the fitting component and the torque collar are retained together as a discontinuous subassembly or preassembly. In other embodiments (not shown), the torque collar may be loosely received between first and second threaded fitting components, with end portions of the torque collar engaging corresponding bearing portions of the first and second fitting components.

Like parts are labeled with like reference numerals as the embodiment of FIGS. 4-13 and will not be repeated. The torque collar 452 may be realized in the form of a ring 454 that may be separate from or alternatively may be attached to or joined with the nut 456. The torque collar 452 includes a stroke resisting member 458 that may be but need not be the same as the stroke resisting member 428 except that the member 458 extends from the ring 454 rather than from a portion of the nut. The member 458 may be designed to plastically deform, such as with a buckling effect for example or other plastic deformation, in the same manner as described above.

In the embodiments of FIGS. 14-22, 25, and 26, we show the torque collar 452 as being mechanically connected to the nut 456 with a cartridge feature that will be described hereinbelow. Alternatively, the torque collar 452 may be a free standing component and will still function in a similar manner.

The use of a separate torque collar 452 may provide a gauge feature in that until the torque collar 452 makes contact with the nut 456, the ring 454 can freely be made to spin or rotate about the X axis. After contact is made with the nut 456, the exemplary ring 454 is no longer freely rotatable or no longer freely spins, and therefore provides a gauge or visual indication that a complete pull-up has been performed. The member 458 presents a gap G with the nut in the FTP that may also provide a gauge indication as above. The gap G that is present in the FTP for initial pull-up and remakes allows the ring 454 to freely spin, wherein after pull-up or remake the gap is consumed by contact between the ring 454 and the body 404 so that the ring no longer freely spins. Thus the spin/no spin feature may alternatively be used to gauge the fitting 450 for each pull-up including the initial pull-up and one or more remakes that provides a gap G at the FTP. So long as the gap G at the FTP before each remake is greater than zero, the separate ring concept may be used to gauge pull-up. An outer surface or portion 454*a* of the ring 454 may be knurled, roughened or otherwise treated to facilitate spinning rotation of the ring 454.

In an alternative embodiment, the stroke resisting member 458 may be provided as an integral part of the nut 456 (as in the embodiment of FIGS. 4-13 herein) but the ring 454 (without an attached stroke resisting member) may be a separate non-integral component. FIG. 30 illustrates just one example of such an arrangement. This alternative embodiment provides the same assembly by torque functionality if so desired and also allows the ring 454 to provide the gauging function or indication of completed pull-up based on whether the ring 454 can freely spin or not.

Referring back to FIG. 14, the member 458 has a first or proximal end or proximal ring portion 458*a* and a second or distal end or distal ring portion 458*b*. The member 458 may include a first cylinder portion or first axially extending wall portion 460 having an inner diameter D3 and a second cylinder portion or second axially extending wall portion 462 having an inner diameter D4. D4 may be greater than D3 in the embodiment, however, the opposite may be used or the diameters may be the same. The outer diameters of the first and second wall portions may likewise vary with respect to each other. A web 464 joins the first cylinder portion 460 with the second cylinder portion 462, and the web may be angled with respect to each of the first and second wall portions to define a hinge portion, by use of the same radius transitions 464*a*, 464*b* to form creases to facilitate buckling or other desired deformation of the member 458 under axial load or axial compression. The first and second wall portions and the web may be provided with radial thicknesses that are smaller than corresponding radial thickness of the proximal and distal ring portions, for example, to facilitate buckling or other such controllable deformation. In one embodiment (not shown), the distal ring portion may have a radial thickness that is substantially the same as the second wall portion. In still other exemplary embodiments, the first and second axially extending wall portions may extend at an angle with respect to a central axis, such that the inner and outer diameters of the first and second wall portions vary, for example, to facilitate buckling or other such controllable deformation in response to an axial load.

Figure 14:
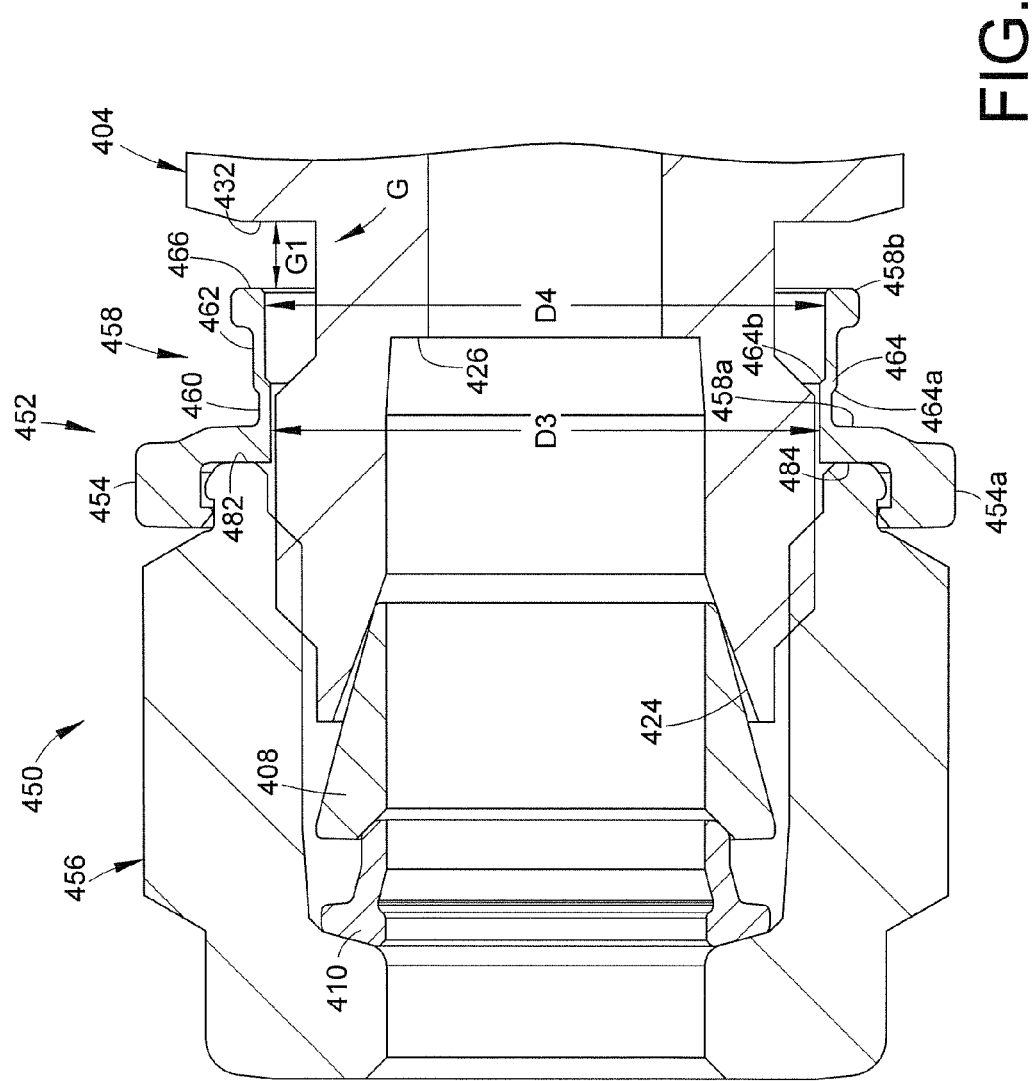
FIG. 14 illustrates another embodiment of a conduit fitting in longitudinal cross-section that utilizes a non-integral stroke resisting member, the fitting being shown in FTP.
Figure 15:
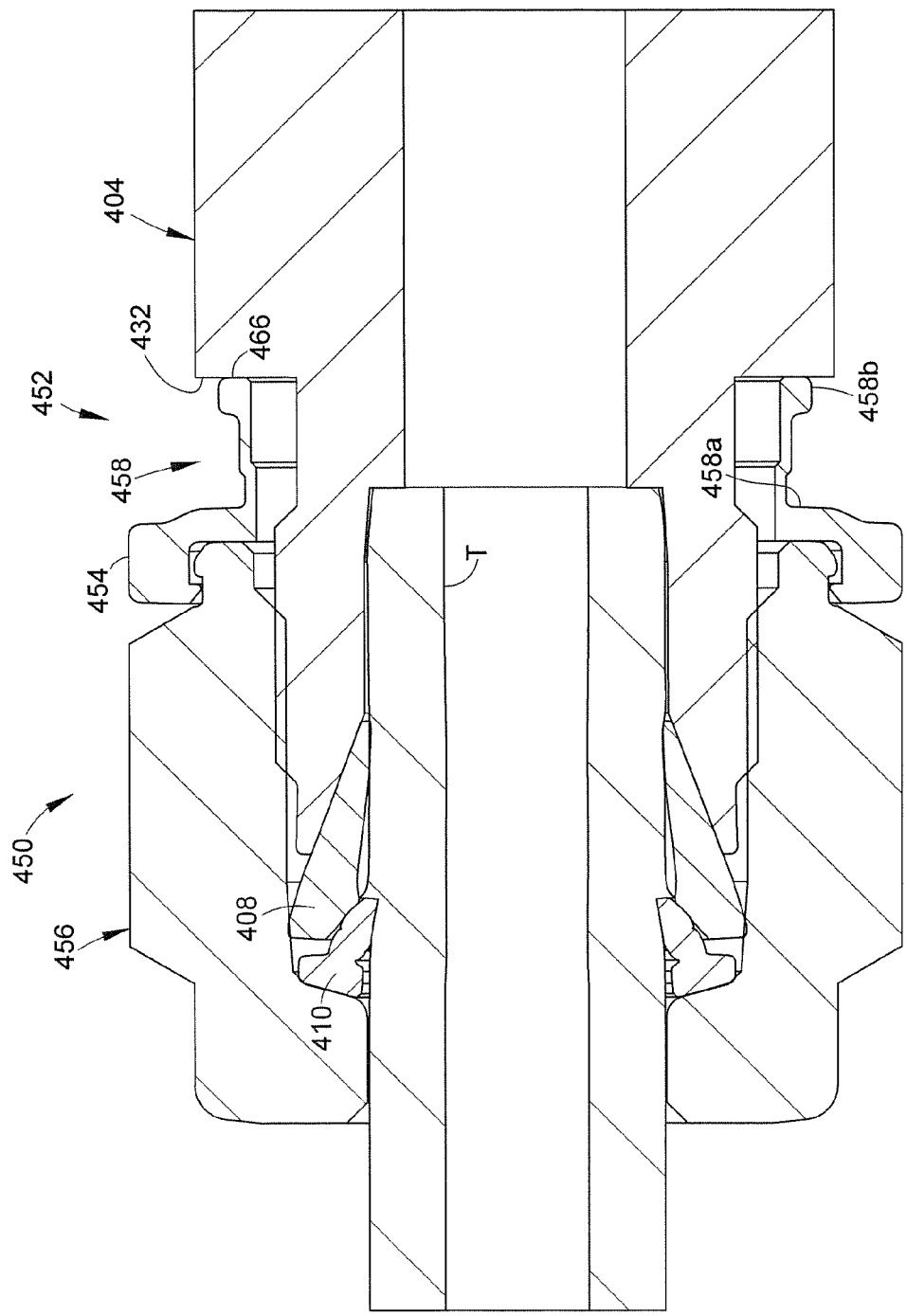
FIG. 15 illustrates the conduit fitting of FIG. 14 in a pulled-up position.
Figure 16:
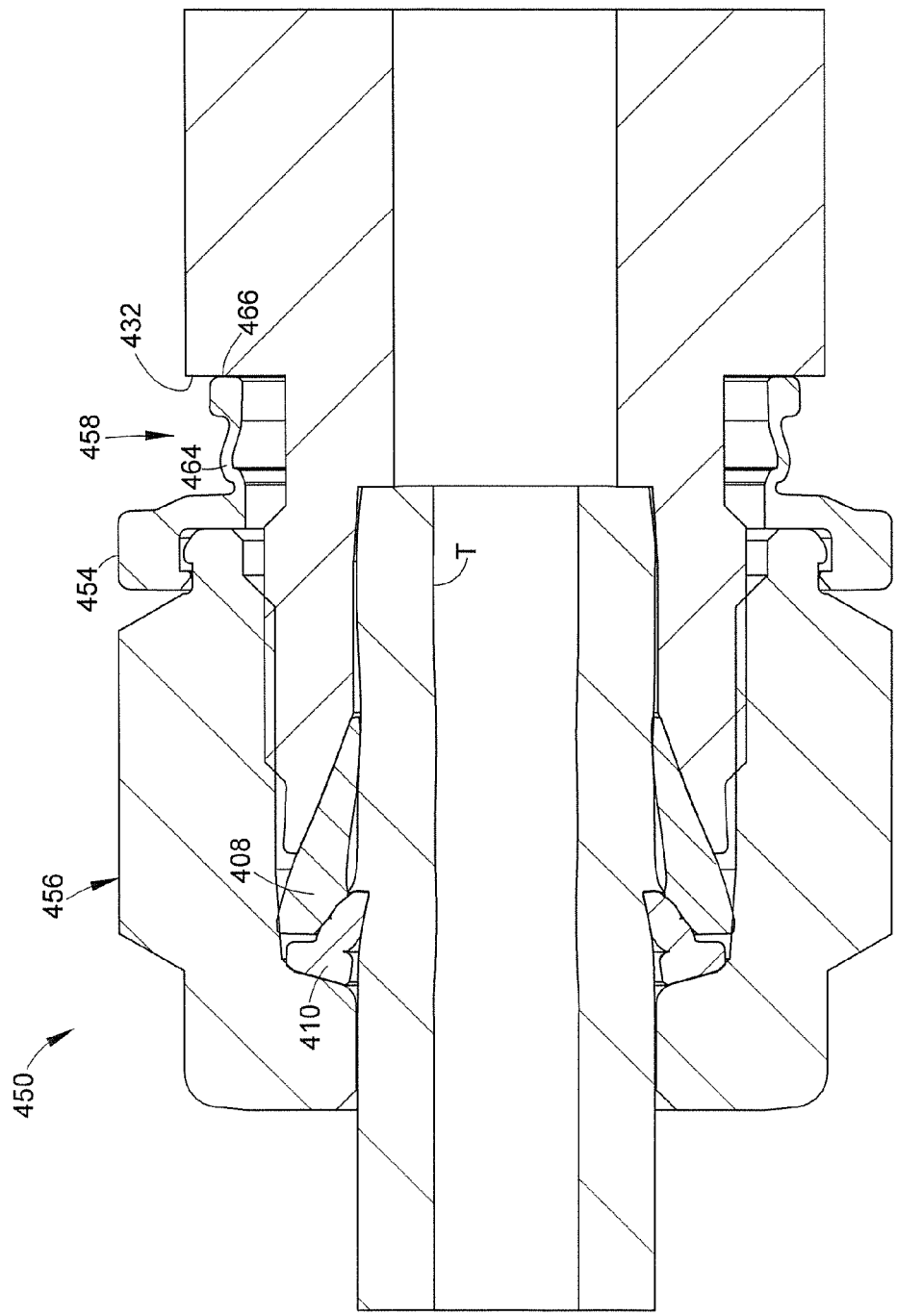
FIG. 16 illustrates the conduit fitting of FIG. 14 in a pulled-up position past the position of FIG. 15.
Figure 17:
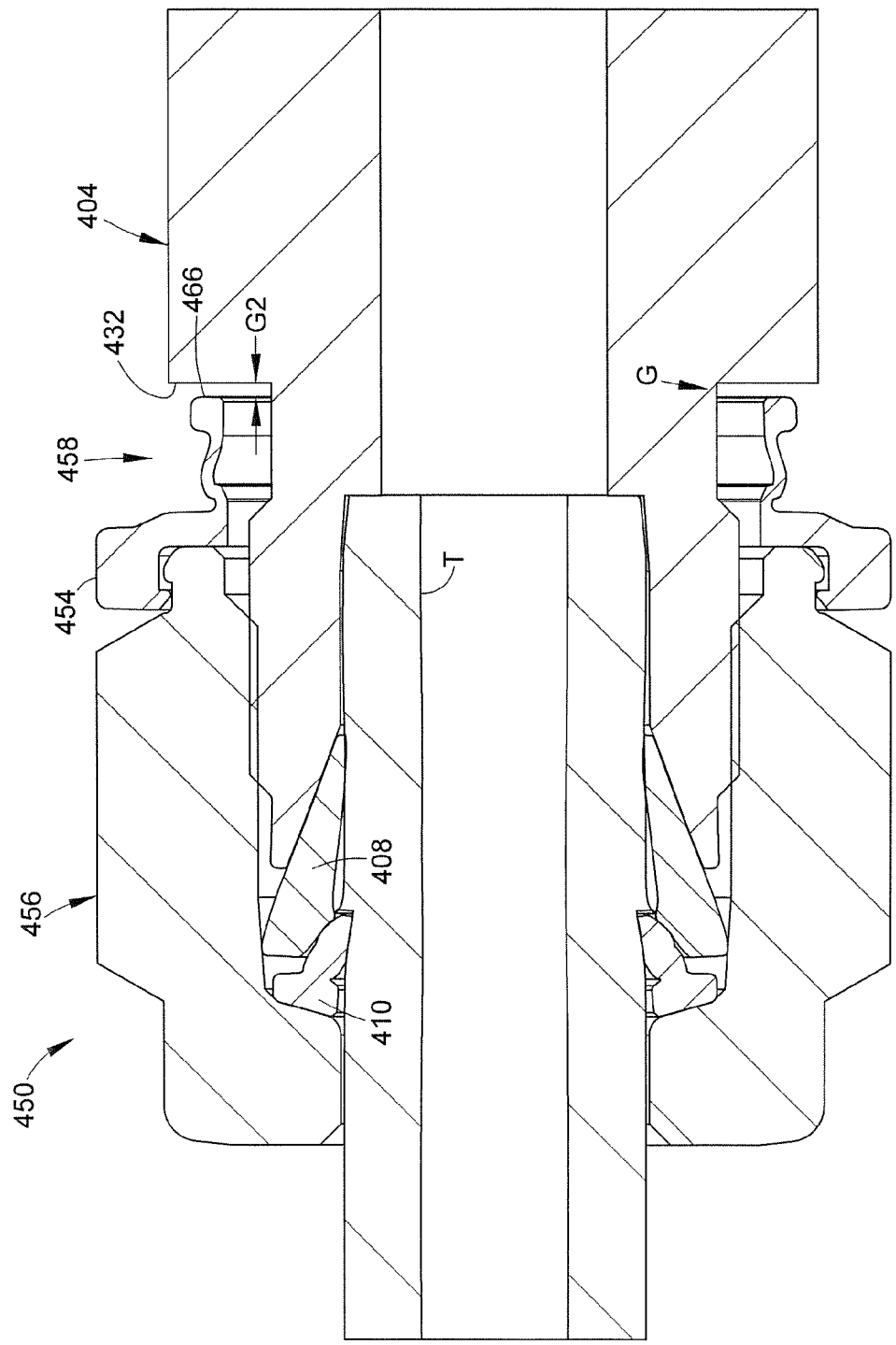
FIG. 17 illustrates the conduit fitting of FIG. 14 in a FTP following the pull-up of FIG. 16.
Figure 18:
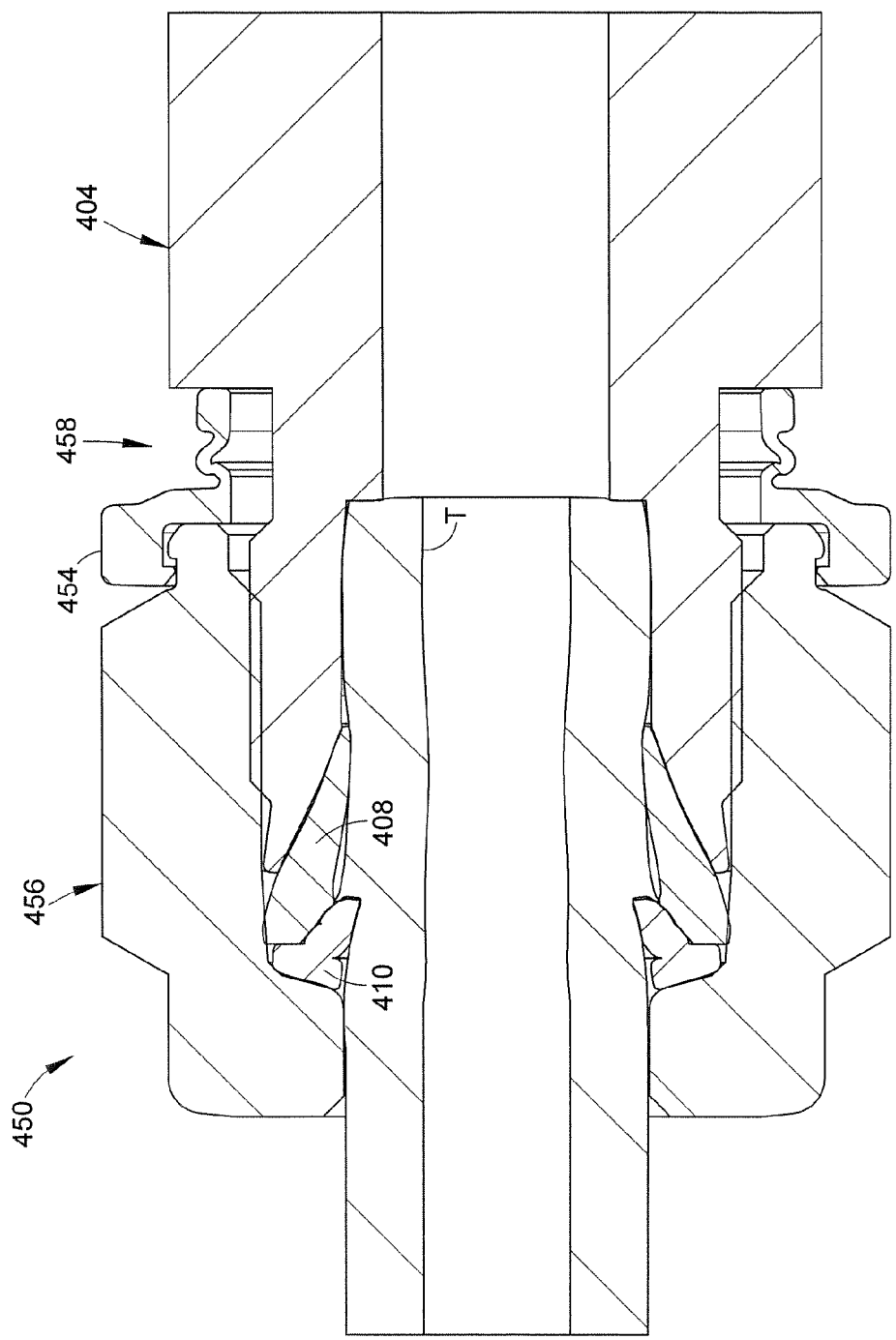
FIG. 18 illustrates the conduit fitting of FIG. 14 after a remake.
Figure 19:
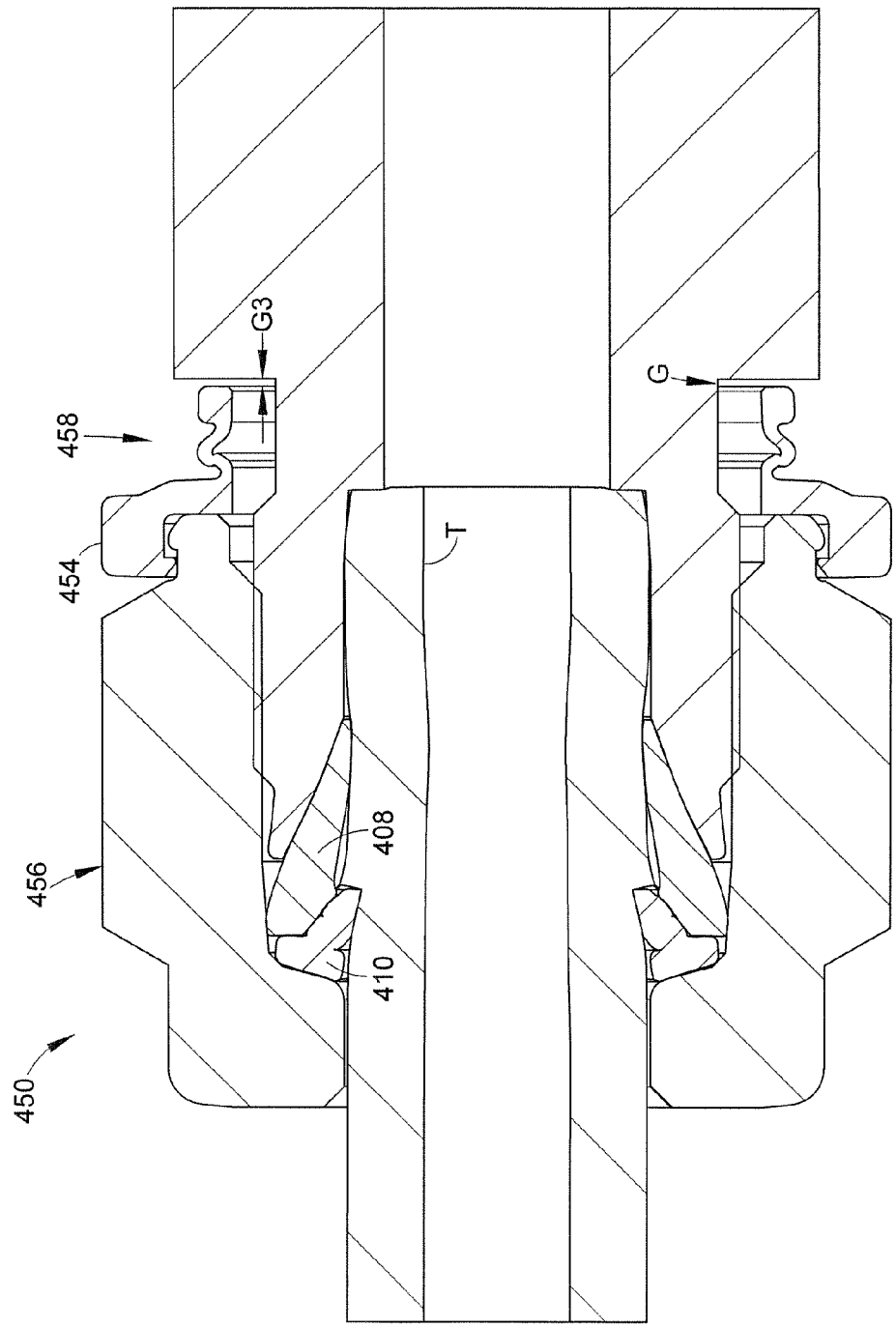
FIG. 19 illustrates the conduit fitting of FIG. 14 in a FTP following the remake of FIG. 18.

FIG. 14 is comparable to FIG. 7 and illustrates the fitting 450 at the FTP prior to the initial or first time pull-up. Note that the gap G1 is provided as in the previous embodiment (the conduit T is not shown in FIG. 14). FIG. 15 is comparable to FIG. 8 and shows initial contact between an end surface or bearing surface 466 of the distal end 458*b* of the member 458 and a radially extending contacting surface 432 of the body 404, wherein the gap G1 has been reduced to zero. This figure may represent either contact at the full pulled-up position or just prior to the full pulled-up position as noted above. In either case, further relative axial stroke between the body 404 and the nut 456 produces an axial load or axial compression on the member 458. FIG. 16 is comparable to FIG. 9 and illustrates an example of a completed initial pull-up position in which there has been deformation of the member 458. FIG. 17 is comparable to FIG. 10 and illustrates a FTP prior to a remake of the fitting 450. The gap G2 is smaller than the gap G1 because of the plastic deformation of the member 458. The ferrules 408, 410 also exhibit some spring back. FIG. 18 is comparable to FIG. 11 and illustrates the fitting 450 after pull-up for a remake of the fitting from the FTP of FIG. 17. The member 458 has been further deformed by action of the buckling of the web 464. FIG. 19 is comparable to FIG. 12 and illustrates a FTP prior to another remake subsequent to the remake of FIG. 18. The member 458 has been further deformed and the gap G3 is smaller than the gap G2 due to less spring back of the ferrules 408, 410.

Although the torque collar 452 is a separate and discrete part from either of the fitting components 456 and 404, we provide an embodiment for connecting or cartridging the torque collar 452 to the nut 456. We use the terms "cartridging" and "cartridging process" interchangeably herein to refer to the act or steps of joining a first fitting component (e.g., a torque collar or a front ferrule) with a second fitting component (e.g., a fitting nut or a back ferrule) to form a cartridged subassembly or pre-assembly. A similar technique may be used to connect the torque collar 452 alternatively to the body 404. Other structures and techniques may be used as needed.

Figure 20:
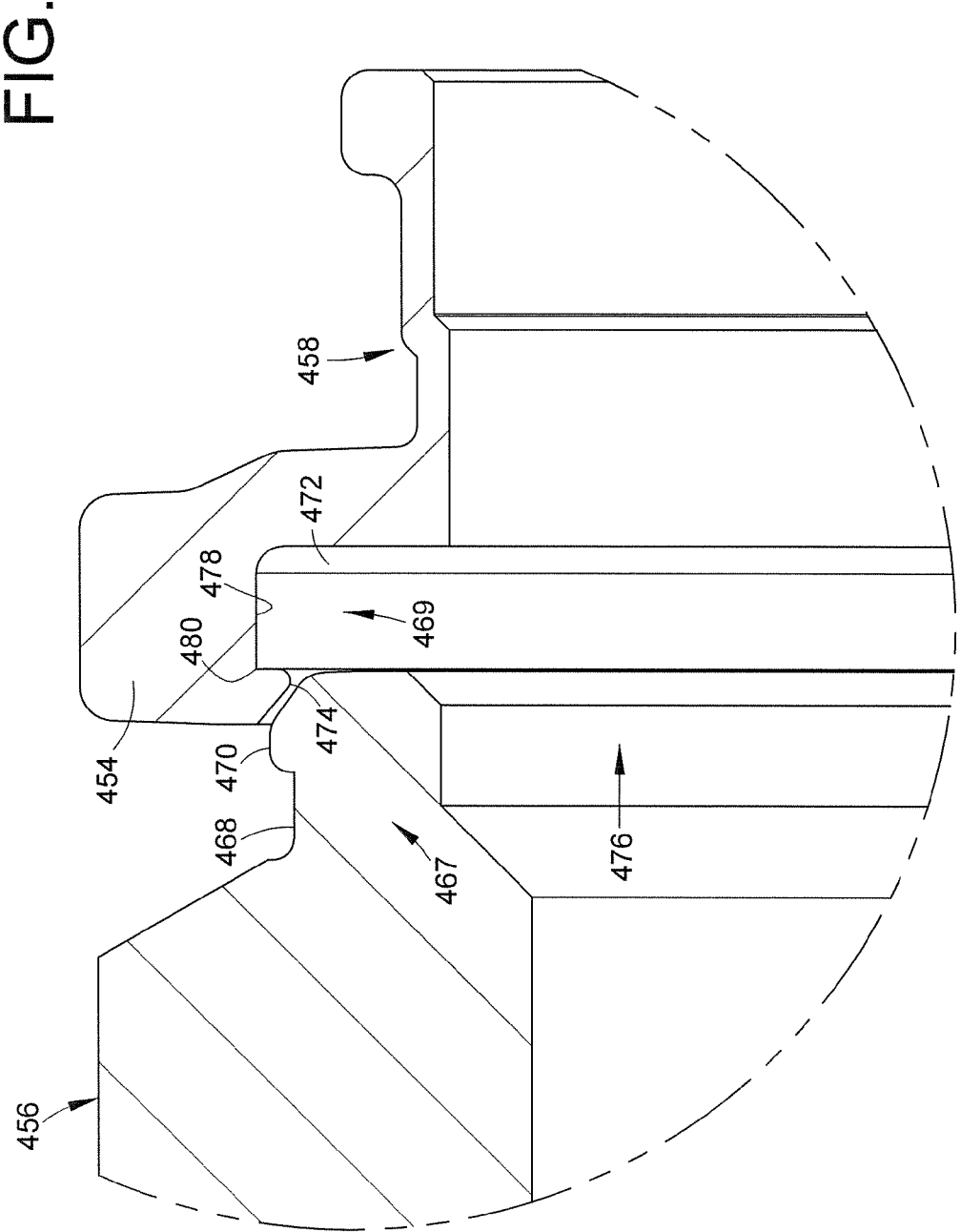
FIGS. 20-22 illustrate a cartridging structure and process for cartridging a torque collar to a fitting component.
Figure 21:
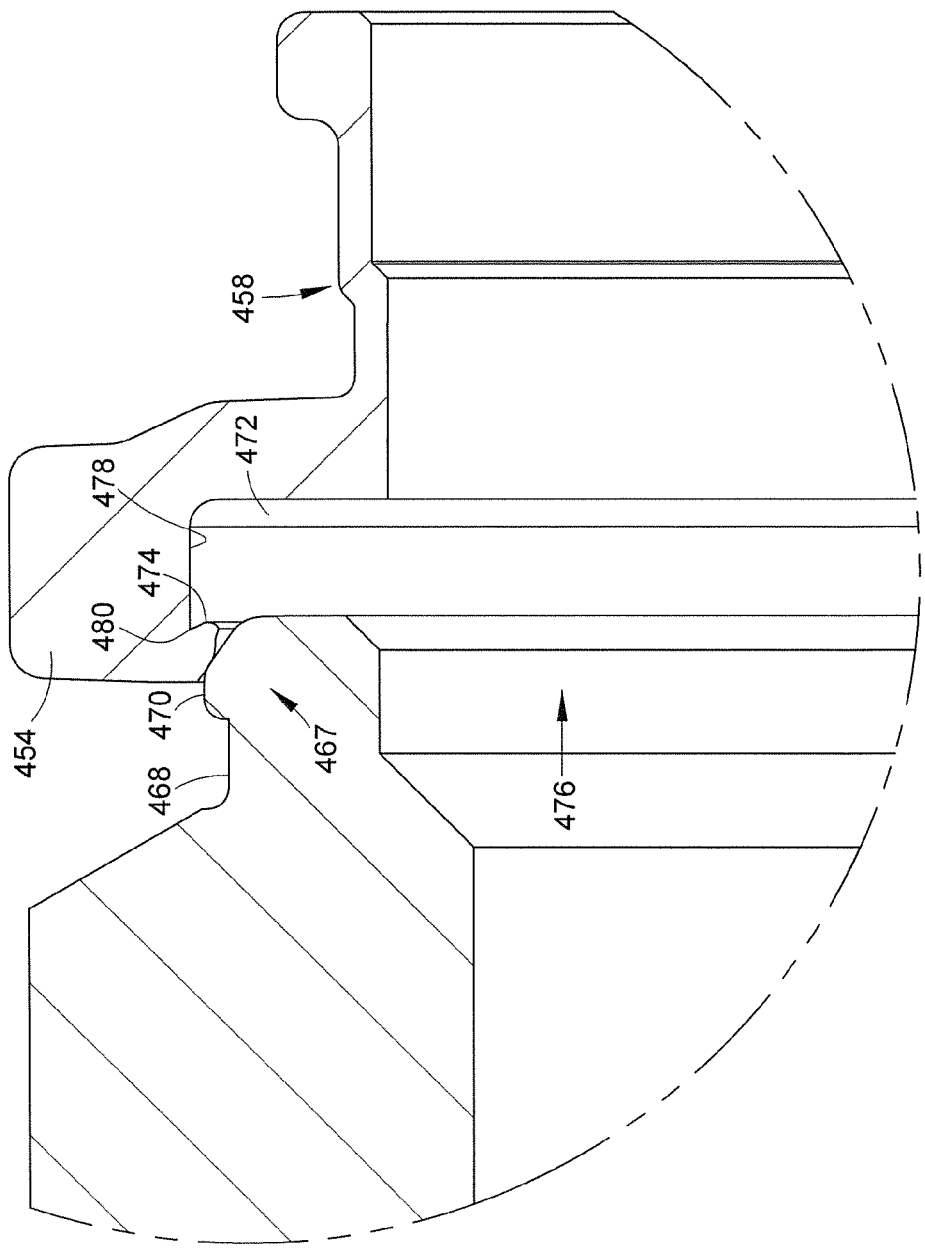
Figure 22:
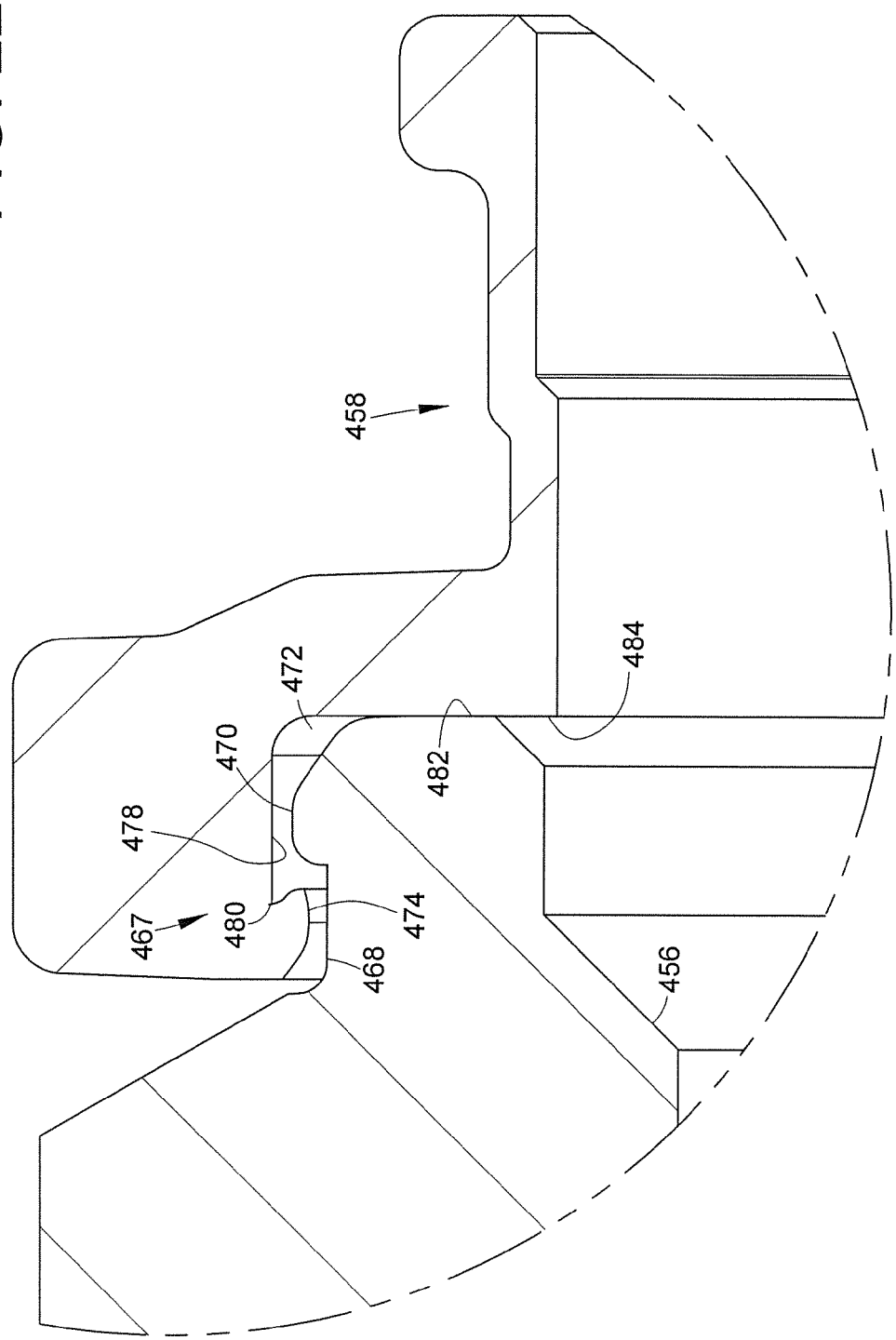

With reference to FIGS. 20-22 we illustrate steps in the cartridging process as well as the cartridge structure. These figures are enlarged views of the mechanical connection or cartridge structure 467 between the torque collar 452 and the nut 456 in FIGS. 14-19. The nut 456 may include a cartridge feature in the form of an annular extension 468 having a radially outward rib 470. This rib 470 is received in a recess 472 formed in a rearward portion of the ring 454. This rearward portion may include a cartridge feature 469 in the form of a radially inward extending hook, barb, or other such protrusion 474 and the recess 472. In the position of FIG. 20, the rib 470 is being axially inserted into the recess 472 through an opening 476 that is delimited by the minor inside diameter of the hook 474. The major outside diameter of the rib 470 is greater than the minor diameter of the opening 476 so that there is an interference to pushing the rib 470 past the hook 474. As illustrated in FIG. 21, this interference causes the rib 470 to push on the hook 474. The hook 474 and the recess 472 are defined in part by a wall 478 that may include a sharp corner (i.e. small radius) or crease 480 that facilitates forward (to the right as viewed in the drawing) bending or folding of the hook 474. This deformation of the hook 474 enlarges the diameter of the opening 476 enough so that the rib 470 passes through the opening 476 and is received in the recess 472. As illustrated in FIG. 22, the deformed hook 474 preferably undergoes a plastic and an elastic deformation. The plastic deformation facilitates separating the torque collar 452 from the nut 456 if so desired after cartridging the two together. The elastic deformation allows the hook 474 to spring back sufficiently so that there is still an interference with the rib 470, thus retaining the torque collar 452 with the nut 456 with a reasonably robust connection. From FIGS. 14 and 22 it will be noted that the extension 468 may include an end surface 482 that will contact and push on a portion 484 of the wall 78 that delimits the recess 472 so that the torque collar 452 is axially displaced with the nut 456 during pull-up.

It should be noted that the cartridge feature 469 of the folding hook 474 and the recess 472 may be used in other applications other than to cartridge a torque collar to a fitting component, in that it provides a cartridge structure and process that may be used to connect two parts together, particularly metal parts, for example, parts comprising stainless steel. Therefore, an inventive concept presented herein is for a cartridge feature 469 that cooperates with a mating part to cartridge two devices together, and FIG. 20 is an embodiment thereof. The mating part may be any part that has a second cartridge feature that is retained by the cartridge feature 469—an example of which is a nut with an extension 468 and the rib 470 but such is just one example.

Figure 23:
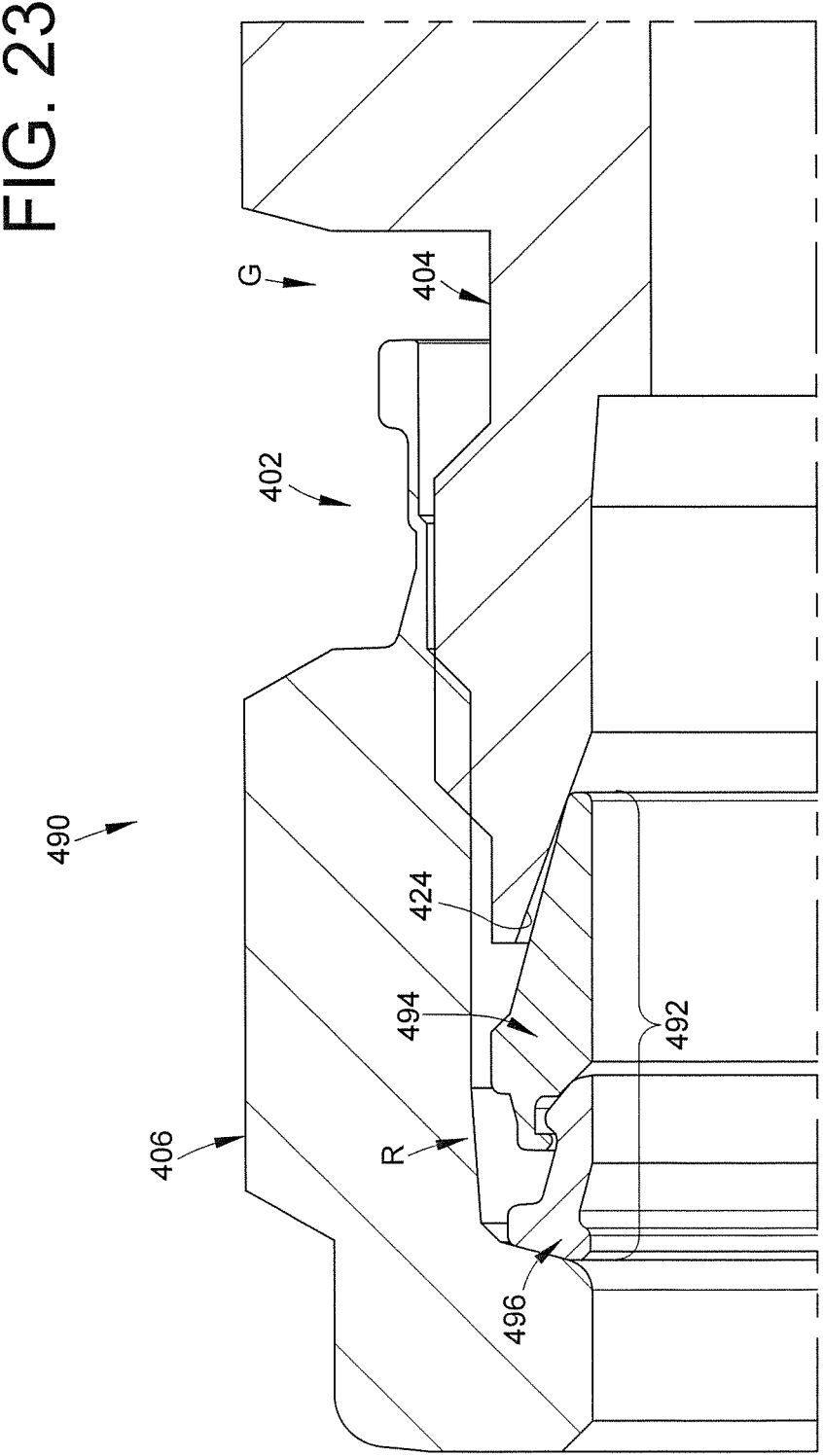
FIGS. 23 and 24 illustrate alternative embodiments of the embodiment of FIGS. 4-13.
Figure 24:
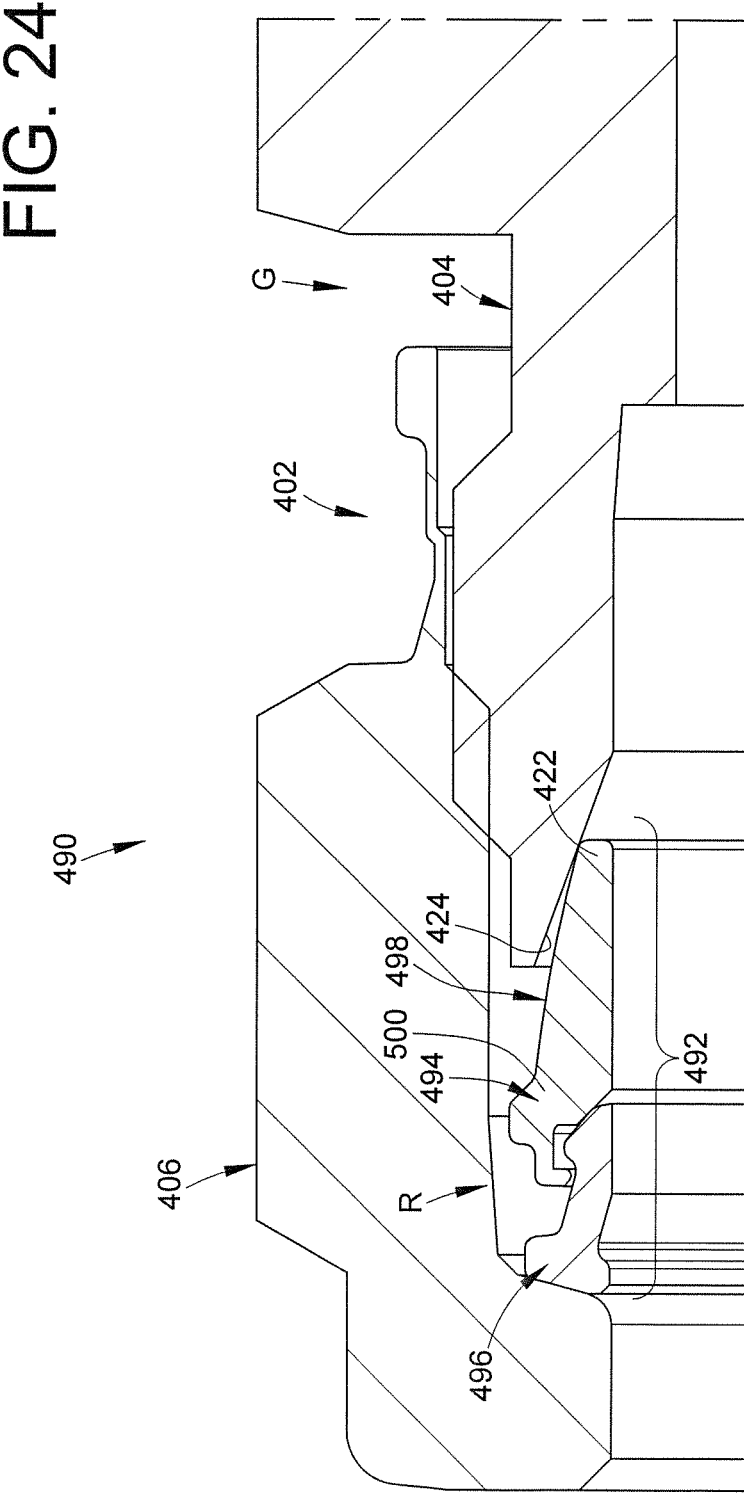
Figure 25:
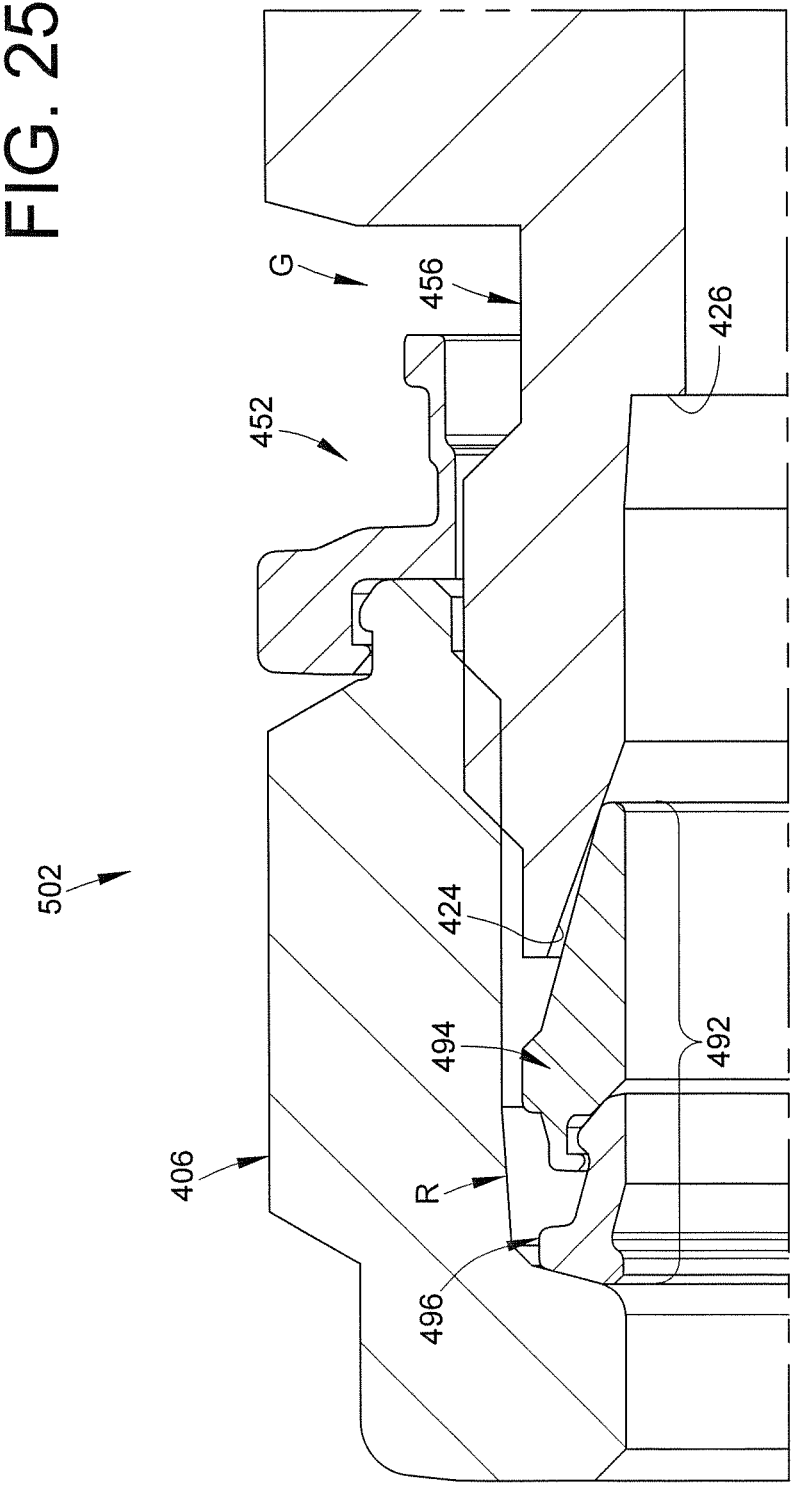
FIGS. 25 and 26 illustrate alternative embodiments of the embodiment of FIGS. 14-22.
Figure 26:
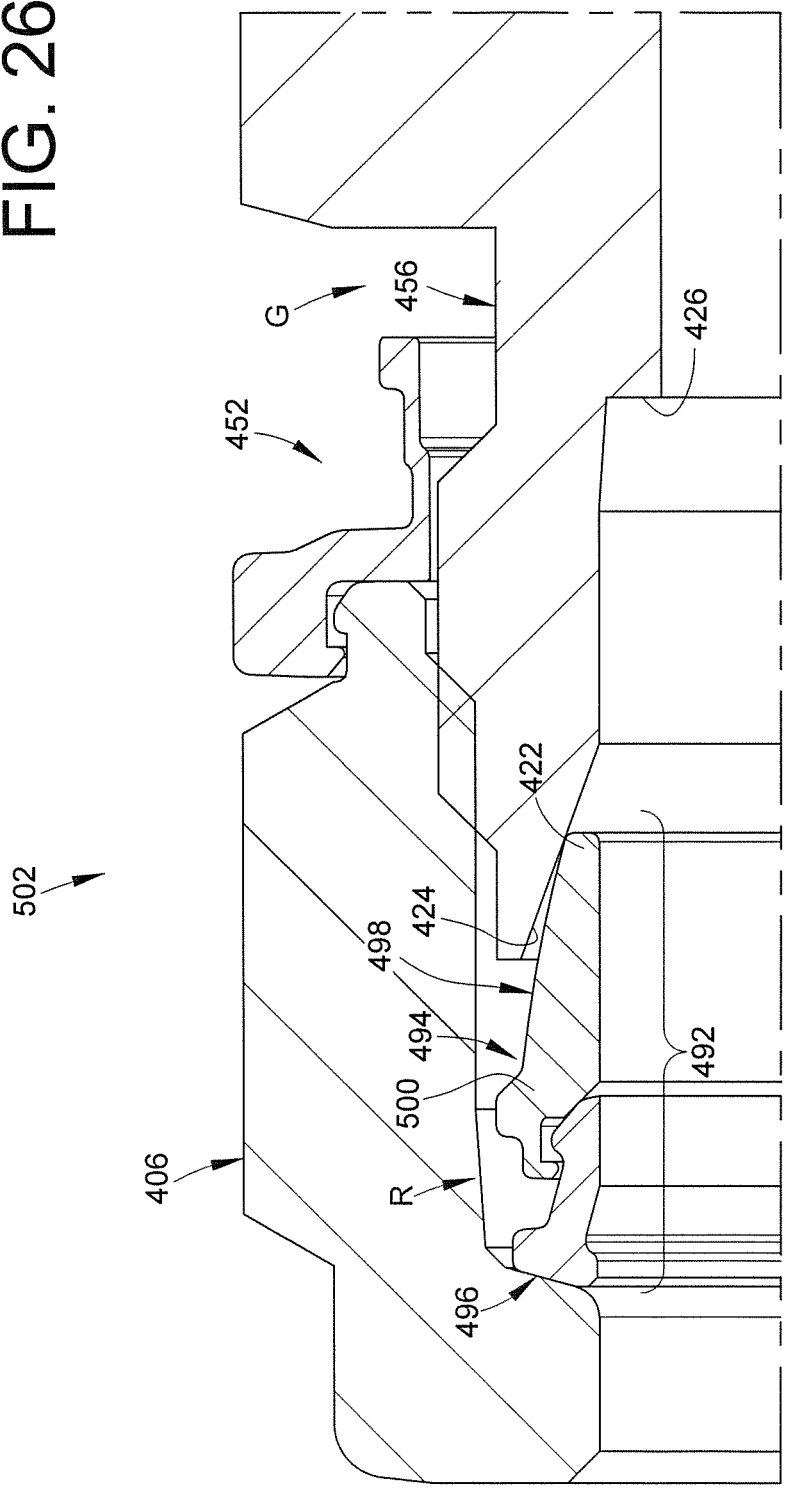

With reference to FIGS. 23-26 we illustrate additional alternative embodiments for a fitting that uses a torque collar as described hereinabove (like parts are given like reference numerals). FIGS. 23 and 24 provide a fitting 490 that may be but need not be the same embodiment as FIGS. 4-13 of an integral torque collar 402 that may be an integral part of the nut 406 (or alternatively, but not shown, an integral part of the body 404). FIGS. 25 and 26 illustrate a fitting 502 that may be but need not be the same embodiment as FIGS. 14-22 of a non-integral torque collar 452 that may be a separate and distinct part from the nut 406 and that either remains a separate third element of the assembly of the nut 456 and the body 404, or may be cartridged or otherwise attached to the body 404 or alternatively to the nut 456. The alternative embodiments of FIGS. 23-26 incorporate a ferrule cartridge or ferrule subassembly 492, in which the front ferrule 494 and the back ferrule 496 are connected or "cartridged" together with a mechanical connection or retaining structure R, as described in greater detail below. Other exemplary ferrule cartridge arrangements that may be utilized are described in co-pending U.S. Patent Application Publication No. 2010/0148501 (the "'501 application"), entitled "Ferrule Assembly for Conduit Fitting," and incorporated herein by reference in its entirety.

The alternative embodiments of FIGS. 24 and 26 further incorporate a front ferrule 494 having a convex portion 498 of an outer wall or surface between the forward portion 422 of the front ferrule and a rearward portion 500 of the front ferrule, for example, to facilitate concentration of radial load forces from the front ferrule to an axially inboard portion of the fitting body camming mouth, as described in greater detail below.

With reference next to FIGS. 27-32B, we present additional alternative embodiments for the stroke resisting member, for example, the member 428, 458 and other embodiments. Although the embodiments of FIGS. 27-32B are shown for a non-integral design with the torque collar cartridged to the nut with a cartridge structure 467, these embodiments may alternatively be used with integral stroke resisting members, as well as non-integral members that are not cartridged or otherwise mechanically connected or attached to a fitting component such as a body or nut. The different embodiments (other than FIGS. 30 and 30A) are directly primarily to the shape and geometry of the portion of the stroke resisting member that undergoes deformation resulting from the member being axially compressed or loaded during pull-up and remake. In other words, various portions of the member that are between the proximal end and the distal end of the member. In the various embodiments, a fitting may include a body 404, a nut 406, and one or more ferrules such as a front ferrule 408 and a back ferrule 410 as in the embodiments described above, which may function in a similar manner, although other designs may be used (like reference numerals are used for like parts in the above described embodiments for convenience). Therefore, the description of FIGS. 27-32B is directed to the geometry of the stroke resisting member and not repeat the description of the other parts of the fitting. All of FIGS. 27-32B illustrate a fitting that is in the FTP and do not show the conduit as yet inserted.

Figure 28:
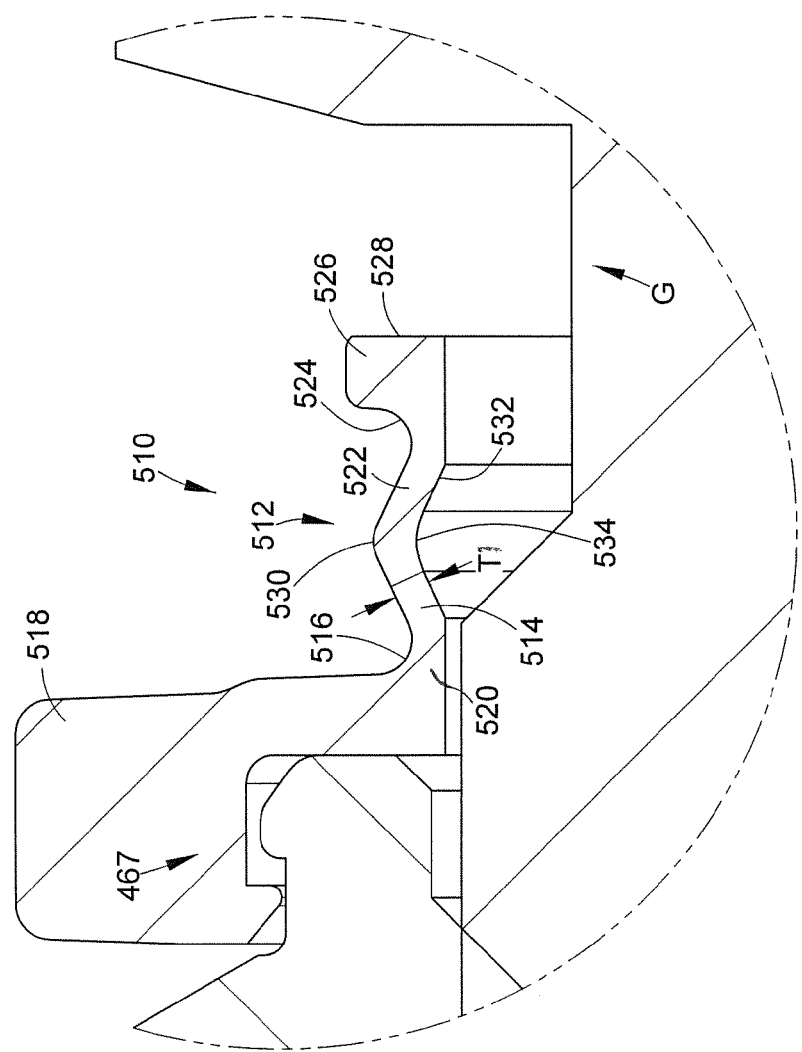

An embodiment is illustrated in FIGS. 27, 28 and 28A. The stroke resisting member 510 may include a generally W shaped profile in cross-section with a middle web portion 512 having an inverted V profile. An inboard leg 514 of the V portion 512 may blend (e.g., with a radius portion 516) at an axially extending first wall portion 520 to a proximal ring portion 518 at a proximal end of the member 510. An outboard leg 522 of the V portion 512 may blend (e.g., with a radius portion) at an axially extending second wall portion 524 to a distal ring portion or flange 526 at a distal end 528 of the member 510. The legs of the V portion are angled with respect to the first and second wall portions to define a hinge portion. The apex of the V may be formed by an outer radius 530 that joins the outboard leg 522 to the inboard leg 514, and as shown, may be entirely radially outward of the axially extending wall portions 520, 524 joined by the web. The legs 514, 522 may but need not have a uniform thickness T1, and may be reduced in thickness with respect to the proximal and distal ring portions. A radially inner surface 532 of the V portion may have a different size inner radius 534 from the outer radius 530. The radiuses as well as other portions of the member 510 may be used as hinge points or locations to facilitate the design and control of the deformation.

Another embodiment is illustrated in FIGS. 29 and 29A. The stroke resisting member 540 may include a web 542 that joins a distal end or distal ring portion 544 of the member 540 to a proximal end or proximal ring portion 546 of the member 540. The web 542 may have a varying thickness T2 that increases in an inboard direction—for example—an outboard portion may have a thickness T2' and an inboard portion may have a thickness T2".

Figure 31:
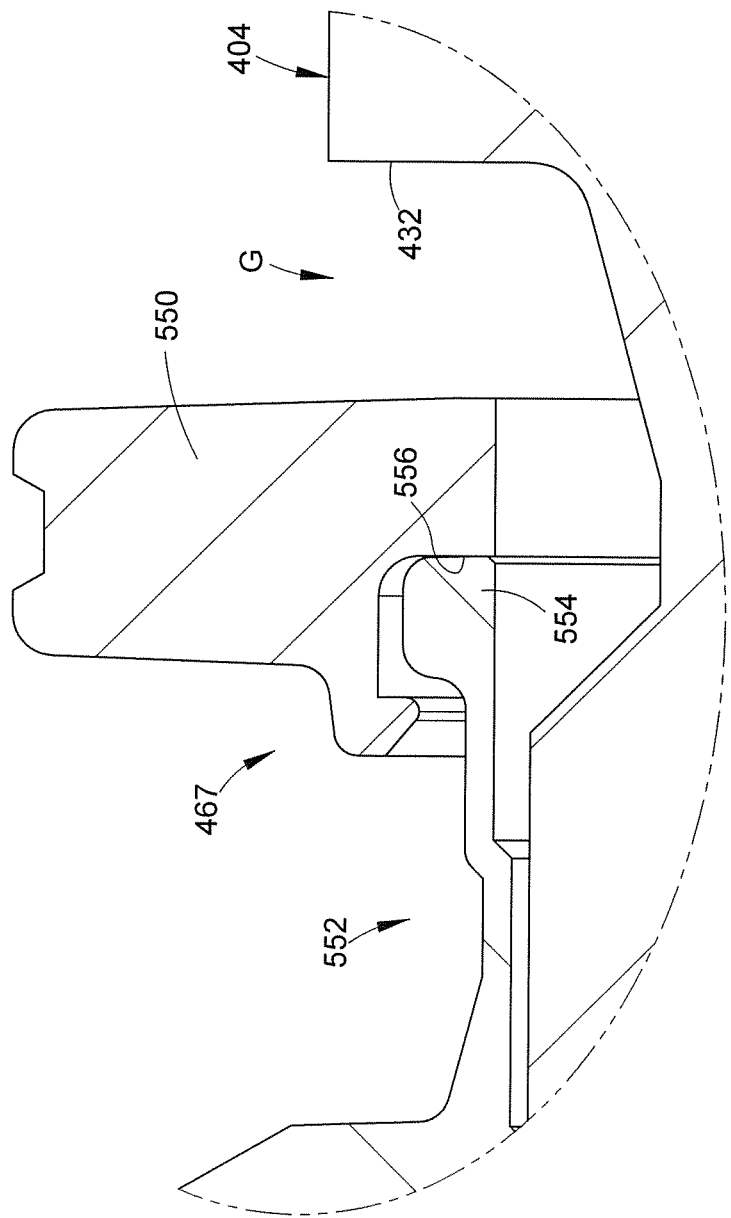

In an embodiment illustrated in FIGS. 30 and 31, we illustrate an embodiment in which an indicator ring 550 is a separate part from the stroke resisting member 552. The stroke resisting member 552 may be integral with the nut 406 or may be still another separate part that is cartridged to the nut 406. The indicator ring 550 may be cartridged to a distal end 554 of the member 552 using a cartridge structure such as the structure 467 described hereinabove or other structure as needed. The stroke resisting member 552 may be but need not be the same as the member 428 in the embodiment of FIGS. 4-13. The indicator ring 550 therefore may be used as a gauge in which the ring freely spins when it is not in contact with the contacting surface 432 of the body 404. Note that the distal end 554 of the member 552 will be driven against an interior surface 556 of the indicator ring 550 rather than directly against a surface of the body 404.

Figure 32:
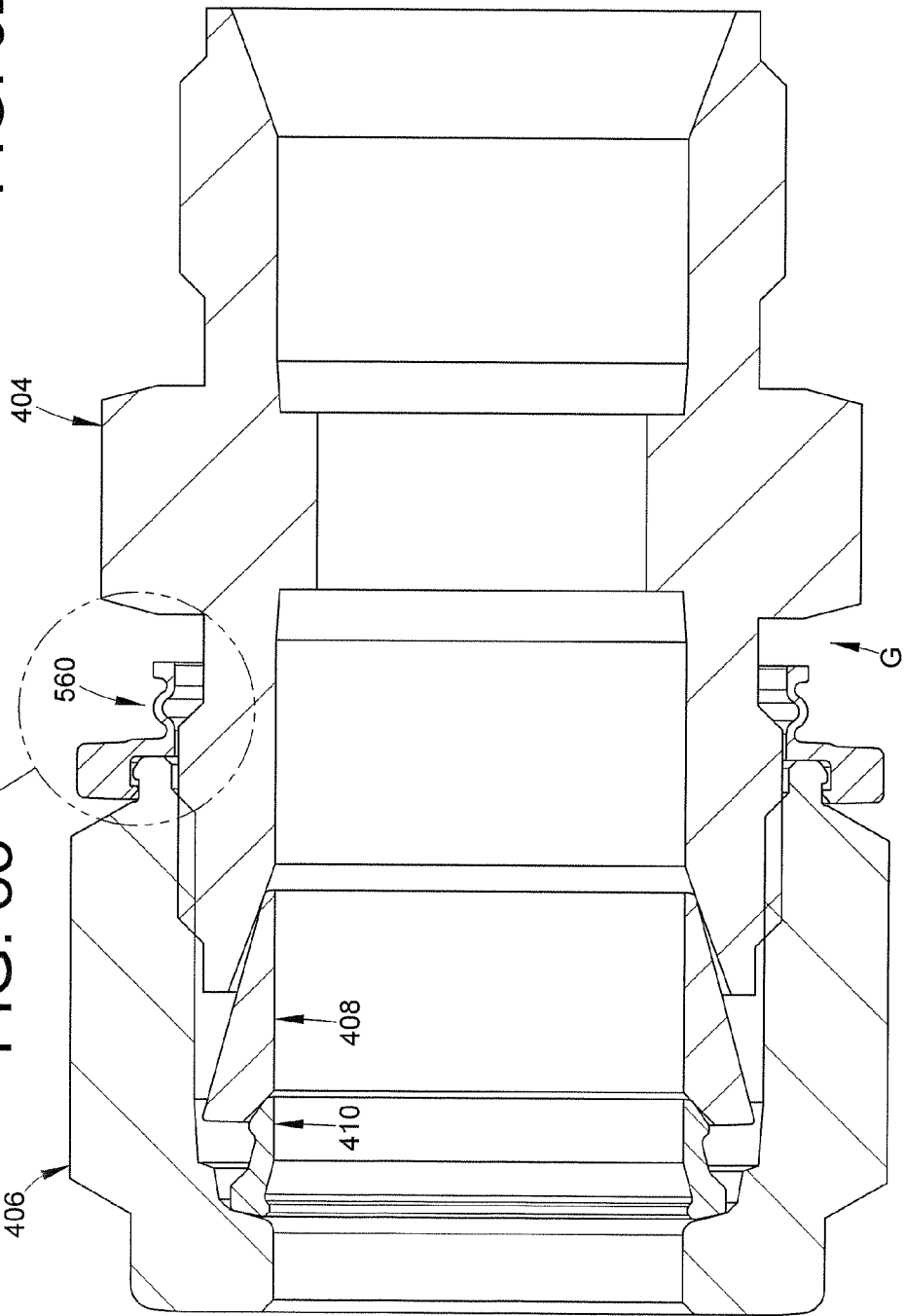
Figure 33:
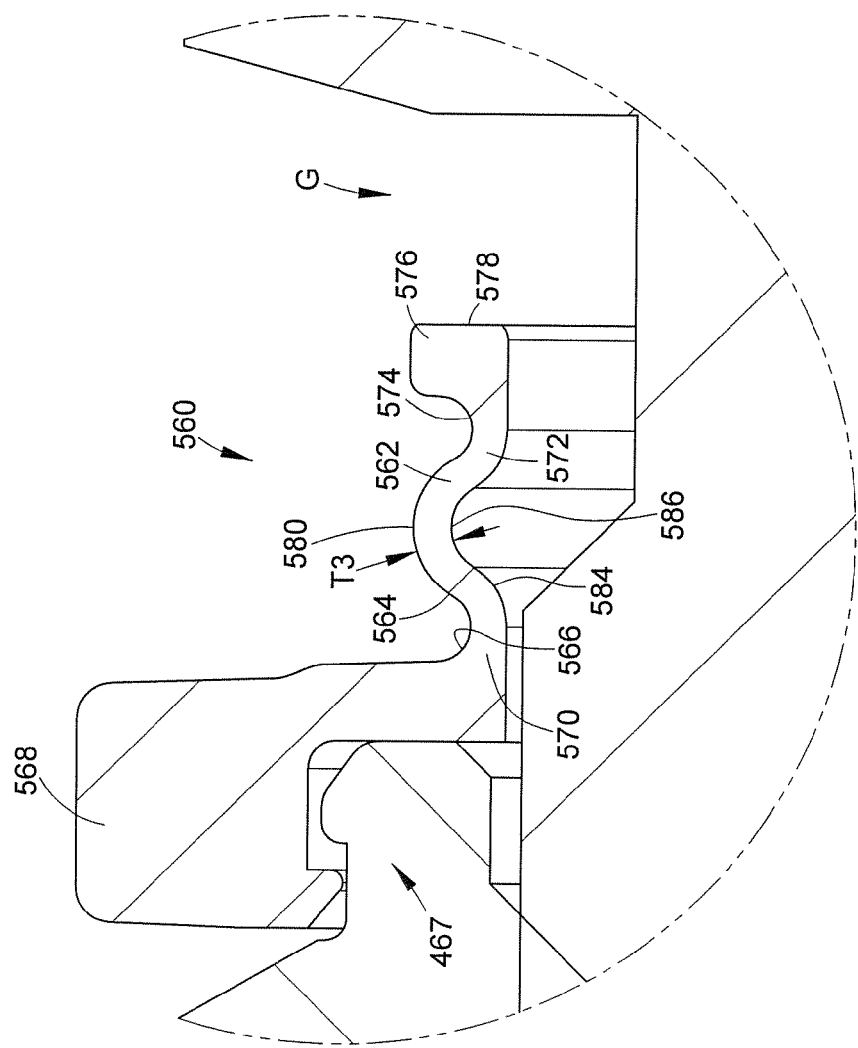

In an embodiment of FIGS. 32 and 33, the stroke resisting member 560 may include a generally omega or arcuate shaped profile in cross-section with a middle portion 562 having a rounded omega profile. An inboard leg 564 may blend with a radius portion 566 to a ring 568 at a proximal end 570 of the member 560. An outboard leg 572 may blend with a radius portion 574 to a flange 576 at a distal end 578 of the member 560. The rounded middle portion 562 may be formed by an outer radius 580 that joins the outboard leg 582 to the inboard leg 564. The legs 564, 582 may but need not have a uniform thickness T3. A radially inner surface 584 of the middle portion may have a different size inner radius 586 from the outer radius 580. The radiuses 566, 574 and 580 as well as other portions of the member 560 may be used as hinge points or locations to facilitate the design and control of the deformation.

Figure 35B:
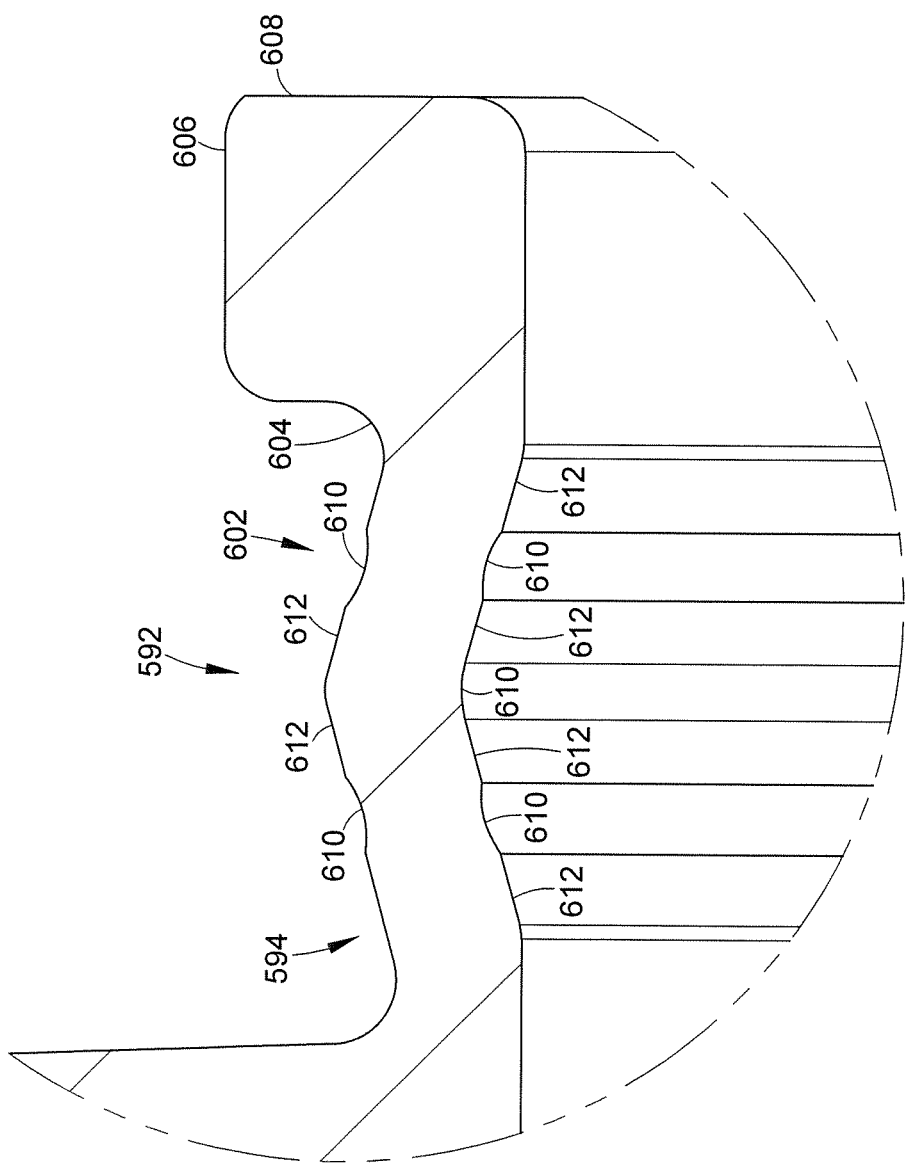

In an embodiment of FIGS. 34, 35A and 35B, a stroke resisting member 590 may include a generally W shaped profile in cross-section with a middle portion 592 having an inverted V profile, somewhat similar in general shape to the embodiment of FIG. 28 but among other things the W shape is less pronounced radially. An inboard leg 594 may blend with a radius portion 596 to a ring 598 at a proximal end 600 of the member 590. An outboard leg 602 may blend with a radius portion 604 to a flange 606 at a distal end 608 of the member 590. The legs 594, 602 differ from the embodiment of FIG. 28 in that the legs have a somewhat scalloped appearance due to a more complex geometry. Each leg 594, 602 may include one or more radius portions 610 and tapered portions 612 to provide added design options to control deformation of the member 590 under axial load or compression. The legs may be identical with each other but need not be identical. The scalloping effect allows a designer to selectively position more or less material where needed to control deformation of the member 590.

In the embodiments of FIGS. 4-35B, the stroke resisting member or torque collar provides an axially deformable stroke limiting feature having an axial length that is altered by buckling, collapsing, folding, or otherwise compressing a plastically deformable web portion of the torque collar disposed between a body driven portion of the torque collar and a nut driven portion of the torque collar. This plastic axial deformation results in axial movement of a radially extending surface that engages an axially advancing surface of one of the fitting body and the fitting nut during pull-up. In other embodiments of the present application, a stroke limiting arrangement may provide for other types of plastic axial deformation, as opposed to the primarily radial plastic deformation of the "dynamic wedge" torque collar embodiments of the above incorporated '705 application. For example, co-pending U.S. Patent Application Publication No. 2012/0005878, entitled "Conduit Fitting with Flexible Torque Collar," and incorporated by reference herein in its entirety, describes fittings having a radially extending flange that is plastically bendable in an axial direction for axial movement of a radially extending surface that engages an axially advancing surface of one of the fitting body and the fitting nut during pull-up.

According to another aspect of the present application, a stroke limiting arrangement may include internal fitting components interoperable to provide a similar increase in torque during pull-up, configured to correspond with a predetermined axial advance of the nut. The internal stroke limiting arrangement may include internal or enclosed features of one or more of the fitting body, nut, conduit gripping devices, or some additional component assembled within the fitting assembly to provide a torque increase corresponding to a predetermined axial advance of the nut.

We therefore provide in some of the embodiments herein a stroke resisting or limiting member or load bearing member that is associated with at least one of two or more ferrules or conduit gripping devices, with the stroke resisting member having a surface that engages a surface of another conduit gripping device during relative axial displacement of the threaded fitting components during pull-up. The stroke resisting member may be integrally formed with at least one of the two or more conduit gripping devices. Alternatively, the stroke resisting member may be assembled with at least one of the two or more conduit gripping devices, for example, by loose assembly in an axial sequence of conduit gripping devices in the fitting assembly, or by cartridging with a conduit gripping device. The engaging surfaces initially engage each other preferably to either coincide with or closely correspond to the relative axial displacement of the threaded fitting components that may be associated with the number of complete and/or partial turns past finger tight position for complete pull-up had the fitting been pulled-up alternatively by turns. In this way, a fitting can be optionally pulled-up by turns, by torque or both. Depending on the applications and criticality of the pull-up process, we do not require in all situations that the surfaces engage precisely at the point of the prescribed relative axial displacement past the reference position. However, for repeatable and reliable pull-ups, it is preferred that the surfaces engage in close alignment with the corresponding relative axial displacement used for pull-up by turns. In other words, it is preferred but not required in all cases that the surfaces engage or make contact with each other upon tightening of the fitting components to a relative axial displacement that closely aligns with the prescribed number of turns and partial turns past the reference position. In this manner also, the amount of stroke used during any pull-up may be controlled so as to maximize or optimize the number of useful remakes of the fitting.

In the exemplary embodiments, when the surface of the stroke resisting member of the one conduit gripping device engages the surface of the other conduit gripping device, the manual assembler preferably will sense a distinct increase in the torque required to continue tightening the fitting components together. But alternatively, when using a torque applying tool, such as a torque wrench, the tool may be used to effect the same pull-up although the assembler may not necessarily sense the torque increase.

Figure 37:
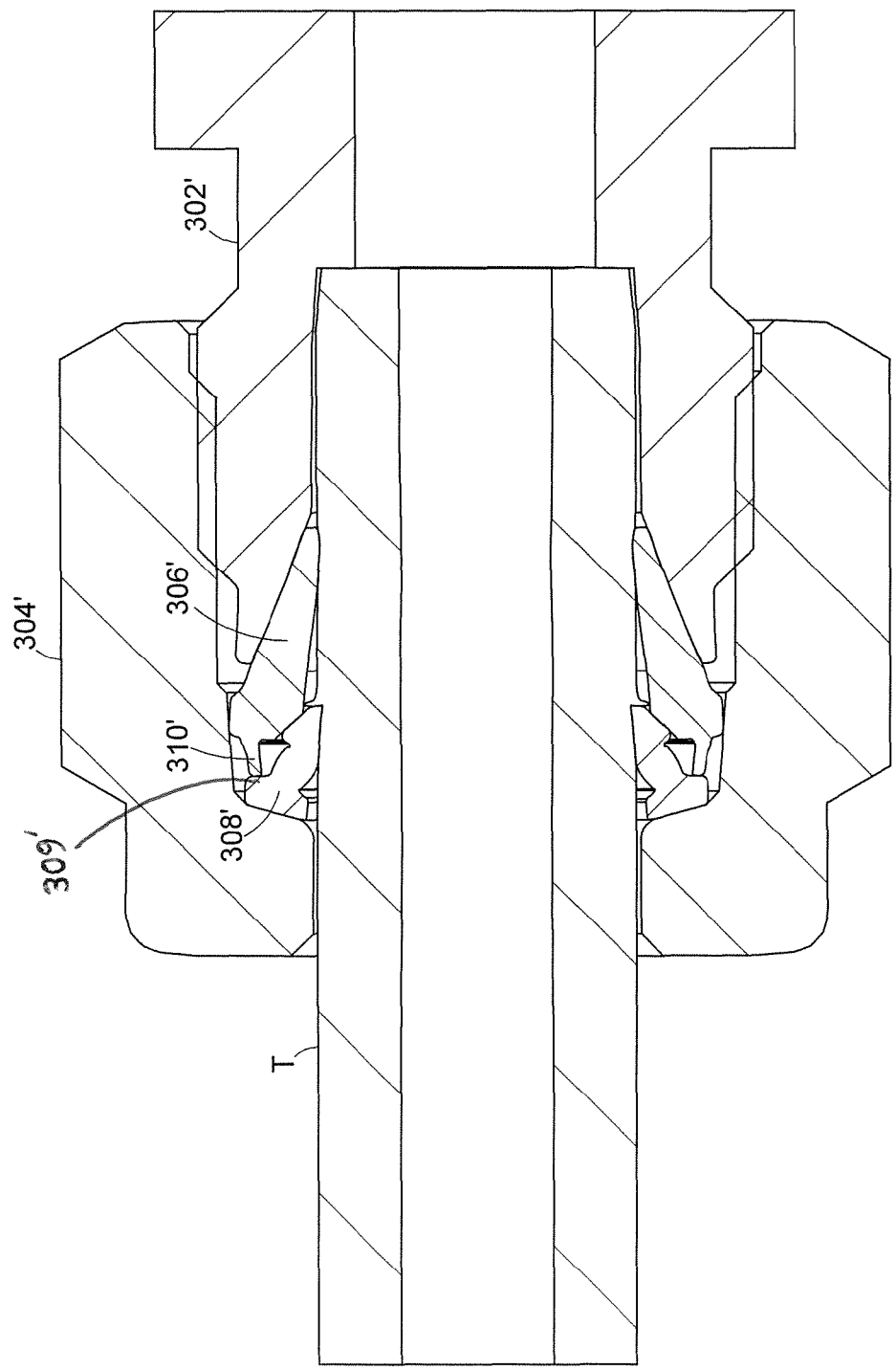
FIG. 37 illustrates the fitting of FIG. 36 after a remake.

FIGS. 36 and 37 illustrate a fitting assembly 300' before and after an initial completed pull-up in which conduit grip and seal is effected. Similar to the other fitting assemblies described herein, the fitting assembly 300' includes a body 302', a nut 304', a first or front ferrule 306' and a second or back ferrule 308', that may, but need not function as described in greater detail above. The front ferrule 306' includes a stroke resisting member or extension 310' that is sized and oriented to contact a flanged rear portion or bearing surface 309' of the back ferrule 308' to effect pull-up by torque in a manner that may, but need not, be similar to the embodiments of FIGS. 1-35B herein. The retaining member or stroke resisting end surface and the back ferrule bearing surface may be substantially radially aligned, such that at least a majority of the stroke resisting end surface is radially aligned with at least a majority of the back ferrule bearing surface. The stroke resisting member 310' and back ferrule flange 309' may be configured such that contact between these components coincides with a predetermined relative axial position resulting from displacement or stroke of the nut 304' and body 302' during pull-up. This coinciding pull-up stroke may be prescribed, for example, to assure conduit grip and seal on initial pull-up and/or on one or more subsequent remakes of the fitting. The axial compression or load on the stroke resisting member 310' produces or is accompanied by an increase in the torque required to continue to pull-up the fitting 300' (i.e., continue to apply torque for relative rotation of the body and the nut), and this torque increase is significantly greater than would be presented if the contact and axial load or compression did not occur (i.e., greater than a torque rise associated with axial compression and deformation of ferrules of a conventional fitting). Note that there may also be radial loads applied to the stroke resisting member 310'.

Accordingly, the prescribed pull-up stroke may be effected either by counting turns and partial turns past the finger-tight position as is known, or alternatively through pull-up by torque using a prescribed or predetermined torque that results from contact between the stroke resisting member 310' and back ferrule flange 309' (and the resulting axial loads therebetween) occurring at a known axial advance of the body and nut together to the prescribed pull-up stroke.

Similar to the torque collars of the embodiments of FIGS. 1-35B, the stroke resisting member 310' may be configured to plastically deform such that the fitting 300' may be remade using a prescribed torque or turns. Initial pull-up and remakes may optionally be carried out using the same prescribed torque or different torque values.

Figure 38:
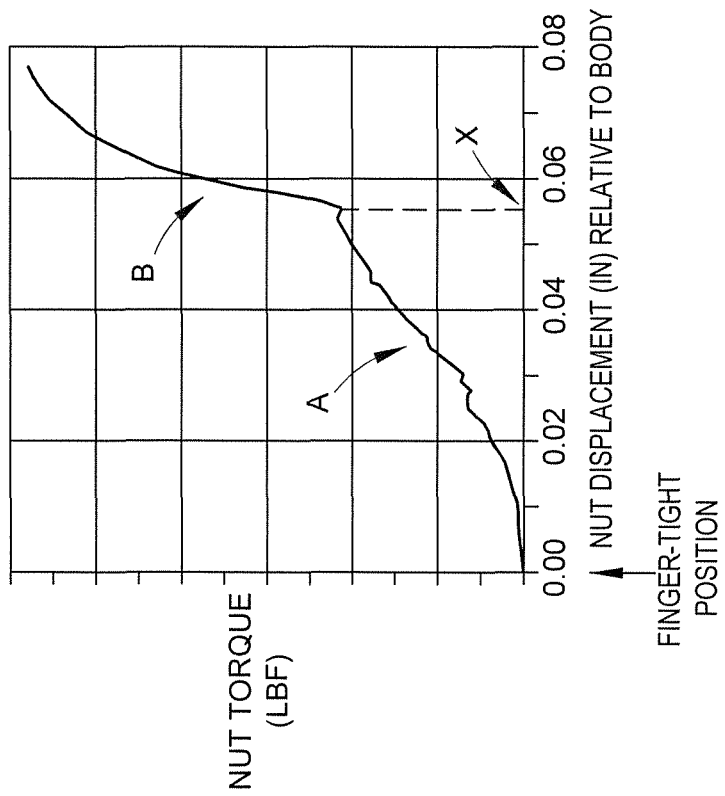
FIG. 38 is a chart illustrating an example of torque versus relative stroke.

The flexibility and design of the stroke resisting member 310' may be designed to provide a torque response curve such as the exemplary curve of FIG. 38. This graph illustrates an example of a change in the torque increase rate (for example, comparing region A with region B) as noted from the dramatic change in slope. The slope changes at a relative axial displacement X of the nut and body that corresponds with conduit grip and seal, on initial pull-up and/or after one or more subsequent remakes. For example, this torque rate increase may occur at a stroke that corresponds to approximately 1¼ turns past the finger-tight position. However, the stroke at which the transition occurs may be selected based on the design of the conduit fitting. For example, some fittings are pulled up with 1½ turns past finger-tight position. Also, the torque increase may actually begin (i.e. contact between the stroke resisting member 310' and the back ferrule flange 309') after the stroke reaches the prescribed pulled-up position by turns so that identification of a prescribed torque is assured of resulting in the fitting being tightened to a completed pulled-up position.

In other embodiments contemplated by the present application, a fitting may be provided with multiple stroke limiting arrangements selected, for example, to provide a desired magnitude or timing of torque increase during fitting pull-up and/or remake. For example, a fitting designer may wish to utilize a stroke resisting member (e.g., one or more of the torque collars of FIGS. 1-35B described above) in a material or design that provides for greater flexibility, for example, to facilitate use of the torque collar for visual or other intrinsic gauging. This increased flexibility may result in a less pronounced increase in torque during fitting pull-up. To insure a clearly identifiable, sharp increase in tightening torque, a second stroke limiting arrangement (e.g., the stroke limiting ferrules of FIGS. 36 and 37, described above) may be utilized to further add to the resulting torque at the position of body/nut axial advancement corresponding with fitting pull-up. In such an embodiment, first and second stroke resisting arrangements (for example, as described above) may be configured for axial compression at approximately the same relative axial position of the fitting components. As another example, a fitting designer may wish to provide a fitting that experiences a first increase or spike in pull-up torque associated with initial fitting pull-up, and a second (e.g., larger) increase or spike in pull-up torque associated with one or more subsequent remakes. A first stroke limiting arrangement (e.g., the stroke limiting ferrules of FIGS. 36 and 37, described above) may provide for the first increase in torque at a first relative axial position of the threaded fitting components, and a second stroke limiting arrangement (e.g., one or more of the torque collars of FIGS. 1-35B described above) may provide for the second increase in torque at a second relative axial position, axially advanced beyond the first relative axial position. In one such embodiment, the second stroke limiting arrangement may provide a second increase in torque at a second relative axial position of the threaded fitting components that indicates that a maximum number of remakes has been performed. In another exemplary embodiment, the external stroke limiting arrangement (e.g., torque collar) may provide the first increase in torque and the internal stroke limiting arrangement (e.g., stroke limiting ferrules) may provide the second increase in torque.

Another significant feature of some of the inventions herein is the provision of a retaining structure by which two or more conduit gripping devices (for example, a ferrule set) are retained or held together as a discrete unit, subassembly or cartridge, prior to assembling the unit with fitting components to form a complete fitting. By "cartridge" we mean a group of parts retained together as a discontinuous unit, subassembly or preassembly. We therefore use the terms cartridge, unit, subassembly and preassembly synonymously herein in the context of a discontinuous structure. We also use the term "ferrule cartridge" or "conduit gripping device cartridge" interchangeably to refer to a unit or subassembly made up of at least two ferrules or conduit gripping devices held together as a discrete or standalone unit. In particular, a "ferrule cartridge" includes two or more ferrules held together as a discrete unit or subassembly, and may include additional parts, for example, seals. Thus, a ferrule cartridge may provide a complete ferrule set for a fitting.

We use the term "discontinuous" to describe the conjoined nature of the cartridge or preassembly in the sense that the two or more conduit gripping devices are manufactured as separate and discrete components and remain separate and discrete components, although in accordance with the inventions herein these parts are retained together as a discrete cartridge, subassembly or preassembly, and further wherein after assembly or even a complete pull-up the parts remain discrete and may be disassembled into their constituent discrete parts if so desired. Thus the terms "discontinuous" or "conjoined" are used herein to distinguish from fitting designs in which two conduit gripping devices are attached to or made integral with each other and may in some designs break off or detach from each other during complete or partial pull-up. In a discontinuous type structure then, as used in this disclosure, the two or more conduit gripping devices release, disengage or otherwise become separable from each other during either partial or complete pull-up without requiring a fracture, shear or other separation of material. In some of the cartridge or subassembly embodiments herein, however, an adhesive may be used as part of the retaining structure. Despite the initial assembly as a cartridge, the conduit gripping devices individually perform as designed and the retaining structure does not interfere with operation and performance of the conduit gripping devices during pull-up. The terms "discontinuous" or "conjoined" are further intended to include broadly the idea that the two or more conduit gripping devices may be loosely or alternatively snugly retained together as a discrete subassembly. The term "connect" and variations thereof as used herein with respect to the discontinuous cartridge means that the conduit gripping devices are initially formed or manufactured as separate, discrete and distinct parts, and then held together in a discontinuous manner as a cartridge or subassembly so as to be able to be easily joined with fitting components (for example, a nut and body) to form a fitting assembly, but further that the conduit gripping devices will otherwise retain their expected form, fit and function without interference from the retaining structure.

As an overview of the inventive concepts disclosed herein, there are a number of characteristics for a discontinuous ferrule cartridge retaining structure that preferably but not necessarily in all cases are desirable. These characteristics may in some applications involve tradeoffs as to which ones may have greater significance in overall fitting performance and use as will be apparent from the following discussion. This list is not intended to be an exhaustive list of all characteristics, and one or more of the ones discussed herein may not be notable or needed for specific applications.

One characteristic we refer to as a reasonably robust connection or RRC. By RRC we mean that the retaining structure is designed such that the connected conduit gripping devices will not easily come apart with normal handling, either individually or bulk, during subassembly, inventory, and subsequent assembly with fitting components to form a fitting assembly. The terms "normal" and "easily" as used herein intentionally indicate that the degree to which the ferrule cartridge does not come apart during use is a matter of design choice. But to better understand those terms, we view "normal" handling as any handling of the ferrule cartridge that can be expected or likely to happen throughout manufacturing, assembly and use of the ferrule cartridge. This may include handling by manufacturing personnel, inventory personnel, shipping personnel and end users. It can be expected that during such normal handling a ferrule cartridge may be exposed to forces that could tend to knock the conduit gripping devices loose or even separate. For example, the ferrule cartridge may be accidentally dropped from several or many feet onto a hard floor or against a hard object or surface at various installations or manufacturing/assembly stages. The designer may determine the level of force that the ferrule cartridge can withstand without damage to the parts or separating or loosening as needed. Normal handling therefore would not include the use of excessive or damaging force to attempt purposely to separate the conduit gripping devices. However, the designer may choose to facilitate the option of being able to separate the parts using proper tools and procedures if so desired. In other words, the designer has the option to determine how easily the ferrule cartridge may be disassembled into its constituent parts. In some applications, the ferrule cartridge might be designed so that it cannot be separated without damaging one or more of the constituent parts, and in other designs the ferrule cartridge may be disassembled with simple manual force, and a wide range of available "ease" in between.

The aspect of ease of separation of the discontinuous cartridge components also raises the terms disengage, release or separation and derivative forms thereof when used in the context of describing the ferrule cartridge. We use these terms interchangeably in two contexts. The first context is the separation or disassembly of the ferrule cartridge into its constituent parts when done prior to installation of the connected ferrules or conduit gripping devices into a fitting. In the other context, we refer to disengagement, separation or release of the ferrules from the retaining structure that will occur during pull-up of the fitting assembly. Now, in this latter context, the fitting is being pulled-up so the ferrules are not literally separated from each other, and in fact are driven together axially so as to deform and grip the conduit. But we refer to a ferrule or ferrules as releasing or disengaging from the retaining structure during pull-up to describe that the retaining structure no longer holds the ferrules together. For example, in the FTP, the ferrules may not be released from the retaining structure, and an installer could easily back the nut off the body and remove the ferrule set cartridge or subassembly. However, at a selectable axial position of the ferrules relative to each other during a pull-up operation, the retaining structure will no longer be functional to hold the ferrules together. Having the ferrules disengage or release from the retaining structure may be used, for example, to avoid rotation of the conduit during pull-up which might occur due to torque transmission from the nut, through the retained ferrules to the conduit. Reference to a ferrule or ferrules releasing or disengaging from the retaining structure is intended to convey the idea that the ferrules as a subassembly are no longer held together by the retaining structure. In the illustrated embodiments herein, only one of the ferrules is directly disengaged from the retaining structure, for example, the back ferrule releasing from the extension. But in the sense that the two ferrules no longer are held together by the retaining structure, one may consider that the "ferrules" have disengaged because the retaining structure no longer functions to hold the ferrules together. Therefore, whether we refer to one ferrule or two ferrules being disengaged or no longer held by the retaining structure, the concept is that the retaining structure no longer holds the two ferrules together.

Another characteristic of the discontinuous ferrule cartridge concept relates to maintaining a sufficient bore diameter (SBD). By SBD we mean that the retaining structure does not cause shrinkage or compression of the interior bore diameter of any of the conduit gripping devices that would adversely encroach on the bore tolerance to allow a conduit to be inserted through the bore. A related characteristic we refer to as axial bore alignment (ABA) by which we mean that the retaining structure does not cause an axial misalignment of the conduit gripping devices that would adversely encroach on the effective through bore tolerance for inserting a conduit through both devices. ABA may refer to axial alignment of the conduit gripping device bores with respect to each other or maintaining an axial through bore for each conduit gripping device (in other words, not adversely bending or deflecting a conduit gripping device so as to deform a portion of its bore off-axis).

Another characteristic of the discontinuous ferrule cartridge concept is preferably to maintain proper finger tight contact (FTC) when the cartridge is assembled into a fitting to a finger-tight position. Fittings are commonly assembled first to a finger tight position (FTP) by which the various parts are assembled onto a conduit in a fairly loose manner and then snugged up manually without enough force to deform the conduit gripping devices but with sufficient force to assure FTC. For example, in an exemplary embodiment, FTC means that there is axial contact between the front portion of the front ferrule or conduit gripping device with the tapered camming surface of the body; axial contact between the front portion of the back ferrule or conduit gripping device and the camming surface of the front ferrule; and axial contact between the drive surface of the nut fitting component, and the driven surface of the back ferrule or conduit gripping device. It is usually desirable, although not necessarily required in all cases, that these axial contacts are present in the FTP. An assembler can usually feel or sense this complete axial contact by noticing a distinctive resistance to further manual tightening of the fitting components together.

Another characteristic of the retaining structure for a discontinuous ferrule cartridge is preferably to have the retaining structure not adversely interfere with the functional separation of the conduit gripping devices or the form, fit and function of the conduit gripping devices during pull-up, thereby permitting each conduit gripping device to interact with the body and nut and each other to effect conduit grip and seal. We refer to this characteristic as maintaining two ferrule function (TFF), it being understood that none of these characteristics are limited by the term "ferrule" and not limited to only use of two conduit gripping devices.

Next we will discuss three types of discontinuous ferrule cartridge connection embodiments that are directed to the above noted characteristics. It will be readily apparent that some of these embodiments achieve one or more of the characteristics, perhaps to varying degrees, thus providing a designer with a number of choices. But alternative embodiments will be available that do not necessarily achieve any of the above characteristics or to lesser degree, yet still being within the scope of the claimed inventions. The types are not necessarily presented in any preferred order. We then will describe exemplary embodiments of each type. Although the descriptions reference ferrules, the inventions may be used with other conduit gripping devices other than just those known or referred to as ferrules.

The first type (Type 1), we refer to as a radial compression connection. In one embodiment, a retaining structure is provided that may be realized in one example in the form of a flexible portion of the front ferrule that protrudes axially from the back end of the front ferrule. This flexible portion may be integrally formed with the front ferrule or attached thereto. A forward portion of the back ferrule may be press fit into the flexible portion of the front ferrule to hold the two ferrules together as a ferrule cartridge or subassembly. The protrusion is preferably flexible enough to allow the back ferrule to be inserted a sufficient distance to provide a reasonably robust connection, but without radially compressing the back ferrule beyond an acceptable SBD. In press fit configurations of the prior art, the press fit operation could radially compress the rear device so as to adversely affect the through bore, or at least there is no control over the amount of radial compression other than to use special fixturing and control during assembly. Use of a flexible portion allows the designer to strike a balance between having an adequately robust connection without adversely affecting the SBD, allowing easier assembly of the parts. This is because the flexible portion may be used so that ferrule deformation during the press fit operation is taken up by the flexible member and not the body of the front or back ferrule. In this manner, the flexible portion does not interfere with the basic geometry or operation of either ferrule.

By having the flexible portion extend axially back from the main body of the front ferrule, upon pull-up the retaining structure will not interfere or adversely affect the operation of either ferrule as to each other, the conduit or the fitting components. Moreover, unlike the prior art, the retaining structure, in a Type 1 arrangement, used for the press fit does not need to participate in the form, fit or function of the front ferrule as that ferrule relates to the overall fitting. In other words, the front ferrule may operate the same way whether the extension is present or not. In the prior art designs, the front device and in particular the retaining structure remains in contact with the back device and is not separated from the operation of the devices during pull-up.

Thus, in a Type 1 design, the first and second conduit gripping devices or ferrules disengage from the retaining structure at a selectable position during pull-up. In order that the retaining structure not interfere or adversely affect the form, fit and function of the ferrules, it is preferred although not necessary that the retaining structure allow the ferrules to disengage or release from the retaining structure after just a slight axial advance of the back ferrule relative to the front ferrule, for example, after about 0.01 inch to about 0.015 inch of movement of the back ferrule relative to the front ferrule. These are only intended to be exemplary values, it being understood that the preference is that the retaining structure no longer hold the ferrules together after some pre-determinable displacement of the ferrules relative to each other. However, the axial position of the back ferrule relative to the front ferrule at which the ferrules become disengaged may be selected by the designer as needed for a particular application.

The second type (Type 2), we refer to as a controlled axial position connection. In one embodiment, a retaining structure provides a hook-like member on the front ferrule that moves over a portion of the back ferrule during assembly of the ferrule cartridge. This movement positions the hook-like member in such as manner as to significantly reduce radial load on the back ferrule, but also to axially press the back ferrule contact surface against the front ferrule camming surface. By assuring this axial contact, a robust connection is made with little or no effect on SBD, and at the same time providing FTC as between the ferrules even before the ferrule cartridge is installer into a fitting. This also eliminates axial dead space at the ferrule contact area, which dead space otherwise would take up some of the pull-up stroke (for example, when pull-up is carried out based on number of turns). This assures that there is no dead space between the ferrules which may be desirable in some fitting designs. In a Type 2 approach, rather than using the hook-like member, the ferrules may alternatively be joined with an adhesive as part of the retaining structure in such a manner as to assure no dead space between the ferrules and to further assure metal to metal contact where the contact surface of the back ferrule contacts the camming surface of the front ferrule, both for FTP and throughout pull-up. The alternative use of an adhesive also releases the ferrules during pull-up and by being positioned out of the contact area between the ferrules, does not adversely affect the operation of the ferrules during pull-up. As with Type 1, the Type 2 concept allows the ferrules to individually perform as designed to achieve the TFF characteristic if so desired.

The third type (Type 3) we refer to as a loose ferrule connection. In one embodiment, a retaining structure holds the ferrule together but without any significant radial or axial load between the ferrules. This looser assembly allows some degree of freedom of movement of the ferrules with respect to each other. For example, the ferrules can pivot somewhat with respect to each other and the retaining structure, and also freely rotate with respect to each other. The ferrules can also rotate with respect to each other about a common central axis, thus eliminating any tendency of the connection to induce twist or torque into the conduit during pull-up before the ferrules release from the retaining structure. The Type 3 approach may be used to best achieve all five of the above-mentioned characteristics (RRC, SBD, ABA, FTC and TFF), albeit without controlled axial position because of the intentionally looser connection. As with the Type 1 and Type 2 concepts, the Type 3 concept allows the ferrules to individually perform as designed to achieve the TFF characteristic if so desired.

The retaining structure typically will include a first portion that is associated with one of the conduit gripping members and a second portion that is associated with the other conduit gripping member. In various embodiments, the retaining structure may involve cooperating structural features added to both conduit gripping devices (or alternatively using an additional part) as compared to what might be the design of those conduit gripping devices in a non-cartridge design. In such cases we refer to the retaining structure having two portions. But in other embodiments, the retaining structure may be a structural feature associate with one of the conduit gripping devices that utilizes a structural feature of the other conduit gripping device even if that other device has not been modified to allow for a cartridge design. Therefore, as used herein, the concept of a retaining structure does not necessarily require that the retaining structure be identified as two distinct parts. The above incorporated '501 application describes several exemplary ferrule assembly embodiments according to the Type 1, Type 2, and Type 3 concepts described above.

In alternative embodiments, the retaining structure may be a separate part or element that attaches the conduit gripping devices together, but the exemplary embodiments herein illustrate retaining structures that are part of and formed integral with one or alternatively both of the conduit gripping devices. As noted above, the term "connecting" and variations thereof as used herein with respect to the subassembly means that the conduit gripping devices are initially formed or manufactured as separate and distinct parts, and then joined together in an interlocking or secured manner so as to be able to be easily installed as a single piece unit into a fitting. This is distinguished from some prior art arrangements in which two conduit gripping devices are integrally formed together such as machining both devices from a single piece of material or attaching a conduit gripping device to another by welding, for example.

In several ferrule cartridge embodiments of the '501 application, a flexible extension of the front ferrule flexes or expands radially outward to receive a radial protrusion or crown of the back ferrule during the cartridging process, with the extension snapping back inward to retain the front and back ferrules together as a cartridged subassembly. In some embodiments contemplated by the present application, a front ferrule may be provided with a flexible extension having an enlarged radially extending flange that provides a hoop stiffness and robustness to the cartridge connection, for example, to reduce or minimize plastic radial outward expansion of the extension.

FIGS. 39-41 illustrate another embodiment of a front ferrule for a conduit fitting 290 having a ferrule cartridge 292. The conduit fitting 290 may be but need not include the same conduit gripping and sealing arrangements as the fittings described hereinabove. The conduit fitting 290 may be a male or female fitting, with the former illustrated, and include a male threaded body 294, a female threaded nut 296 and a front ferrule 298 and a back ferrule 299. Except for the front ferrule 298 the fitting may operate the same as described in the other embodiments hereinabove, the ferrule cartridge 292 may operate the same as described hereinabove, and the cartridging process may be carried out in the same manner.

The front ferrule 298 includes a central through bore defined by an interior bore wall 302. An outer wall 304 extends from a front end 306 to a first flange 308. A second flange 310 extends from a rearward portion 312 of the front ferrule. Between a front radial side 314 of the second flange and a back radial side 316 of the first flange is an outer diameter (OD) recess 318. The second flange 310 may serve as a cartridge feature of the front ferrule 298 and may include a second recess 320. This second recess 320 may be appropriately sized to provide a Type 1, 2 or 3 cartridge connection between the front ferrule 298 and the back ferrule 299, as described in greater detail above. A recess wall 322 delimits the second recess 320. It will be noted that a crease is not utilized in this embodiment, although optionally there may be one provided. The second flange 310 extends outboard from the main body of the front ferrule 298 proximate a camming surface 324. A reduced width web 326 joins the second flange 310 to the rearward portion 312 of the ferrule. This web has a width W that in part may be determined by the radial and axial dimensions of the OD recess 318 as well as the radial and axial dimensions of the second recess 320. The second flange 310 also may include a generally radially inward extending retention protrusion 328 that functions as a retaining extension to cartridge and retain the back ferrule with the front ferrule. But this retention protrusion 328 need not fold over or bend when the back ferrule is inserted into the second recess 320, because the web 326 may be designed to be flexible with sufficient elasticity to absorb the stress of the cartridging process as the back ferrule is inserted into the second recess 320.

The retention protrusion 328 provides a radially inner surface 330 that defines and delimits the diameter D4 of an opening 332 through which a cartridge feature of the back ferrule is inserted, as described herein above. For example, the back ferrule may have a crown that is pushed into and retained in the second recess 320 after cartridging. A chamfer 334 may be provided to assist the insertion of the back ferrule.

The web 326 may be thought of as a hinge for the second flange 310 to provide a pivot region or location 336 about which the second flange may pivot or rotate during the cartridging process, as represented by the arrow 338. This motion may be effected by elastic deformation of the web 326 so that after the back ferrule cartridge feature is through the opening 332 the second flange 310 returns to its original unstressed position, although some plastic deformation may occur. The web 326 should be sufficiently elastic to permit cartridging and then return back close enough to an original position to hold the rear ferrule with a reasonably robust connection.

It should be noted that if a particular design herein presents excessive deformation from plastic deformation as a result of cartridging, a post-cartridging rolling or crimping step may be used to compress the cartridge feature of the front ferrule back to or sufficiently close to its original state to provide the desired robustness of the ferrule cartridge.

FIGS. 40 and 41 illustrate the ferrule cartridge 292 with the conduit fitting 290 in a finger-tight condition. The first flange 308 may have an inboard facing wall 340 (FIG. 39) that may be used to engage an anvil for the cartridging process. This also can protect the forward portion of the front ferrule during cartridging. As in the prior embodiments described herein, upon pull-up of the conduit fitting 290, the back ferrule releases from the retaining structure R, and also the retaining structure R does not interfere with normal pull-up and function of the ferrules.

The OD recess 318 on the front ferrule 298 adjacent the second flange 310 defines in part the annular hinge web 326 for the second flange and provides an element of flexibility for ease of the optional snap together cartridge operation with the back ferrule. The hinge web 326 and the desired flexibility can be controlled by the radial depth and axial position of the OD recess 318, along with the width W and length M of the web 326. The material volume of the second flange 310, generally defined by the ferrule material outboard of the OD recess 318, provides a hoop stiffness and robustness to the cartridge connection. The axial thickness of the retention protrusion 328, set by the material provided between the inboard facing portion 322a of the second recess 320 and the chamfer 334, provides further control of the ease of back ferrule snap together insertion and robustness of ferrule cartridge 292.

The diameter D4 of the opening 332 and the radial difference and interference with the OD of the cartridge feature 206, for example a crown, on the back ferrule, also provides further control of the ease of snap together insertion and robustness of ferrule cartridge.

In other embodiments of the present application, a cartridging front ferrule may include a rear retaining extension that instead bends or flexes axially forward during the cartridging process to receive a portion of the back ferrule (e.g., a radial protrusion or crown) into a cartridge recess of the front ferrule partially defined by the rear retaining extension. FIGS. 42-56A of the present application illustrates several embodiments of ferrule cartridges having a primarily axially bendable front ferrule retaining extension.

Accordingly in an exemplary method of cartridging first and second ferrules as a discontinuous preassembly, a first ferrule is provided with a rearward extending retaining member defining an inner radial recess, with the retaining member including a radially inward extension defining a rearward facing camming surface. A second ferrule is aligned with the first ferrule along a common central axial. The second ferrule is axially pressed against the first ferrule such that a radially outward projection of the second ferrule engages the camming surface of the retaining member to axially deform and radially expand the radially inward extension, thereby receiving the second ferrule projection in the inner radial recess. At least one of the axial deformation and the radial expansion of the radially inward extension is at least partially elastic, such that the radially inward extension snaps into a second ferrule retaining condition after the second ferrule projection is received in the inner radial recess.

With reference to FIGS. 42-44, a ferrule cartridge or subassembly 200 may include a front ferrule or first conduit gripping device 202 and a back ferrule or second conduit gripping device 204. Exemplary materials for the ferrules include metal, for example, stainless steel. A common metal for conduit fittings is 316 stainless steel, but other metals may be used as needed. Although we use the reference numeral 200 to designate the ferrule cartridge, the general reference 200 may be similar to the exemplary ferrule cartridges or subassemblies of the above incorporated '501 application, namely a cartridge or subassembly comprising at least a first conduit gripping device and a second conduit gripping device. The back ferrule 204 may be but need not be similar to the back ferrule designs of the above incorporated '501 application. In an embodiment, the back ferrule 204 may include a cartridge feature or geometry 206 that facilitates a cartridge assembly with the front ferrule 202. By cartridge feature 206 of the back ferrule 204 we mean a surface or structure of the back ferrule that interferes with a surface or feature of the front ferrule 202 to retain the ferrules together as a ferrule cartridge 200. For example, the back ferrule 204 may be provided with a radial protrusion or crown 206 at a forward or inboard portion 208 of the back ferrule. Other shapes and geometries for the back ferrule may be used as needed for particular applications, for example, as set forth hereinabove. An advantage of the crown geometry is that the back ferrule 204 is commercially available from Swagelok, Company, Solon, Ohio. But other back ferrule designs may alternatively be used, for example a ferrule design that already has a feature that cooperates with the front ferrule 202 to allow cartridging or a feature that is added to an existing design.

We continue to use the convention adopted above of inboard and outboard to indicate relative direction or ends of a ferrule, with inboard referring to the ferrule end portion that faces the center of a fitting, in other words the forward or front portion of the ferrule, and outboard referring to the ferrule end that faces away from the center of the fitting, or in other words the rearward or back portion of a ferrule. This convention is noted on FIG. 42 but applies to all the figures. Also, like components, elements and features are given the same reference numeral as above so that the description need not be repeated.

The front ferrule 202 preferably is a circumferentially continuous body that includes a central continuous right cylinder bore 210 that extends end to end through the entire length of the front ferrule 202. In a conventional fitting, the bore wall 210a is closely received about a conduit end (T in FIG. 46). The front end 212 of the front ferrule preferably but not necessarily is rounded. This helps prevent or reduce a tendency in some fittings for the front ferrule to bite into the conduit (T); thus improving the ability for the front ferrule to burnish the outer surface of the conduit to provide an excellent fluid-tight seal upon pull-up of the fitting. The front ferrule 202 also includes a frustoconical tapered outer wall 214 that extends from the front end 212 towards the back portion 216 of the front ferrule. The front ferrule 202 further includes a camming surface 218 that is typically in the form of a frustoconical surface although a different geometry for the camming surface 218 may be used as needed. The tapered outer wall 214 of the front ferrule forms a fluid-tight seal against the tapered camming surface (258, FIG. 48) of the body (252) upon pull-up of the fitting.

At the rearward portion 216 of the front ferrule 202, a member 220 extends outboard from an end surface 222. In an embodiment, the end surface 222 may be a radial surface as shown, however, such is not required. The member 220 provides a retaining structure R that may be used to connect or join the front ferrule 202 and the back ferrule 204 together as a cartridge or subassembly 200. The member 220 itself may be thought of as a cartridge feature 220 of the front ferrule 202. In an embodiment, the cartridge feature 220 of the front ferrule may coact with the cartridge feature 206 of the rear ferrule to provide the retaining structure R. The member 220 may be integrally formed with the rest of the front ferrule 202, for example when the front ferrule is machined, or may be attached to the front ferrule to form a one-piece integral structure. Note also that the cartridge feature 206 in alternative embodiments of the back ferrule 204 may be integrally formed with the back ferrule, or may be attached to or otherwise integrated with the back ferrule to provide a one-piece integral structure.

The member 220 may include a web 224 that extends outboard from the end surface 222. The web 224 may be circumferentially continuous or may be segmented (e.g., forming fingers or other such extensions). In an embodiment, the web 224 may extend axially, but alternatively the web 224 may have both an axial and a radial component to the direction of extension from the end surface 222. In an embodiment, the web 224 may include a first part 224a in the form of a tapered outer wall that at a proximal end is contiguous with the end surface 222, and at a distal end that is contiguous with a second part 224b in the form of a cylindrical outer wall. The first part 224a may blend or transition to the second part 224b with a radiused surface 226 or other geometry. The first part 224a therefore may have a width that tapers to a narrower width of the second part 224b. This geometry is optional but may be used to facilitate flexing or elastic deformation of the member 220 as needed, and may, for example, provide for a radially outward flexing component to the deformation of the member during cartridging.

In other embodiments, the web portion of the retaining member may be shaped to minimize or eliminate radial expansion of the retaining member during cartridging. For example, with reference to FIG. 42B, in an alternative embodiment, a front ferrule 270 may be similar to the embodiment of FIG. 42A but having a different profile on the tapered outer wall 272. In this embodiment, the tapered outer wall 272 may be frustoconical and extends from the front end 274 to a rearward portion 276. The tapered outer wall 272 extends to a cylindrical surface 278, and a recess 280 is formed contiguous from the camming surface 282. Alternatively, the surface 278 may be frustoconical, tapered or have another geometry or profile. The recess is delimited by a wall 284 and may be the same as the recess and wall structure of the embodiment of FIG. 42A. Accordingly, a retaining extension 286 may be provided that will exhibit a fold over feature when a back ferrule (not shown) is cartridged with the front ferrule 270. The retaining extension 286 may include a chamfer 286a. The wall 284 may also have a crease 288 with an angle α at the corner that defines the crease 288. In an embodiment, the front ferrule retaining extension 286 extends from a radially thicker or stiffer rearward portion 276 of the front ferrule 270 as compared to other embodiments disclosed herein, such as FIG. 42A for example. Thus, the FIG. 42B embodiment may be used to provide an increased RRC because the extension will be less prone to radial displacement and therefore more strongly retain the back ferrule.

Referring back to FIG. 42A, at a distal end of the web 224 may be a retaining extension 228 that in an embodiment may be realized in the form of a radially extending hook, barb, tab or other retaining protrusion structure that will cooperate with the back ferrule 204 geometry to provide the ferrule cartridge 200. In an embodiment, the retaining extension 228 may extend generally transversely from the second part 224b of the web 224. For example, the retaining extension 228 may align with a radial line although such is not required. The length or radially innermost end surface of the retaining extension 228 delimits an opening 230 which the forward portion 208 of the back ferrule 204 is pushed through in order to cartridge the front ferrule 202 and the back ferrule 204 together. In an alternative configuration, the retaining extension 228 may extend from a different location along the web 224 rather than from the distal end of the web as illustrated.

With reference also to FIG. 42A, the member 220, and particularly the web 224 including the first part 224a, the second part 224b and the retaining extension 228, forms a wall 232 that delimits a recess or pocket 234 within the member 220. This recess 234 receives the cartridge feature 206 of the forward portion 208 of the back ferrule 204. In an embodiment, the cartridge feature may be the crown 206 that is inserted through the opening 230 defined by the member 220 so that after cartridging the crown 206 is positioned in the recess 234 and is retained therein by the member 220, most notably the retaining extension 228. The retaining extension 228 may include a chamfered surface 228a that facilitates aligning the forward portion 208 of the back ferrule 204 with the opening 230 during the cartridging process, and also reducing possible damage to the back ferrule during cartridging by preferably not presenting a sharp edge where the back ferrule contacts the retaining extension 228 at the opening 230.

The wall 232 in an embodiment may have a first part 236 that delimits a major diameter of the recess 234, and a second part 238 that delimits an outboard axial extent of the recess 234. The diameter of the wall first part 236 is greater than the diameter D1 of the opening 230, both before and after the front ferrule 202 and the back ferrule 204 are cartridged together. The axial length of the wall first part 236 and the diameter of the recess 234 defines the pre-cartridge size of the recess 234 that receives the cartridge feature 206 of the back ferrule 204. The length of the wall second part 238 also delimits the initial or unstressed diameter of the opening 230. In order to facilitate cartridging by inserting the back ferrule cartridge feature 206 through the opening 230, we provide a structure or means by which the retaining extension 228 can be deformed in a controlled manner. By controlled manner we mean that the deformation occurs in a predictable way during normal cartridging. In an embodiment, this controlled deformation of the retaining extension 228 may be realized in the form of a folding or bending of the retaining extension 228 in a forward or inboard direction as the back ferrule cartridge feature 206 is pushed through the opening 230. This deformation may be partially elastic and partially plastic, in that some spring back of the retaining extension 228 after the cartridge feature 206 clears the opening 230 and is received in the recess 234 may be used to keep the back ferrule 204 retained with the front ferrule 202 as a ferrule cartridge 200. The effect of plastic deformation is that the retaining extension 228 remains folded or bent forward after cartridging is completed.

In an embodiment, a structure we use to provide a controlled deformation of the retaining extension 228 during the cartridging process is a crease 240 at the joint between the retaining extension 228 and the web 224. This crease 240 provides a hinge function or operation that facilitates folding or bending the retaining extension 228 forward with a controllable and predictable deformation to allow the back ferrule 204 to be cartridged with the front ferrule 202 without damaging the back ferrule 204 while still maintaining a desired level of RRC.

The crease 240 may be defined by a corner between the wall first part 236 and the wall second part 238, in which the corner is delimited by an angle α. In an embodiment, the wall first part 236 may be substantially cylindrical along the axis X and the wall second part 238 may be on a radial line so that α may be a right angle. More preferably, the angle α prior to cartridging is preferably approximately 93°±3° and more preferably is approximately 90°-92° or in other words slightly obtuse. By using an angle α that is slightly obtuse prior to cartridging (in other words in an non-deformed condition), the corner or crease 240 is easier to machine. But, it is preferred that the angle α in the non-deformed condition not be too much greater than 95° otherwise the retaining extension 228 may not deform properly and may cause undesired buckling or possibly excessive outward flaring of the member 220. Alternatively, after the crease 240 is machined, a tool may be used to pre-stress or pre-bend the retaining extension 228 forward so as to form angle α to be a right angle or even an acute angle before the back ferrule 204 is pushed against the retaining extension 228 as part of the cartridging process. Regardless of the initial angle α, after the cartridging process is finished, the angle α will be an acute angle that is <90° because of the fold over result of the retaining extension 228.

Alternatively, the wall 232 may have many different shapes and angles depending on the nature of the cartridging process that will be used and the desired robustness of the mechanical connection between the front ferrule and the back ferrule. The wall first part 236 and the wall second part 238 may have shapes, geometry or contours that are not cylindrical or frustoconical, but still there may be a definable corner that provides the crease 240. For example, the wall first part 236 may be frustoconical in either an unstressed condition or after cartridging, and the wall second part 238 may be radial or have another geometry or shape so as to provide an acute angle α after cartridging. We have found that the use of an acute angle for α after cartridging is preferred and may be any value less than 90°, for example, in the range of approximately 89° to approximately 30°, more preferably approximately 85° to approximately 45°, and still more preferred in the range of approximately 80° to approximately 60°. However, a right angle for α may be used but preferably α is not an obtuse angle after cartridging meaning a greater than 90°. The angle α after cartridging may be realized with many different dimensions and geometry for the wall first part 236 and the wall second part 238.

Although for convenience and clarity we describe the folding or bending action as occurring about the crease 240, this does not imply that all of the deformation is only at the crease 240. Other portions of the retaining extension structure 228 may deform either plastically, elastically or both, but the crease 240 provides a pivot or hinge by which the deformation and folding or bending can be effected.

With reference next to FIG. 42C, we illustrate in half-longitudinal cross-section another embodiment of a member 350 for a front ferrule 202', which may be an alternative embodiment of the member 220 used with a front ferrule 202 in the other embodiments of FIGS. 42-45. The embodiment of FIG. 42C may alternatively be used with other front ferrule embodiments, however, and not just with the other embodiments of FIGS. 42-45. Also, some of the features of the FIG. 42C embodiment may be used without all of the features being used. FIG. 42C is provided to illustrate design options for providing a retaining extension 352, for example a hook or barb or other protrusion, that folds over at a crease in a controlled manner during cartridging with a back ferrule.

It should also be noted that the member 350 may be used in other applications other than cartridge ferrules, in that it provides a cartridge structure and process that may be used to connect two parts together, particularly metal parts, for example, parts comprising stainless steel. Therefore, an inventive concept presented herein is for a cartridging member that cooperates with a mating part to cartridge two devices together, and FIG. 42C is an embodiment thereof. The mating part may be any part that has a cartridge feature that is retained by the cartridge member 350—an example of which is a back ferrule with a crown but such is just one example.

The member 350 is illustrated in FIG. 42C in half section, it being understood that the member 350 may be circumferentially continuous or alternatively discontinuous, as well as may be symmetric about the X axis. A portion of the full cross-section is shown in phantom lines in FIG. 42C.

The retaining extension 352 at its minor diameter D5 may have a radially inward end portion 354 adjacent to a forward facing wall 356 of the retaining extension 352. The radially inward end portion 354, viewed in cross-section, may have an axial length (AFL), which may be substantially flat as shown in FIG. 42C, rounded as shown in FIG. 42A, or otherwise shaped to diverge axially from a rearward camming surface 378 of the retaining extension 354. The forward facing wall 356 has a radial length (RHL) extending inward from first wall portion 358 of a web 360. The first wall portion 358 may be cylindrical but alternative geometry may be used as needed. Forward facing wall 356 is also referred to herein as a second wall portion 356 that is part of an inner wall (368) that delimits in part a recess as described below.

The retaining extension 354 may extend generally radially from a distal end 362 of the web 360. As in the other embodiments of FIGS. 42-45, the retaining extension 354 forms an angle α at a crease 364 between the forward facing wall portion 356 and the first wall portion 358. The forward facing wall portion 356 may blend to the cylindrical portion 354 with a radius portion 366. In a non-deformed state prior to cartridging, as shown in FIG. 42C, the angle α may be a right angle or near right angle as in the above embodiments. After cartridging, the angle α will be acute in that the retaining extension 352 will plastically deform by bending or folding generally about the crease 364. The crease 364 may be a sharp corner as described hereinabove, for example with a small radius to promote the folding action.

The web 360 includes an inner wall 368 having the first wall portion 358 and the second wall portion 356. The inner wall 368 blends into an end wall 370 of the front ferrule 202', for example with a radius 372. The inner wall 368 delimits a recess 374 that receives a cartridge feature of the back ferrule (not shown), for example, a crown such as shown in the above embodiments, or another form of cartridge feature that is retained in the recess 374 after cartridging. The cylindrical portion 354 diameter D5 delimits an opening 376 through which the back ferrule cartridging feature (not shown in FIG. 42C) passes during the cartridging process.

Adjacent to the cylindrical portion 354, axially opposite from the forward facing wall 356, may be an optional tapered camming mouth or surface 378 to assist aligning the back ferrule and front ferrule centerlines during the cartridging process. The camming mouth 378 blends to a rearward facing wall 380 of the retaining extension 352. The camming mouth 378 may be, for example, a frustoconical surface. The taper angle HCMA (which is the half angle as viewed in the drawing) of the camming mouth 378 relative to the axis X, viewed in cross section, may be approximately 60° to approximately 15°, preferably approximately 50° to approximately 30°, and more preferably approximately 45° to approximately 35°. The camming mouth 378 has an axial length CML, which when added to the AFL equals the axial width AHW of the retaining extension 352 (AHW=CML+ AFL).

The ratio of AFL/AHW may range from approximately 0.8 to approximately 0.2, preferably approximately 0.6 to approximately 0.3, and more preferably approximately 0.5 to approximately 0.4. Correspondingly, the ratio of AFL/CML may range from approximately 4.0 to approximately 0.25, preferably approximately 1.5 to approximately 0.43, and more preferably approximately 1.0 to approximately 0.66. The ratio of AFL/RHL may range from approximately 1.0 to approximately 0.3, preferably approximately 0.8 to approximately 0.4, more preferably approximately 0.6 to approximately 0.5.

The camming mouth 378 may blend at a forward end with a radius transition 382 to the inner cylindrical portion 354, and the camming mouth 378 may blend at a rearward end with a radius transition 384 to the rearward facing wall 380.

Although the cylindrical portion 354 blends to the forward facing wall 356 with the radius transition 366, and also blends to the camming mouth 378 with the radius transition 382, nevertheless, the AFL based ratios (as noted above) of the retaining extension 352 may be dimensioned axially between the end locations 366 and 382 as if the radius transitions 366 and 382 were zero in value.

Figure 45:
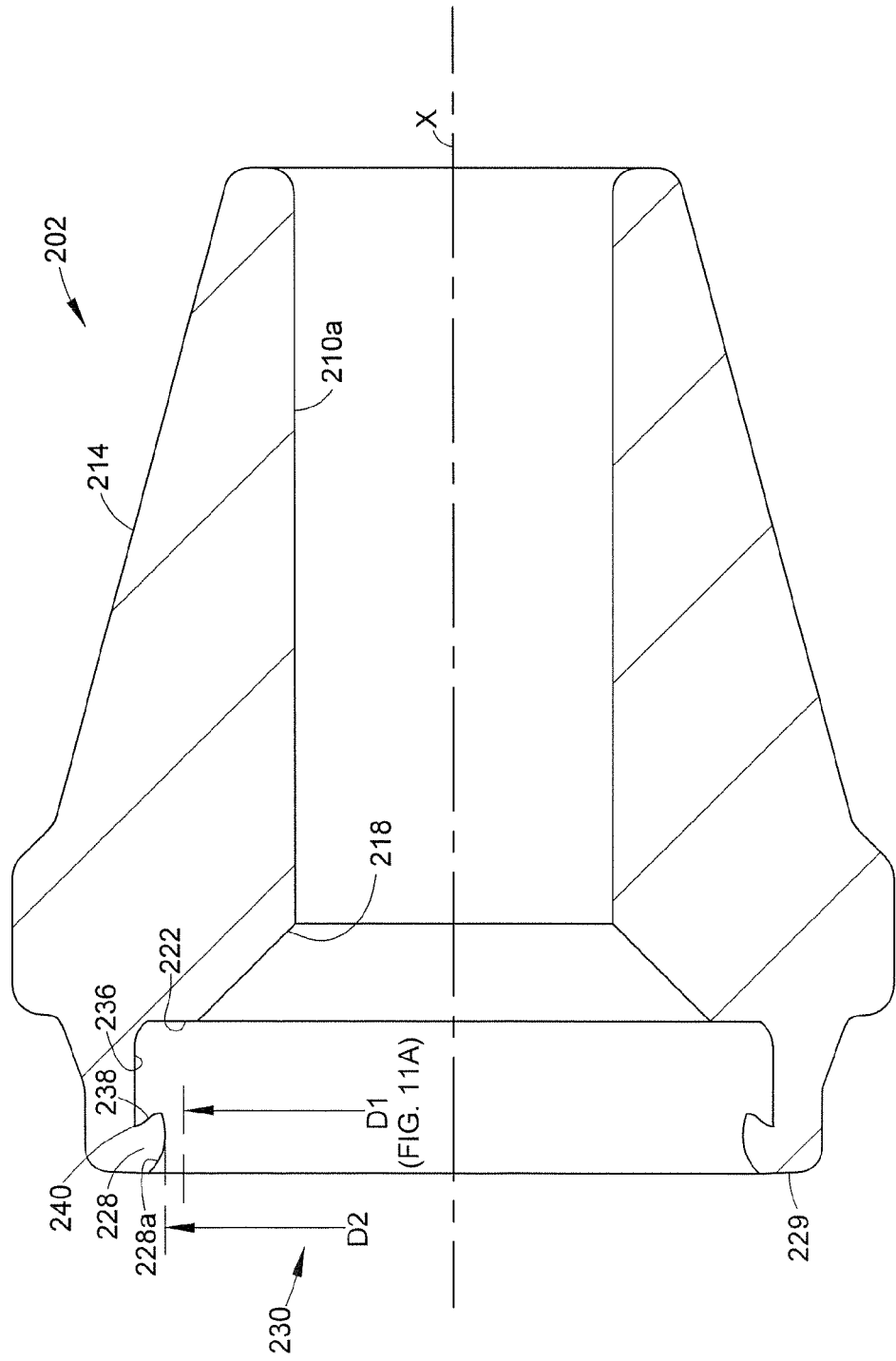
FIG. 45 is an enlarged view of the front ferrule of FIG. 42 after cartridging.
Figure 46:
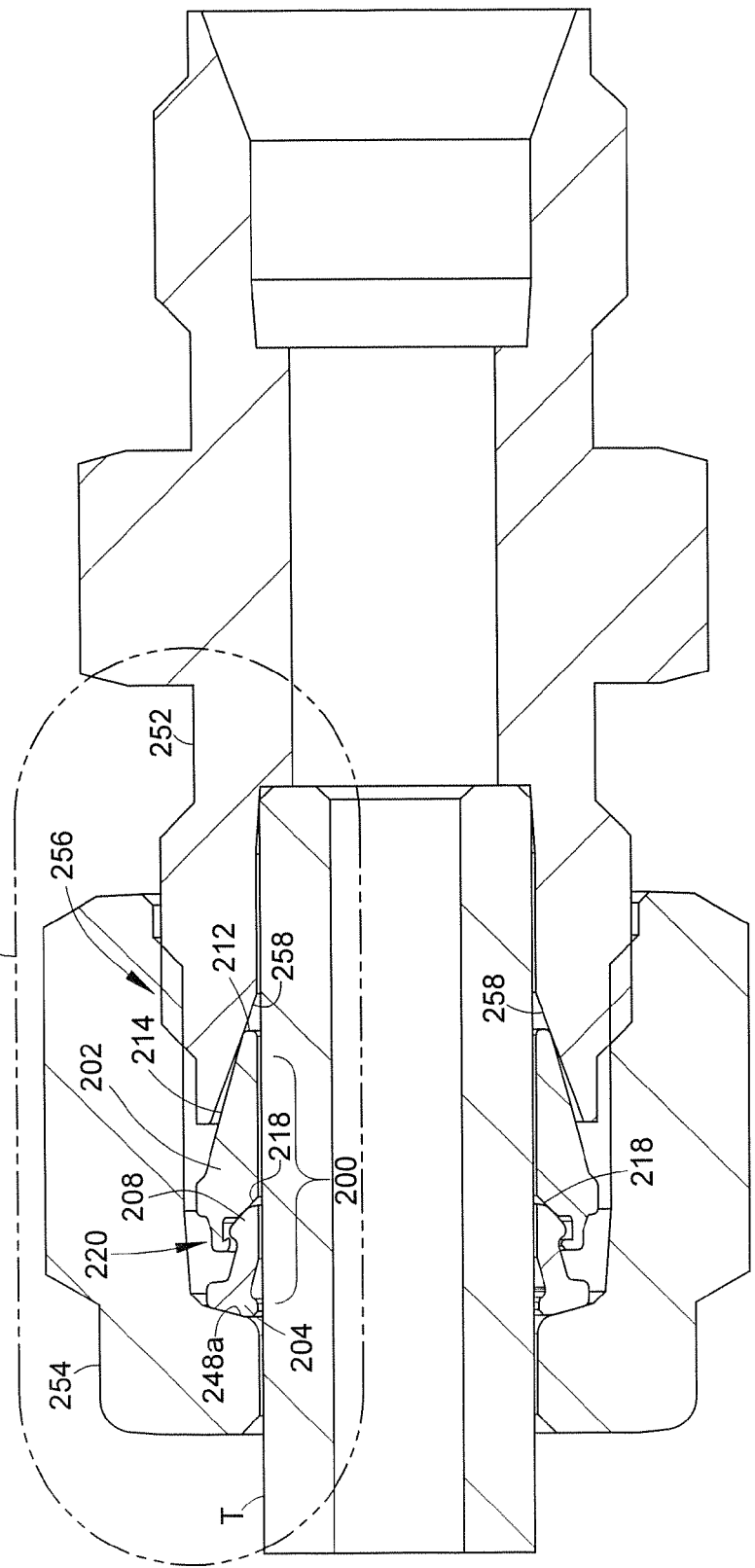
FIGS. 46-49 illustrate a conduit fitting with a ferrule cartridge in a finger-tight position, after pull-up to 1¼ turns past finger-tight position and 1⅞ turns past finger-tight pulled-up position.
Figure 47:
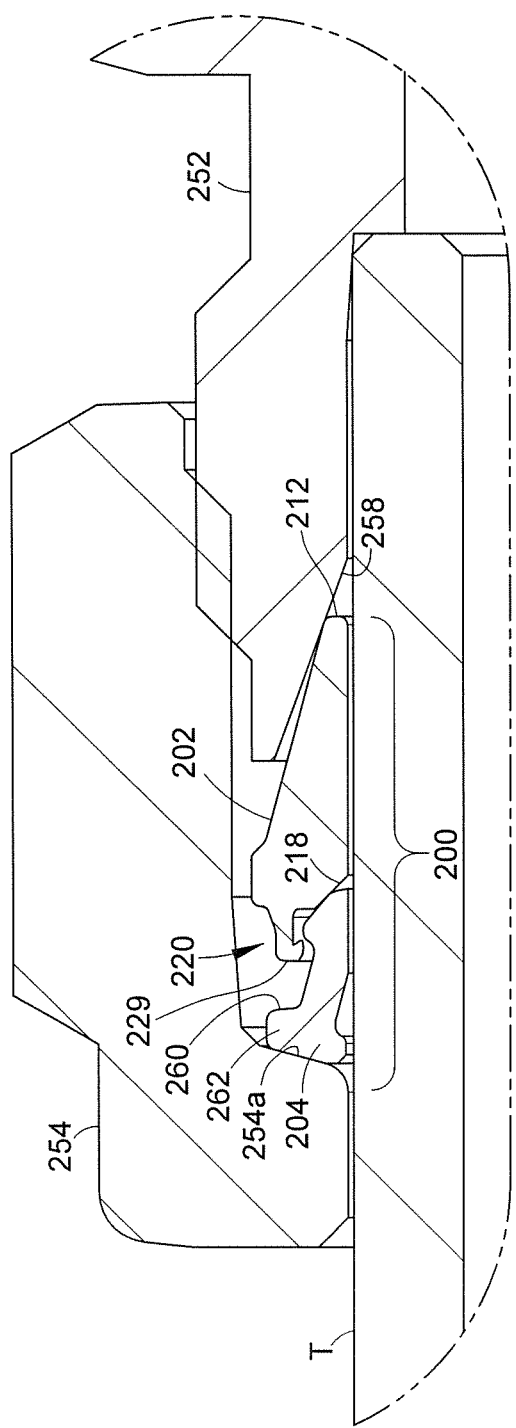
Figure 48A:
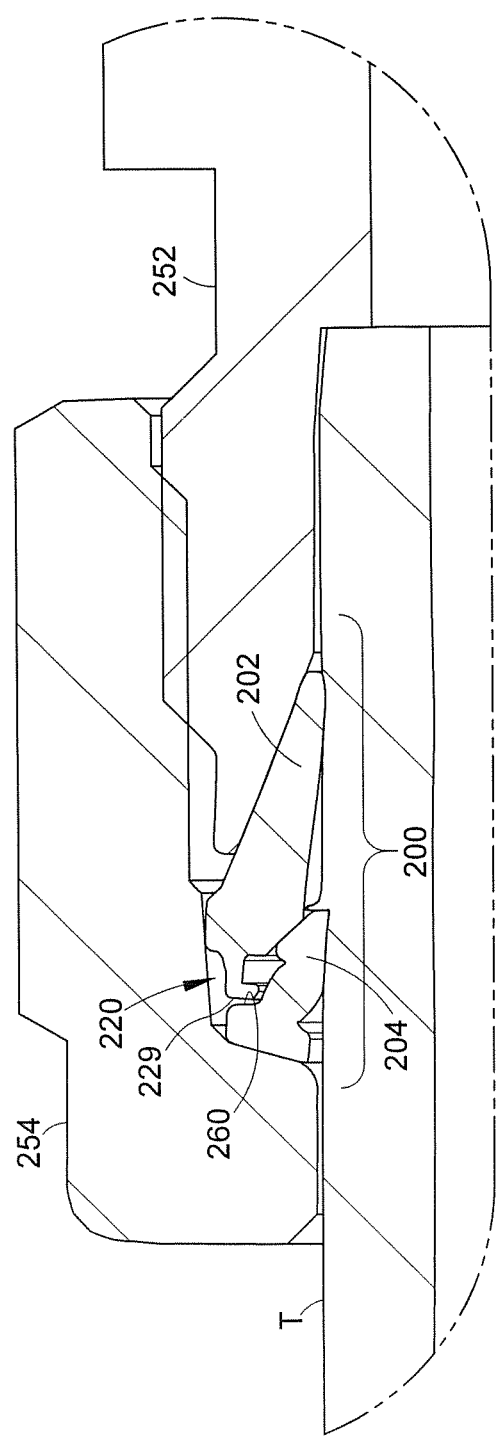

With additional reference to FIGS. 43-45, the cartridging process may be carried out using a press A having a drive surface B that applies an axial force against the back end of the rear ferrule 204; and an anvil or other suitable structure having a support surface C that contacts a suitable surface of the front ferrule 202, which in an embodiment may be a forward facing surface 242 provided by a flange 244 at the rearward portion 216 of the front ferrule. Alternatively, the support surface may be surface B and the drive surface may be surface C or both surfaces B and C may be drive surfaces. The press A or other drive surface may be axially displaced by any suitable drive means, such as hydraulics, pneumatics, manual, electro-mechanical and so on. The cartridging process includes driving the back ferrule 204 and the front ferrule 202 axially together along the axis X so as to press the back ferrule cartridging feature 206, for example the crown 206, past the retaining extension 228 and into the recess 234. The diameter of the opening 230 in an unstressed condition prior to cartridging is smaller than the maximum or major diameter of the crown 206 to produce an interference between a forward or in-board facing surface (246, FIG. 44) of the crown 206 and the retaining extension 228 when the cartridging process begins. Alternatively, other surfaces of the back ferrule 204, for example, any forward facing surface of the back ferrule 204, may be used. Examples of other surfaces that may be used are the forward portion 208 of the back ferrule such as the nose 206a or a forward facing surface 206b of the outboard flange 204a of the back ferrule.

Preferably, the cartridging process is aligned as closely as possible with an axial relative translation of the back ferrule 204 and the front ferrule 202. This helps to assure that the surface of the forward portion 208 of the back ferrule that contacts the retaining extension 228 makes contact circumferentially and uniformly so that the back ferrule 204 is not tilted or off-axis with respect to the front ferrule 202 as they are pressed together. Alignment pins or dowels (not shown) between the anvil and the press are one of many options available to maintain axial alignment of the ferrules 202, 204 during the cartridging process.

As shown in FIG. 43 which is a representation during the cartridging process in which the back ferrule has been approximately inserted halfway through the opening 230, the initial interference between the back ferrule cartridge feature 206 and the retaining extension 228 causes the back ferrule crown 206 to apply a cartridging force against the retaining extension 228 which cartridging force causes the retaining extension 228 to be bent or folded forward or inboard by a controlled deformation in part as a function of the crease 240. This folding or bending deformation of the retaining extension 228 increases the diameter of the opening 230 to allow the crown 206 to pass through, for example with an optional snap action. This is also an example of a high energy to low energy connection technique described hereinabove, in which during the cartridging process a higher energy is applied to the back ferrule 204 and the retaining structure 228 to push the crown 206 into the recess 234, and as soon as the crown 206 clears the retaining extension 228 the rear ferrule 204 is cartridged and retain with the front ferrule 202 in a lower energy state (for example without radial or axial load between the rear ferrule cartridge feature 206 and the surfaces that delimit the recess 234).

FIG. 44 illustrates the ferrule cartridge 200 after the rear ferrule cartridge feature 206 has cleared the retaining extension 228 and is positioned in the recess 234. Note that the retaining extension 228 is plastically deformed and remains folded over with the angle α an acute angle, however, the retaining extension 228 may also exhibit elastic deformation with some spring back so that the final diameter of the opening 230, while greater than the original diameter prior to cartridging, is small enough to provide interference with the crown 206 and thereby retain the ferrules together as a ferrule cartridge 200.

FIGS. 44 and 45 illustrate the front ferrule 202 after cartridging with the folded over retaining extension 228, along with illustrative examples of the pre and post cartridging diameters (D1 and D2 respectively) of the opening 230. Further note that an inboard facing surface 246 (FIG. 43) of the crown 206 makes contact with the retaining extension 228 during the cartridging process, but an outboard facing surface 248 (FIG. 44) may be a surface that interferes with the retaining extension 228 after cartridging is completed. In an embodiment of a back ferrule having a crown 206 as the cartridge feature, the post cartridging diameter D2 preferably is less than the post-cartridging major diameter D3 of the crown 206. For example, preferably but not necessarily D3 is greater than D2 so that when the cartridged ferrules 200 are pivoted or are radially displaced with respect to each other, an observer cannot visually see (through the post-cartridge opening 230) the surface of the major diameter of the crown 206 through the post-cartridge opening 230. This result may be used to control the level of RRC desired for a particular application.

The back ferrule surface 248 preferably although not necessarily contacts the deformed retaining extension 228 only as an interference against axial separation and not necessarily in continuous contact. In other words, it is preferred although not required that the cartridge feature 206 of the back ferrule that is retained in the recess 234 be a loose retention without axial or radial load. A loose cartridge connection allows the ferrules to easily align and self-center axially and radially particularly when the conduit T is inserted into the conduit fitting 200 preparatory to pulling-up the fitting. But alternatively, the cartridge feature 206 of the back ferrule may be under radial or axial load or both depending on the type of mechanical connection needed, including the desired robustness. The amount of spring back or elastic deformation of the retaining extension 228 and for that matter the member 220 in general may be designed to provide the desired robustness of the ferrule cartridge 200. This elastic deformation may be controlled, for example, by selection of the geometry and materials of the member 220 along with the geometry and materials of the back ferrule cartridge feature 206.

Many alternative design criteria may be used to control the deformation of the member 220 including if so desired, the retaining extension 228. The criteria may include, for example, the material of the front ferrule 202 as well as surface treatment, the thickness of the web 224 in the various parts of the web, the taper angles and so on. The crease 240 may also be designed to facilitate a controlled deformation of the retaining extension 228. Preferably, the crease 240 is provided by a relatively sharp corner. Now, for metal ferrules that are machined, such as stainless steel ferrules in the exemplary embodiments herein, there is no true 90° corner. Rather, a 90° or sharp corner would be more correctly thought of as a tight radius corner, for example a radius in the range of approximately 0.001 inch to approximately 0.015 inch, more preferably approximately 0.002 inch to approximately 0.01 inch, and still more preferred in the range of approximately 0.003 inch to approximately 0.005 inch. Such a tight or sharp corner will provide a hinge-like action of the crease 240 that will help assure a forward bending deformation that will not stress the back ferrule cartridge feature 206 and will produce an acute post-cartridging angle for the angle α. The crease 240 may be designed in concert with the web 220 flexibility to achieve the desired deformation, ease of cartridging, and robustness of the ferrule cartridge 200.

Even though there is a plastic deformation of the retaining extension 228 the cartridging process may still exhibit a snap together feel or effect if so desired but such is not required.

A near right angle α as set forth herein prior to cartridging allows the cartridging process to occur such that the retaining extension 228 does not encounter a buckling resistance of the web 220 or the retaining extension 228. This reduces the opportunity for the cartridging process to generate burrs or ring chips or other metal debris from the surface of the back ferrule 204, particularly along the surface of the cartridge feature 206.

Note that as in the embodiments hereinabove, the recess 234 may be dimensioned to allow for a Type 1, 2 or 3 cartridge connections, especially a Type 3 that allows the ferrules to be cartridged together without significant radial or axial load between the ferrules in the subassembly condition.

FIGS. 46-49 illustrate the ferrule cartridge 200 embodiment of FIGS. 42-45 (with the front ferrule of FIG. 42A) with an embodiment of a conduit fitting with a conduit end T, from finger-tight assembly through a typical 1⅞ (1.875) turns pull-up past finger-tight. In an embodiment, a first fitting component may be a male-type conduit fitting 250 that includes a male threaded body 252, and a second fitting component may be a female threaded nut 254 that is joinable with the body by a threaded connection 256 (as is convention, the body is the fitting component that receives the end of the conduit). In the finger-tight position (FIGS. 46 and 47) a ferrule drive surface 254a of the nut touches the back end of the back ferrule 204, the forward portion 208 of the back ferrule touches the camming surface 218 of the front ferrule 202, and a forward portion near the front end 212 of the front ferrule touches the body tapered camming surface 258 that presents a frustoconical camming mouth at the rearward portion of the front ferrule 202, as is known. In an embodiment, the body 252 may be part of a union as shown, or alternatively the body 252 may be provided in another of many configuration such as but not limited to a tee, an elbow, a cross, as well as female-type fitting configurations. The finger-tight position is a reference position for pull-up in which the nut 254 and the body 252 are axially displaced (also known as relative axial stroke past the finger-tight position) by relative rotation with respect to each other for a prescribed number of turns (including partial turns as needed). A common but not required stroke for complete initial (first time) pull-up is 1¼ (1.25) turns past finger-tight position. Pull-up (FIG. 48A) involves the back ferrule 204 being axially driven by the nut 254 against the camming surface 218 of the front ferrule 202, which drives the front ferrule 202 against the camming surface 258 of the body. The front ferrule 202 tapered outer wall 214 forms a fluid-tight seal against the body camming surface 258; the front ferrule also has an internal bore delimited by a wall that is compressed against and seals the outer surface of the conduit T. The forward portion of the back ferrule 204 is radially compressed against the conduit outer surface by action of the camming surface 218 of the front ferrule, which causes the back ferrule to grip the conduit and may optionally also provide a seal against the conduit surface. The rear portion of the back ferrule tends to rotate radially outwardly away from the conduit surface, although other ferrule designs may deform differently. Also, the inward radial compression (arrow RC) of the forward portion 208 of the back ferrule 204, along with an optional radially outward rotation or expansion (arrow RO) of the front ferrule 202, results in disengagement or release of the back ferrule 204 from the retaining structure R (FIG. 42).

Figure 49:
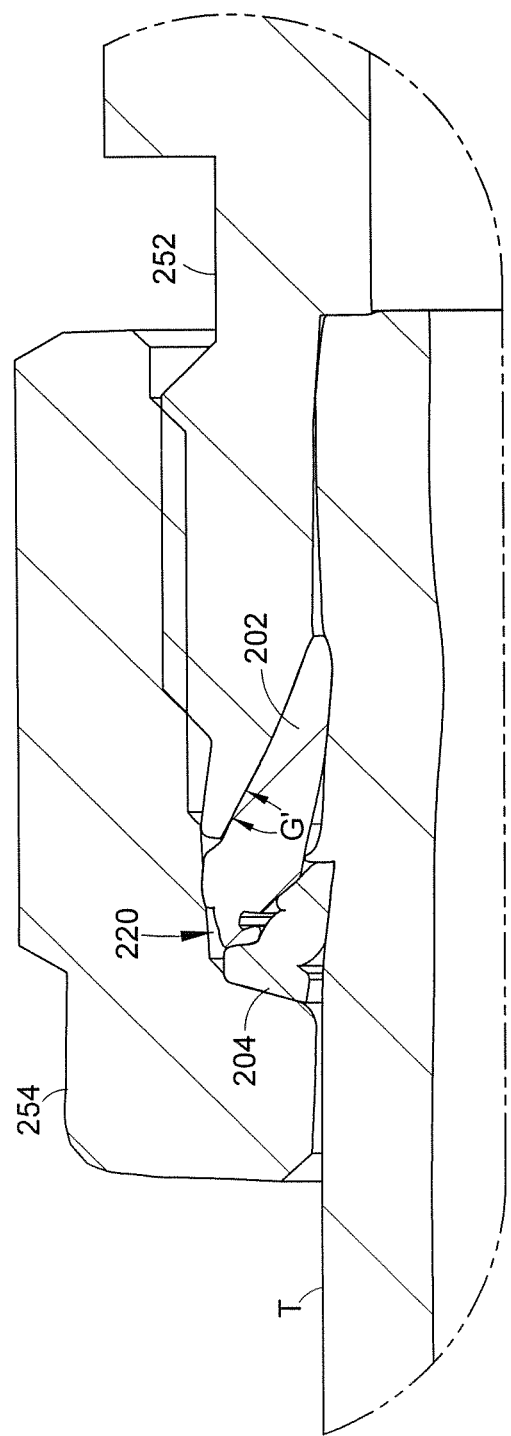
Figure 53:
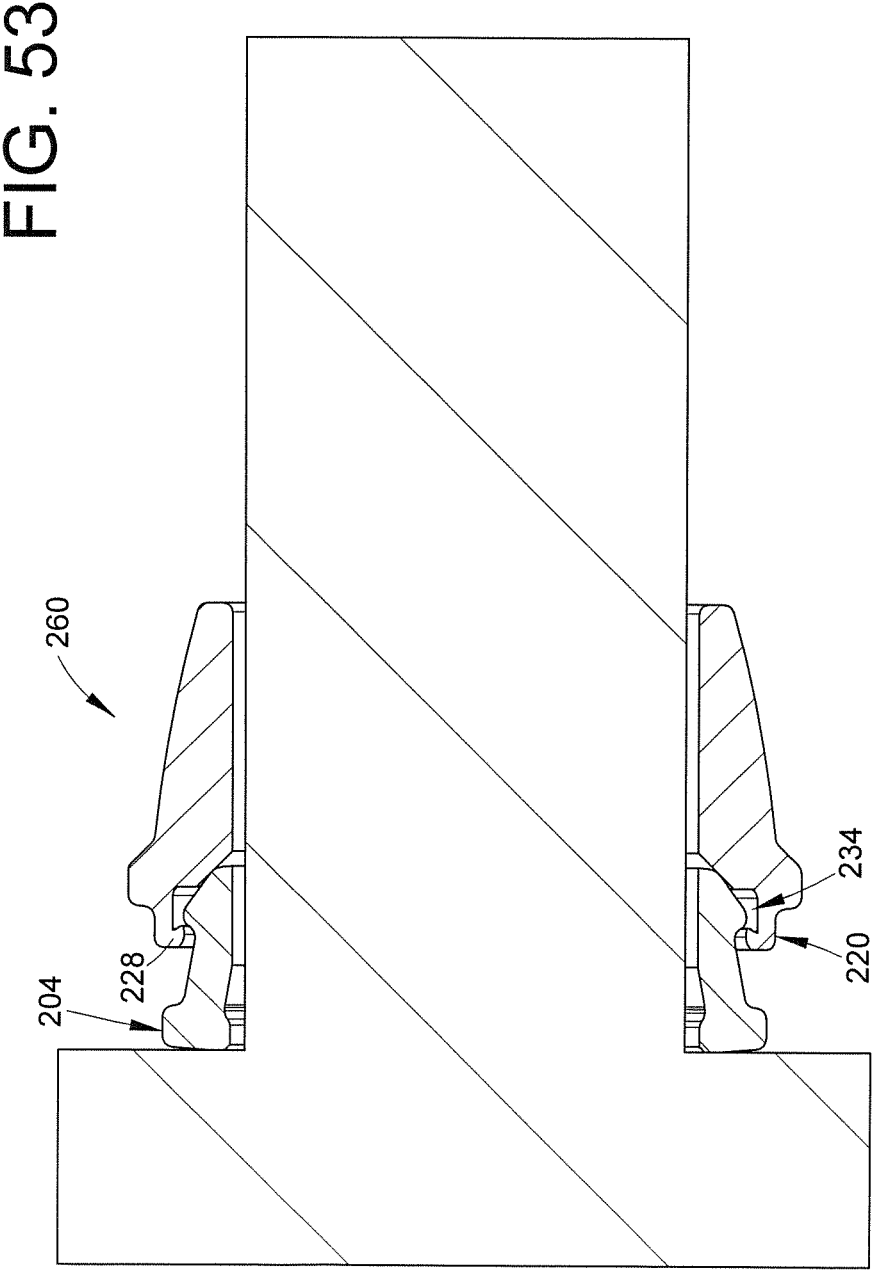
Figure 54:
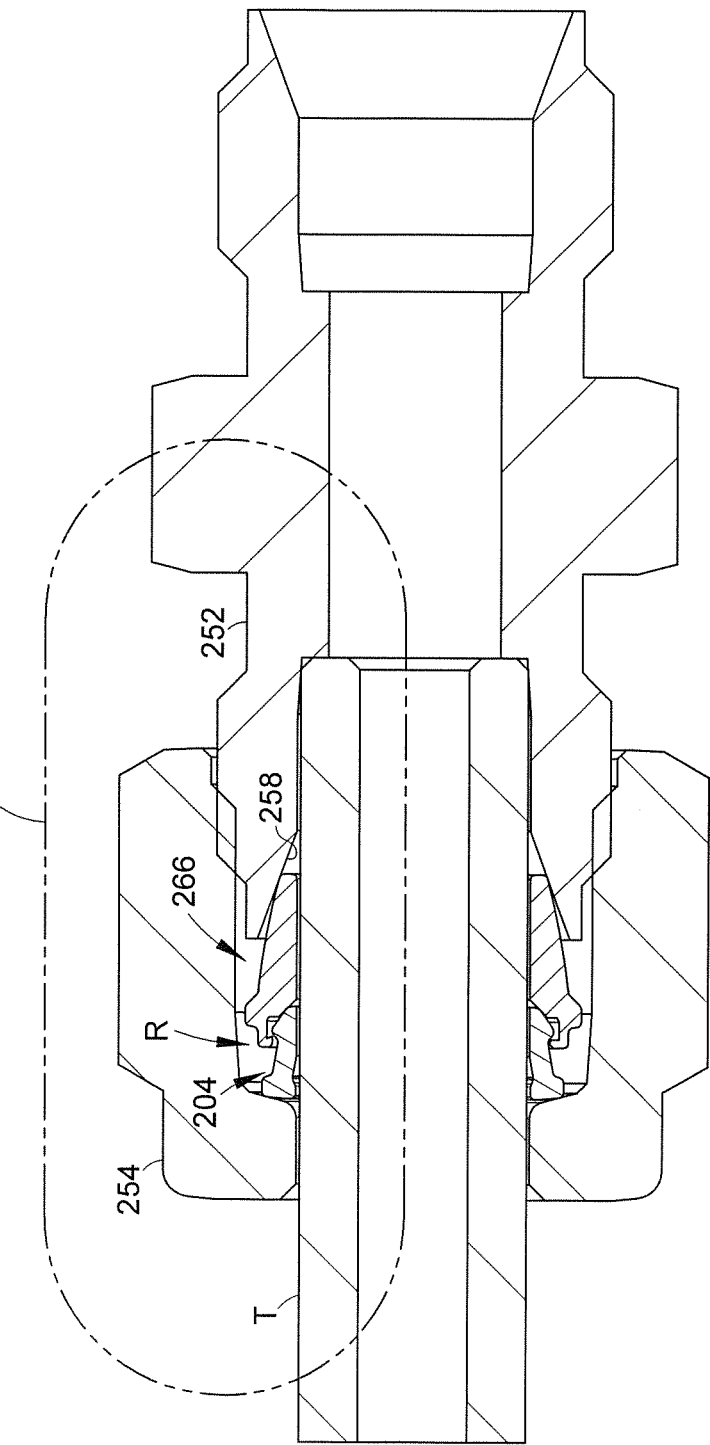
FIGS. 54-56 illustrate a conduit fitting with a ferrule cartridge as in FIGS. 51-53 in a finger-tight position and after pull-up to 1¼ turns past finger-tight position.
Figure 55:
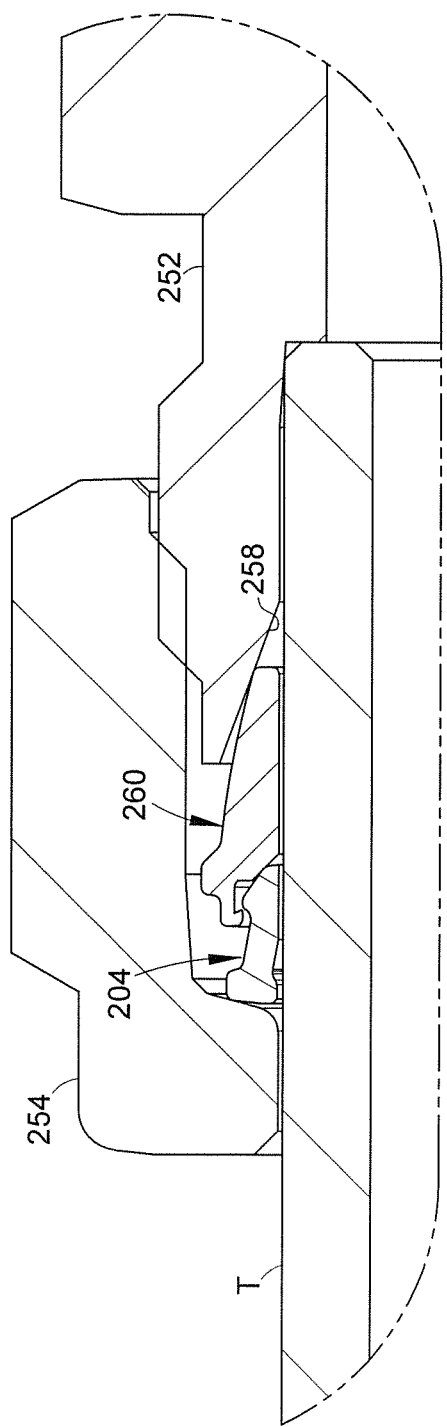

Note that the retaining structure R does not interfere with or change the form, fit and function of the ferrules, especially during the pull-up process. In some embodiments, such as shown in FIGS. 48 and 49, a portion of the member 220 may make contact with a surface of the back ferrule 204, but this contact does not impede normal ferrule function during pull-up. In an exemplary embodiment, this contact may not be made at 1.25 turns past finger-tight position, and may not occur until 1.5 turns or more which may correspond to five to ten remakes, with earlier contact (e.g., at 1.25 turns past finger tight) being more likely to occur for thick wall conduit.

In other embodiments, according to an inventive aspect of the present application, the ferrules may be configured such that engagement between the front ferrule web 220 and the rear ferrule 204 during the pull-up process, as described above, coincides with relative axial displacement of the threaded fitting components that may be associated with the number of complete and/or partial turns past the finger tight position for complete fitting pull-up, during initial fitting installation, and/or for one or more remakes, similar to the embodiment of FIGS. 36 and 37 described in greater detail above. In such an embodiment, the front ferrule web 220 may function as a stroke limiting extension or stroke resisting member, similar to the stroke limiting extension 310' of the fitting of FIGS. 36 and 37. Accordingly, the retaining member 220 may be used to allow pull-up by torque, as an alternative to pull-up by turns, using a prescribed or predetermined torque for relative rotation of the body and the nut that will advance the body and nut axially together to the prescribed pull-up stroke. The retaining member 220 may have an end surface 229 (for example, defined by the retaining extension 228) that contacts a bearing surface 260 of the back ferrule 204, for example on a back ferrule flange 262 at the prescribed pull-up stroke past the finger-tight position as shown in FIG. 48. The retaining member or stroke resisting end surface and the back ferrule bearing surface may be substantially radially aligned, such that at least a majority of the stroke resisting end surface is radially aligned with at least a majority of the back ferrule bearing surface. This contact between the retaining member 220 and the back ferrule 204 produces an axial load or compression on the retaining member 220 during relative rotation of the body and the nut. (Note that there may also be radial loads applied to the retaining member 220.) The axial compression or load on the retaining member 220 produces or is accompanied by an increase in the torque required to continue to pull-up the fitting (i.e. continue to apply torque for relative rotation of the body and the nut), and this torque increase is greater than would be presented if the contact and axial load or compression did not occur. The retaining member 220 plastically axially deforms so that the fitting may be remade using a prescribed torque or turns. Initial pull-up and remakes may optionally be carried out using the same prescribed torque or different torque values. FIG. 49 illustrates the fitting 100 after one or more remakes in which further plastic deformation of the retaining member 220 allows the fitting to be remade for one or more remakes to effect conduit grip and seal.

Depending on the expected relative axial movement of the front ferrule retaining member 220 and the back ferrule flange 262 during pull-up, the front ferrule retaining member may be provided with an axial length that is selected to provide engagement between the retaining member end surface and the back ferrule flange bearing surface at a predetermined axial advance of the fitting body and nut during pull-up (e.g., at least 1¼ turns past a finger tight position). FIG. 49A illustrates an exemplary ferrule 202" similar to the ferrule 202 of FIG. 42A, except with a retaining member 220" having an axially extended end portion 229", extending beyond the retaining extension 228" and sized for engagement between the retaining member end portion 240" and the back ferrule flange bearing surface at a predetermined axial advance of the fitting body and nut during pull-up. According to another inventive aspect of the present application, an axially extending end portion 229" may additionally or alternatively be provided for additional strength and rigidity of the retaining member 220".

Figure 56:
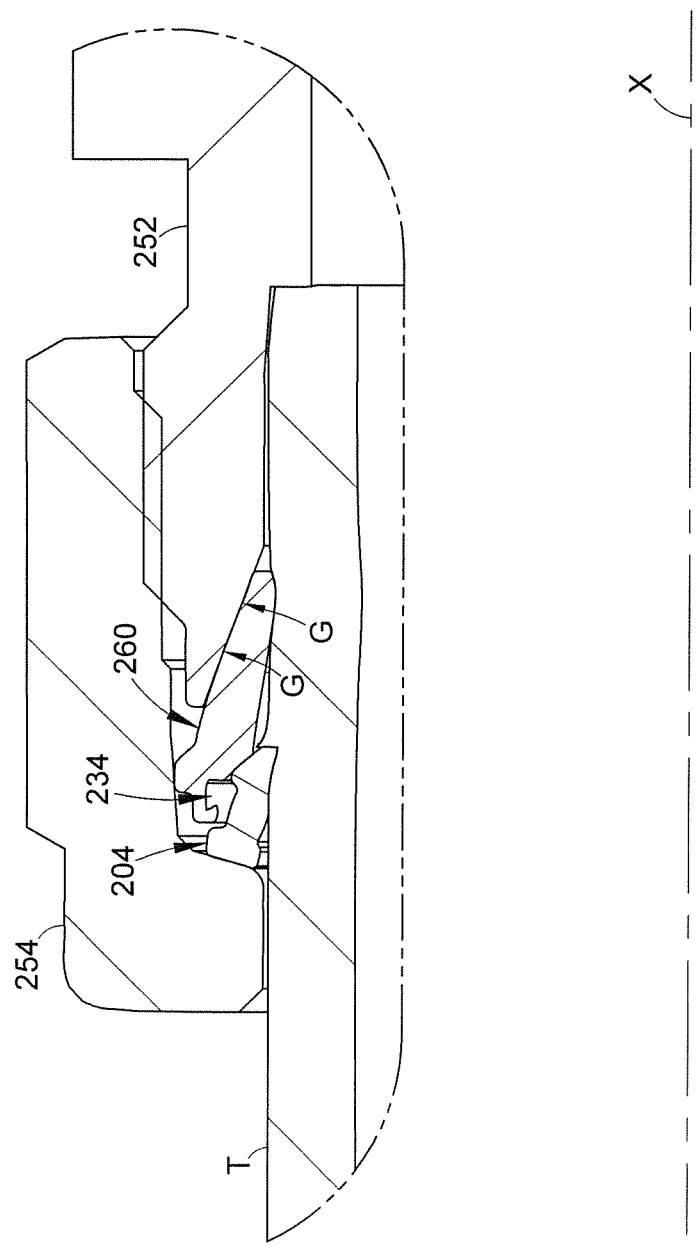
Figure 56A:
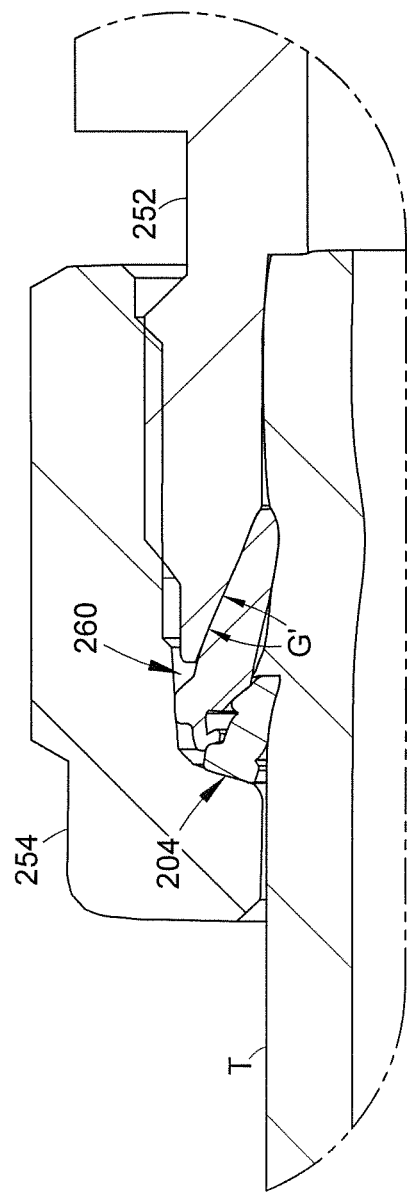
FIG. 56A illustrates the conduit fitting of FIGS. 51-53 after 1.875 turns past finger-tight position.

Contact between the retaining member 220 of the front ferrule 202 and the rear portion of the back ferrule 204, whether or not such contact is used to facilitate pull-up by torque, as described above, may in some cases, for example, for thick wall tubing or conduit T, have the effect of an increased expansion of the rearward portion 216 of the front ferrule. This expansion may provide increased load on the camming surface 258 of the body 252 (FIG. 46), particularly in the outboard portion of the body camming surface 258. A somewhat exaggerated example of this is shown in FIGS. 49 and 56A. According to a separate inventive concept of the present application, we have found that the load at the rear or outboard portion the body camming surface may be reduced by providing a front ferrule having an outer wall surface that continuously declines in angle from a forward portion that initially engages the body camming surface during pull-up, toward a rear portion axially aligned with an outboard portion of the body camming surface. This reduced load at the outboard portion the body camming surface may reduce outward expansion of the body, which may occur in some fitting embodiments, including, for example, fittings utilizing a front ferrule with a cartridge feature that contacts a surface of the rear ferrule during pull-up or remake (e.g., the fitting of FIGS. 42-49), as described above.

Accordingly, the present application also contemplates the use of a front ferrule (both in the fittings described herein and in various other fittings utilizing one or more conduit gripping devices) having an outer wall with a forward portion oriented for initial engagement with a fitting body camming surface during pull-up, and a rearward extending contoured portion having a continuous rearward declining angle with respect to the forward portion. As used herein, surfaces with a "continuous rearward declining angle" are intended to include surfaces for which longitudinal tangents to points along the length of the surface continuously (although not necessarily at a constant rate) decline in angle from the front end of the contoured surface to the rear end of the contoured surface. The continuous rearward declining angle of the contoured portion of the front ferrule outer wall may reduce or eliminate radial load forces on the rear or outboard portion of the body camming surface by effectively removing radially outer material from the rear portion of the ferrule, while maintaining sufficient material toward the front of the ferrule for sealing engagement with the camming surface and to limit outward radial expansion of the ferrule.

Additionally, a contoured ferrule surface having a continuous rearward declining angle may be provided with a steeper (i.e., having a greater angle) front end, as compared to the straight frustoconical outer wall surface of a conventional ferrule, for example, to maintain increased material at a middle portion of the front ferrule to stiffen the front ferrule for flexing at this middle portion during pull-up, and/or to limit axial advance of the front ferrule into the body camming mouth during pull-up. This initially steeper contoured surface may provide a greater radial spring load on the nose of the back ferrule, enhancing the tube gripping function of the back ferrule. In one example, the front end of the contoured surface may have a tangent angle that is greater than a conventional frustoconical ferrule wall angle (e.g., greater than about 15°) but less than or equal to the angle of the tapered body camming surface (e.g., less than or equal to about 20°, for example, about 17°), thereby providing an enlarged middle portion of the ferrule. The contoured surface may be oriented such that a portion rearward of some point in the middle portion is shallower than the conventional frustoconical ferrule wall angle, thereby effectively removing material from the rear portion of the ferrule.

By limiting the body camming surface engaging portion of the ferrule outer wall to a tangent angle no greater than the body camming surface, and by providing a contoured surface with a continuous rearward declining angle, engagement between the front end of the ferrule outer wall contoured surface and the body camming surface may be maintained throughout fitting pull-up. In other words, once fitting pull-up produces engagement between the front end of the ferrule outer wall contoured surface and the body camming surface, further pull-up will not cause the ferrule outer wall surface to "rock" against the body camming surface, and the front end of the ferrule outer wall contoured surface will not separate or disengage from the body camming surface.

Many different types of contoured surfaces may be utilized to provide a continuous rearward declining angle. In one embodiment, the contoured surface may include a convex curvature, forming a frustoelliptical tapered outer wall surface. Other complex contoured surfaces may additionally or alternatively be utilized.

With reference to FIGS. 50-56, in an alternative embodiment, a front ferrule 260 for the ferrule cartridge 200 of FIGS. 42-49 may be but need not be the same as the front ferrule 202 with the modification of a convex outer wall surface 262 (convex as viewed in longitudinal cross-section) that extends from a forward portion 264 of the front ferrule, optionally to the front end 266 of the front ferrule, towards the rearward portion 268 of the front ferrule, optionally to the flange 244 at the forward surface 242.

We use like reference numerals for like features with the embodiment of FIGS. 42-49. Operation of the ferrule cartridge 200 and the conduit fitting 250 with the alternative front ferrule 260 may be the same as described above for the embodiment of FIGS. 42-49. The convex outer wall surface 262 may have a radius R1 as viewed in longitudinal cross-section (FIG. 50 for example) or may be a different convex profile or geometry, for example may comprise a combination of radii and straight portions. The convex surface 262 is formed in the front ferrule 260 to be present in an unstressed condition. The convex surface 262 may be used in some embodiments to position the radial load forces (represented by arrow G in FIG. 56) that form the fluid-tight body seal between the front ferrule 260 and the body camming surface 258 to be more axially localized in an inner portion of the body camming surface 258.

The combination of the convex outer wall surface 262 of the front ferrule with the cartridge feature or member 220 on the back of the front ferrule presents an embodiment of a separate inventive concept. The addition of the convex outer wall surface 262 to the front ferrule 260, as shown in the example of FIG. 50, may reduce the load G at the rear or outboard portion the body camming surface 258 and hence reduce outward expansion of the body 252, which may be present if the cartridge feature 220 of the front ferrule 260 contacts a surface of the rear ferrule. For example, by comparing FIGS. 49 and 56 it will be observed that the convex outer wall surface 262 (FIG. 56) restrains the axial outboard advance of the front ferrule 260 into the camming mouth of the body 252 against the camming surface 258. This helps axially distribute or localize the load G to a more inner portion of the camming surface 258 (FIG. 56) as contrasted with FIGS. 49 and 56A where the load G' influences to a greater extent the outboard portion of the camming surface 258.

Figure 57:
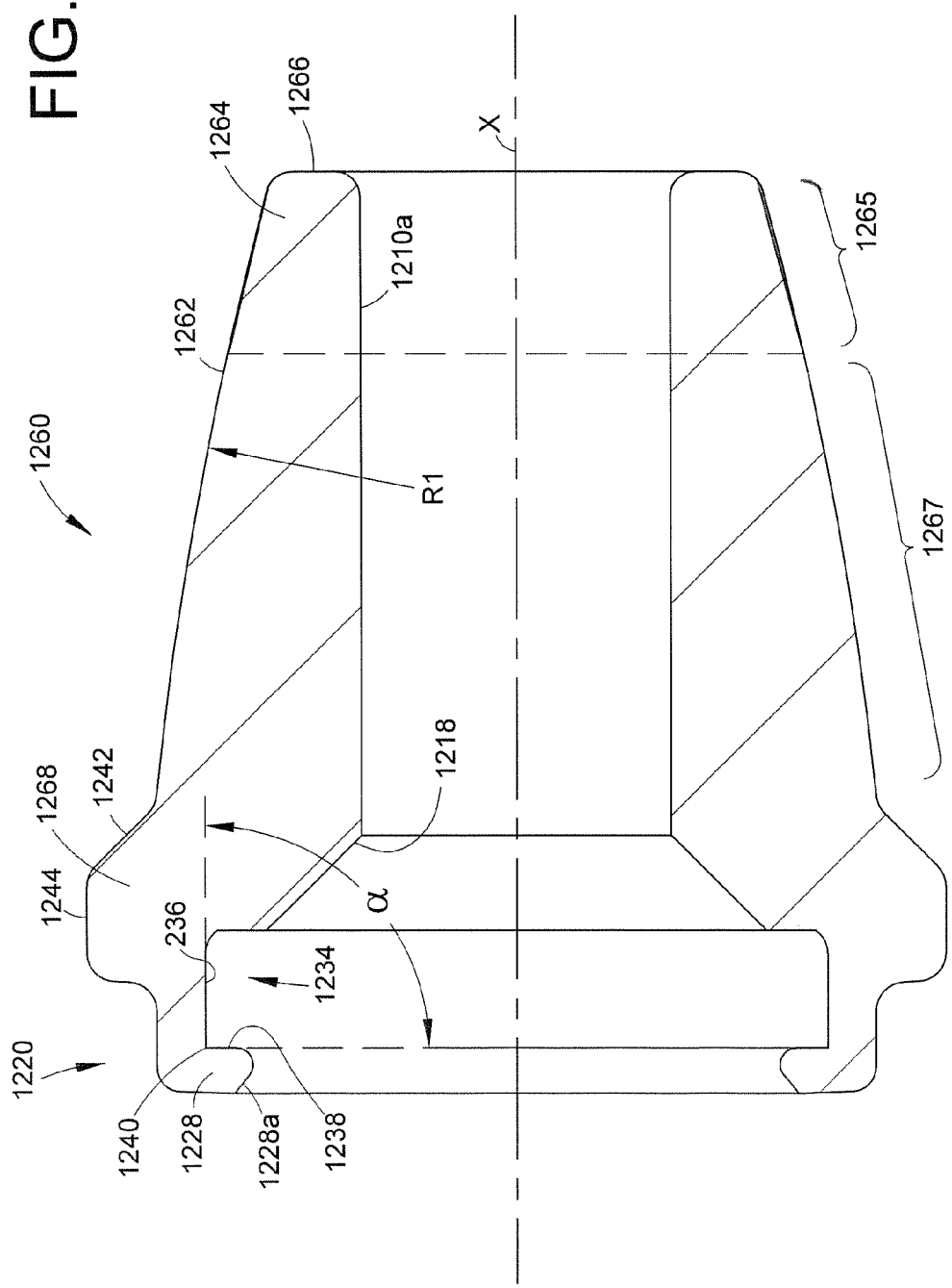
FIG. 57 illustrates another embodiment of a front ferrule.

Alternatively, the convex (or otherwise contoured to have a continuous rearward declining angle) outer wall surface need not fully extend between the forward surface and the front end of the front ferrule. For example, the convex outer wall surface may only define a portion of the surface that extends between the flange and the front end of the front ferrule. The convex outer wall surface in such a case, for example, may blend to a frustoconical taper or transition along the forward portion or front end of the front ferrule. FIG. 57 illustrates an exemplary front ferrule 1260 having a forward frustoconical taper portion 1265 extending rearward from the nose 1266 of the ferrule, and a convex or frustoelliptical contoured portion 1267 (distinct from the radius contour of the ferrule nose) extending rearward from a rear end of the frustoconical taper portion 1265. The forward frustoconical portion 1265 may provide for an extended forward region of radial load on the fitting body camming surface, which may, for example, form an enhanced gas seal. The frustoconical portion 1265 is preferably disposed at an angle that is greater than or equal to the tangent angle of the front end of the frustoelliptical contoured portion 1267, such that when the front end of the frustoelliptical contoured portion 1267 engages the camming surface during pull-up, engagement is maintained at least at the front end of the frustoelliptical contoured portion 1267 during further pull-up. As a result, there is no rocking motion of the ferrule outer wall against the camming surface and about the front end of the frustoelliptical contoured portion 1267.

Figure 58:
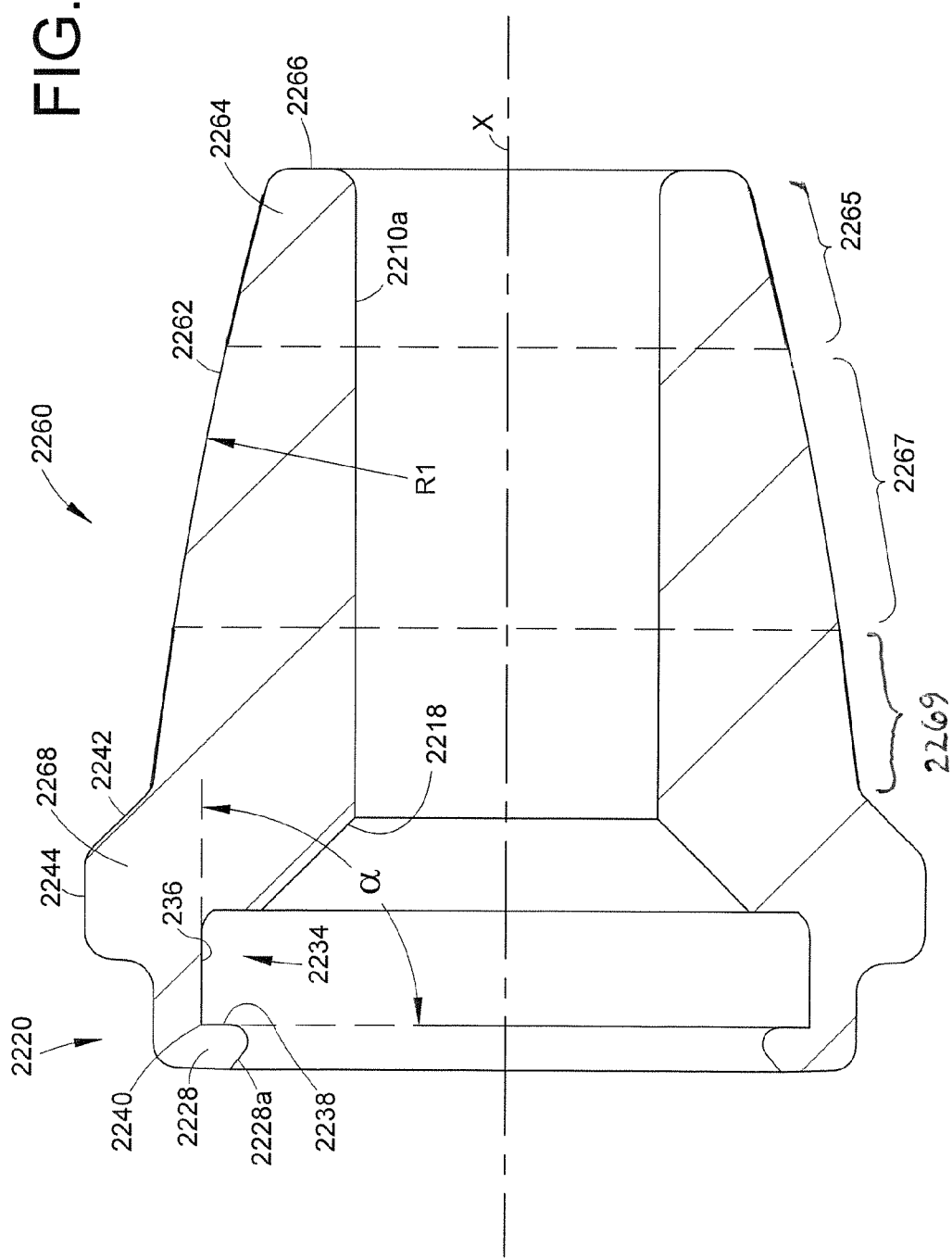
FIG. 58 illustrates another embodiment of a front ferrule.

As another example, a convex or frustoelliptical outer wall surface of a front ferrule may additionally or alternatively blend to a frustoconical taper or transition along the rearward portion or rear end of the front ferrule. FIG. 58 illustrates another exemplary front ferrule 2260 having a rear frustoconical taper portion 2269 extending rearward from a convex or frustoelliptical contoured portion 2267 of the ferrule outer wall. The frustoelliptical contoured portion 2267 may extend rearward directly from the nose 2266 of the ferrule 2260, like the ferrule of FIG. 50, or from a forward frustoconical taper portion 2265 that extends from the nose, like the ferrule of FIG. 57. The rear frustoconical portion 2269 may, for example, be axially disposed on a portion of the ferrule that will remain outside the camming mouth of the body after fitting pull-up.

Figure 59:
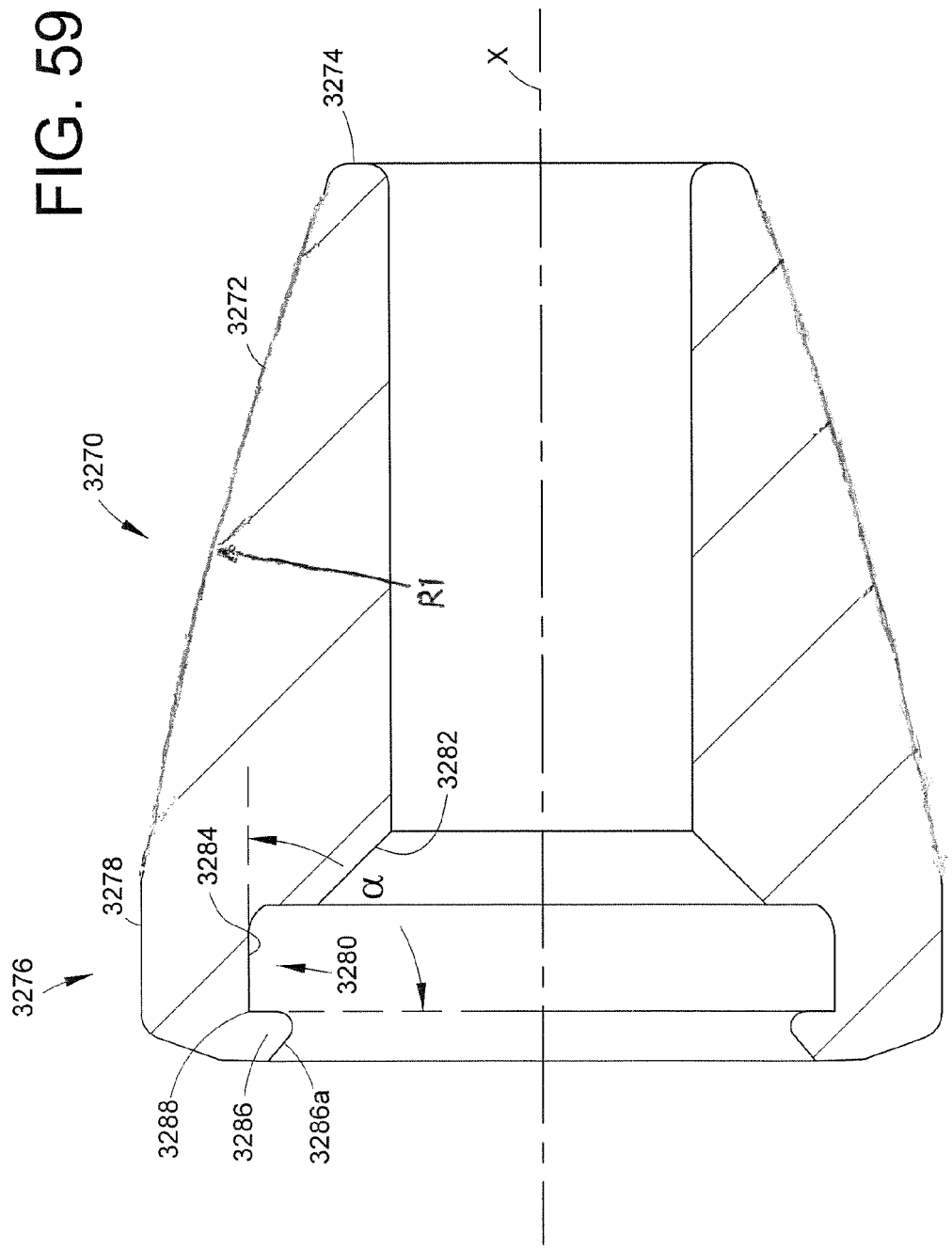
FIG. 59 illustrates another embodiment of a front ferrule.
Figure 60:
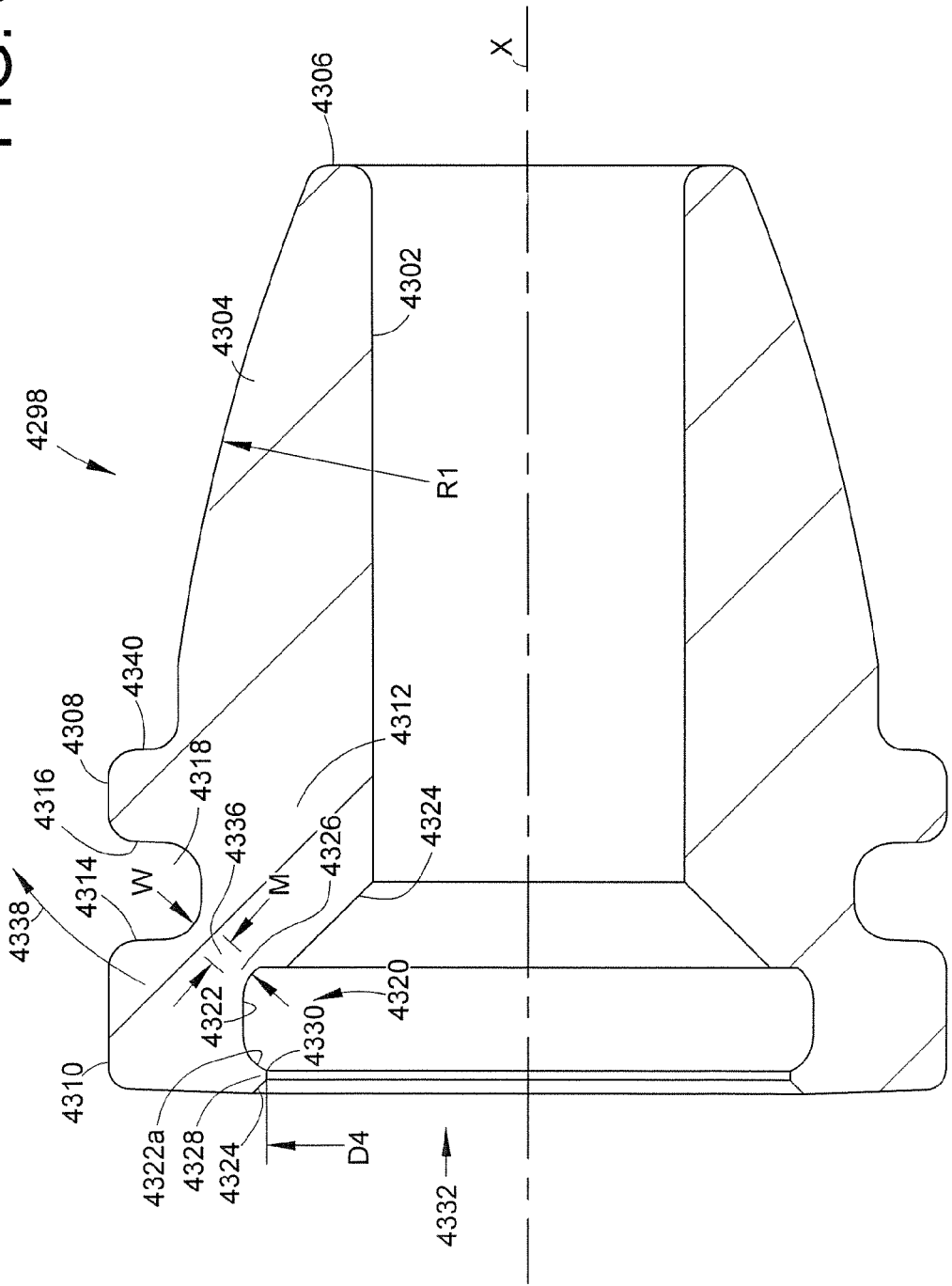
FIG. 60 illustrates another embodiment of a front ferrule.

While FIGS. 50-56 illustrate a convex outer wall surface on a front ferrule having an axially forward bending retaining member for cartridging, the convex (or otherwise contoured for a continuous rearward declining angle) outer wall surface may additionally or alternatively be provided on other cartridging front ferrules, as well as non-cartridging ferrules (including single ferrule and other multiple ferrule fitting embodiments). FIGS. 59-61 illustrate exemplary cartridging and non-cartridging ferrules having a convex or frustoelliptical outer wall surface, in accordance with inventive aspects of the present application.

According to still another inventive aspect of the present application, contact and/or radial loads between the front ferrule and an outboard portion of the body camming mouth may be further minimized or eliminated (in addition to or instead of use of the contoured outer wall ferrule surfaces described above) by providing the front ferrule with a rear flanged portion sized to engage an interior surface of the fitting nut, upon radial expansion of the front ferrule, and before the front ferrule contacts or applies a radial load to the outboard portion of the body camming mouth. For example, the front ferrules of at least FIGS. 36, 39, 42A, 45, 50, 57, 58, 60, and 61 include rear flange portions that may be sized to engage an interior surface of the fitting nut, upon radial expansion of the front ferrule, and before the front ferrule contacts or applies a radial load to the outboard portion of the body camming mouth.

The inventive aspects have been described with reference to the exemplary embodiments. Modification and alterations will occur to others upon a reading and understanding of this specification. It is intended to include all such modifications and alterations insofar as they come within the scope of the appended claims or the equivalents thereof.

We claim:

1. A fitting for conduits having a reference axis, comprising:
   a first threaded fitting component;
   a conduit gripping device receivable within the first threaded fitting component;
   a second threaded fitting component that threadably joins with the first threaded fitting component to produce relative axial stroke between the first threaded fitting component and the second threaded fitting component, wherein when the fitting is pulled-up on a conduit the first fitting component and the second fitting component can be joined together to a first relative axial position of the first and second fitting components to effect conduit grip and seal by the conduit gripping device at the first relative axial position; and
   a stroke resisting member having a first axial length, the stroke resisting member being disposed between a threaded portion of the first fitting component and a radially extending portion of the second fitting component, and including a first end portion axially fixed to the first fitting component and having a first radial thickness, a second end portion including a radially extending bearing portion having a second radial thickness, and a web connecting the first and second end portions, the web having a third radial thickness smaller than each of the first and second radial thicknesses and defining an axially deformable portion;
   wherein the bearing portion of the stroke resisting member is axially engaged by the radially extending portion of the second fitting component when the first and second fitting components are joined together to the first relative axial position, the stroke resisting member resisting additional axial stroke of the first and second fitting components, such that a tightening torque beyond the first relative axial position is increased by the axial engagement; and
   wherein the axially deformable portion of the stroke resisting member is plastically compressed such that the stroke resisting member has a second axial length smaller than the first axial length when the first and second fitting components are joined together to a second relative axial position advanced beyond the first relative axial position.

2. The fitting of claim 1, wherein the stroke resisting member is integral with the first fitting component.

3. The fitting of claim 1, wherein the stroke resisting member is assembled with the first fitting component, such that the first fitting component and the stroke resisting member are retained together as a discontinuous preassembly.

4. The fitting of claim 1, wherein the first fitting component comprises a female threaded nut.

5. The fitting of claim 4, wherein the stroke resisting member is axially fixed to the female threaded nut.

6. The fitting of claim 1 wherein the first end portion of the stroke resisting member comprises a first base portion defining the first radial thickness and a first wall portion having a fourth radial thickness smaller than the first radial thickness and extending axially from the first base portion toward the second end portion, and the second end portion of the stroke resisting member comprises a second base portion defining the second radial thickness and a second wall portion having a fifth radial thickness smaller than the second radial thickness and extending axially from the second base portion toward the first end portion, with the web portion extending from the first wall portion to the second wall portion.

7. The fitting of claim 1, wherein the second end portion of the stroke resisting member comprises a flange extending radially outward of a radially outermost surface of the web portion to define the bearing portion.

8. A fitting for conduits having a reference axis, comprising:
   a first threaded fitting component;
   a conduit gripping device receivable within the first threaded fitting component;
   a second threaded fitting component that threadably joins with the first threaded fitting component to produce relative axial stroke between the first threaded fitting component and the second threaded fitting component, wherein when the fitting is pulled-up on a conduit the first fitting component and the second fitting component can be joined together to a first relative axial position of the first and second fitting components to effect conduit grip and seal by the conduit gripping device at the first relative axial position; and
   a stroke resisting member disposed between a threaded portion of the first fitting component and a radially extending portion of the second fitting component, wherein the stroke resisting member comprises a proximal ring portion having a first radial thickness, a distal ring portion having a second radial thickness, a first wall portion having a third radial thickness smaller than the first radial thickness and extending axially from the proximal ring portion toward the distal ring portion, a second wall portion having a fourth radial thickness smaller than the second radial thickness and extending axially from the distal ring portion toward the proximal ring portion, and a web connecting the first and second wall portions, the web being angled with respect to each of the first and second wall portions to define a hinge portion.

9. The fitting of claim 8, wherein the proximal ring portion is integral with the first fitting component.

10. The fitting of claim 8, wherein the proximal ring portion includes a radially inward extending protrusion for cartridging engagement with a threaded fitting component.

11. The fitting of claim 8, wherein the distal ring portion comprises a radially extending bearing surface for engaging the radially extending portion of the second fitting component.

12. The fitting of claim 8, wherein the first wall portion extends from an inner radial portion of the proximal ring portion.

13. The fitting of claim 12, wherein the second wall portion extends from an inner radial portion of the distal ring portion.

14. The fitting of claim 8, wherein the first wall portion has a first outer diameter and the second wall portion has a second outer diameter different from the first outer diameter.

15. The fitting of claim 8, wherein the first wall portion has a first inner diameter and the second wall portion has a second inner diameter different from the first inner diameter.

16. The fitting of claim 8, wherein the web includes a portion that is generally V-shaped when viewed in longitudinal cross-section.

17. The fitting of claim 8, wherein the hinge portion of the web is entirely radially outward of the first and second wall portions.

18. The fitting of claim 8, wherein the web plastically deforms under axial compression, thereby reducing an axial length of the stroke resisting member.

19. The fitting of claim 8, wherein the web buckles when an axial load is applied to one of the proximal ring portion and the distal ring portion, thereby reducing an axial length of the stroke resisting member.

20. The fitting of claim 8, wherein the stroke resisting member is generally W-shaped when viewed in longitudinal cross-section.

21. The fitting of claim 8, wherein the web has a uniform thickness.

22. The fitting of claim 8, wherein the distal ring portion comprises a flange extending radially outward of a radially outermost surface of the second wall portion to define an axially outward facing bearing surface.

23. A fitting component comprising:
a threaded annular body having a central axis and comprising an internal bore; and
a stroke resisting member including a first end portion axially fixed to the threaded annular body and having a first radial thickness, a second end portion including a radially extending bearing portion having a second radial thickness, and a web connecting the first and second end portions, the web having a third radial thickness smaller than each of the first and second radial thicknesses and defining a hinge portion.

24. The fitting component of claim 23, wherein the threaded annular body comprises a female threaded fitting nut.

25. The fitting component of claim 23, wherein the first end portion of the stroke resisting member is integrally formed with the threaded annular body.

26. The fitting component of claim 23, wherein the first end portion of the stroke resisting member is assembled with the threaded annular body such that the threaded annular body and the stroke resisting member are retained together as a discontinuous preassembly.

27. The fitting component of claim 23, wherein the first end portion of the stroke resisting member comprises a first base portion defining the first radial thickness and a first wall portion having a fourth radial thickness smaller than the first radial thickness and extending axially from the first base portion toward the second end portion, and the second end portion of the stroke resisting member comprises a second base portion defining the second radial thickness and a second wall portion having a fifth radial thickness smaller than the second radial thickness and extending axially from the second base portion toward the first end portion, with the web portion extending from the first wall portion to the second wall portion.

28. The fitting component of claim 23, wherein the web plastically deforms under axial compression, thereby reducing an axial length of the stroke resisting member.

29. The fitting component of claim 23, wherein the web portion buckles when an axial load is applied to the bearing portion, thereby reducing an axial length of the stroke resisting member.

30. The fitting component of claim 23, wherein the second end portion of the stroke resisting member comprises a flange extending radially outward of a radial outermost surface of the web to define the bearing portion.

* * * * *